(12) United States Patent
Kano

(10) Patent No.: US 10,091,116 B2
(45) Date of Patent: Oct. 2, 2018

(54) SERVICE CHAIN CONSTRUCTION METHOD AND SERVER APPARATUS

(71) Applicant: FUJITSU LIMITED, Kawasaki-shi, Kanagawa (JP)

(72) Inventor: Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/676,105

(22) Filed: Aug. 14, 2017

(65) Prior Publication Data

US 2018/0063006 A1  Mar. 1, 2018

(30) Foreign Application Priority Data

Aug. 30, 2016 (JP) .................................. 2016-168491

(51) Int. Cl.
*H04L 12/859* (2013.01)
*G06F 9/455* (2018.01)
(Continued)

(52) U.S. Cl.
CPC ...... *H04L 47/2475* (2013.01); *G06F 9/45558* (2013.01); *G06F 9/5083* (2013.01);
(Continued)

(58) Field of Classification Search
CPC . H04L 47/2475; H04L 12/4633; H04L 41/50; H04L 45/306; H04L 47/2441;
(Continued)

(56) References Cited

U.S. PATENT DOCUMENTS 7,796,593 B1 * 9/2010 Ghosh ................ H04L 12/4633
370/389
9,160,567 B2 * 10/2015 Long ................... H04L 12/4633
(Continued)

FOREIGN PATENT DOCUMENTS

| JP | 2015-154325 | 8/2015 |
| JP | 2016-46603 | 4/2016 |
| WO | WO 2014/208661 A1 | 12/2014 |

OTHER PUBLICATIONS

Nakajima et al., "Prototype Development Of NFV Scalable Service Chaining With Load Balancer Consolidation", The 2016 IEICE General Conference, B-6-49, Mar. 2016, p. 49.
(Continued)

Primary Examiner — Jay P Patel
(74) Attorney, Agent, or Firm — Staas & Halsey LLP

(57) ABSTRACT

A service chain construction method includes partitioning a service chain in which a virtual distribution-function-group is arranged upstream of a most upstream virtual communication-function-group among virtual communication-function-groups arranged at stages, into sections, based on arrangement positions of the virtual distribution-function-group and a virtual communication-function-group of a terminating type among the virtual communication-function-groups, determining, for each of the sections, a communication route between a most upstream virtual distribution-function-group or the most upstream virtual communication-function-group in a section of the sections and a most downstream virtual communication-function-group or a most downstream virtual distribution-function-group in the section, based on a traffic ratio in the most upstream virtual distribution-function-group, the most downstream virtual distribution-function-group, the most upstream virtual communication-function-group, or the most downstream virtual communication-function-group in (Continued)

the section, and setting the communication route to the virtual distribution-function-group and the virtual communication-function-groups arranged in the service chain, by a processor.

9 Claims, 30 Drawing Sheets

(51) Int. Cl.
  *H04L 12/24* (2006.01)
  *G06F 9/50* (2006.01)
  *H04L 12/46* (2006.01)
  *H04L 12/851* (2013.01)
  *H04L 12/725* (2013.01)
(52) U.S. Cl.
  CPC .......... *H04L 12/4633* (2013.01); *H04L 41/50* (2013.01); *G06F 2009/45595* (2013.01); *H04L 41/0813* (2013.01); *H04L 45/306* (2013.01); *H04L 47/2441* (2013.01)

(58) Field of Classification Search
  CPC ............. H04L 41/0813; G06F 9/45558; G06F 9/5083; G06F 2009/45595
  See application file for complete search history.

(56) References Cited

U.S. PATENT DOCUMENTS

| | | | |
|---|---|---|---|
| 9,667,538 B2* | 5/2017 | Hammam | ............... H04L 45/64 |
| 2005/0060584 A1* | 3/2005 | Ginter | ..................... G06F 21/10 |
| | | | 726/4 |
| 2016/0147548 A1 | 5/2016 | Itsumi et al. | |

OTHER PUBLICATIONS

Nakajima et al., "Proposal for NFV scalable service chaining with decreased virtual resources", The Institute of Electronics, Information and Communication Engineers, IEICE Technical Report NS2015-160, Jan. 2016, pp. 81-86.

\* cited by examiner

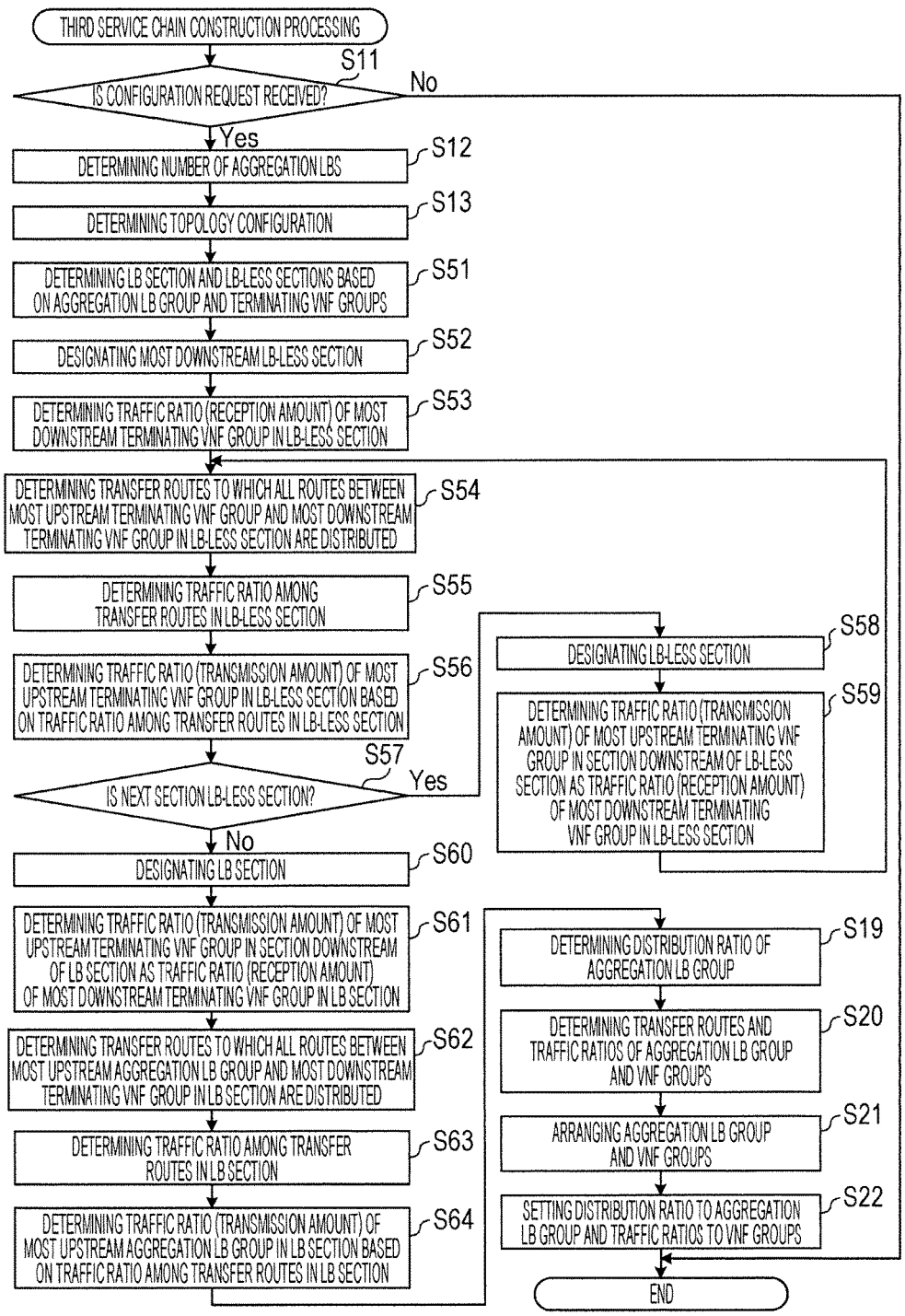

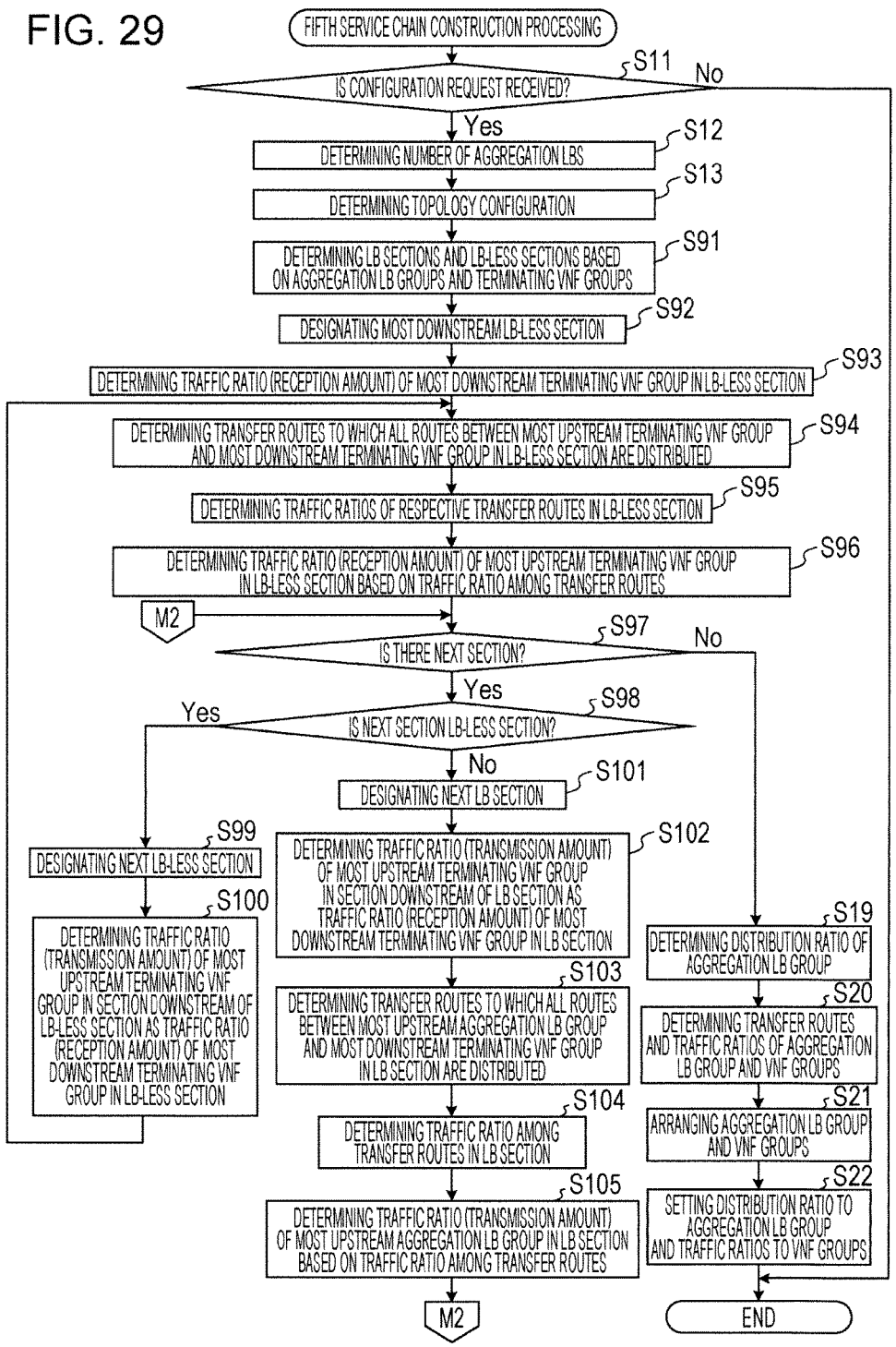

SERVICE CHAIN CONSTRUCTION METHOD AND SERVER APPARATUS

CROSS-REFERENCE TO RELATED APPLICATION

This application is based upon and claims the benefit of priority of the prior Japanese Patent Application No. 2016-168491, filed on Aug. 30, 2016, the entire contents of which are incorporated herein by reference.

FIELD

The embodiments discussed herein are related to a service chain construction method and a server apparatus.

BACKGROUND

In recent networks, there is a service chain system that transfers packets through network (NW) functions such as firewalls (FW) and proxies virtually arranged on a communication route in response to a request for an access from a base to an external site or from a base to another base. A communication route via virtual NW functions is called a service chain.

Conventionally, the NW function works on a physical NW apparatus such as a NW server. However, owing to recent performance improvement, a general purpose server has been enabled to implement the NW function even by a software processing on the general purpose server. Accordingly, operation of the NW function has started in a mode where a program of the NW function runs on a virtual machine in a virtual environment of the general purpose server. A software processing for a NW operating on a virtual machine is called a virtual network function (VNF).

However, as a result of a shift of the operation mode of NW-related processing such as data transfer from a physical NW apparatus to a VNF of software processing on the general purpose server, processing performance of data transfer drops in some cases. For solving this problem, the NW-related processing is scaled out by implementing a plurality of programs in parallel and operating virtual machines on a plurality of servers in parallel such that load of data transfer is distributed, and thereby processing performance of data transfer is improved.

FIG. 32 illustrates an example of an arrangement configuration of a service chain. A service chain 200 illustrated in FIG. 32 arranges, for example, VNFs 201 such as FWs 201A, intrusive detection systems (IDSs) 201B, and Proxies 201C. Further, in the service chain 200, load balancers (LB) 202 for distributing the traffic are virtually arranged upstream of the VNFs 201. The LB 202 distributes the traffic to the VNFs 201 arranged downstream thereof. As a result, drop of the processing performance by the software processing is suppressed by distributing loads of the transfer processing of the VNFs 201.

Related techniques are disclosed in, for example, Japanese Laid-open Patent Publication Nos. 2015-154325 and 2016-46603, and International Publication Pamphlet No. WO 2014/208661.

SUMMARY

According to an aspect of the invention, a service chain construction method includes partitioning a service chain in which a virtual distribution function group is arranged upstream of a most upstream virtual communication function group among virtual communication function groups arranged at a plurality of stages, into a plurality of sections, based on arrangement positions of the virtual distribution function group and a virtual communication function group of a terminating type among the virtual communication function groups, determining, for each of the plurality of sections, a communication route between a most upstream virtual distribution function group or the most upstream virtual communication function group in a section of the plurality of sections and a most downstream virtual communication function group or a most downstream virtual distribution function group in the section, based on a traffic ratio in the most upstream virtual distribution function group, the most downstream virtual distribution function group, the most upstream virtual communication function group, or the most downstream virtual communication function group in the section, and setting the communication route to the virtual distribution function group and the virtual communication function groups arranged in the service chain, by a processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a flowchart illustrating an example of a processing operation of a management server related to a third service chain construction processing;

FIG. 29 is a flowchart illustrating an example of a processing operation of a management server related to a fifth service chain construction processing;

DESCRIPTION OF EMBODIMENTS

For the VNFs 201 constituting the service chain 200, a LB 202 is requested for each stage of VNFs 201, and accordingly a transfer delay occurs every time data is transferred by the LB 202. Furthermore, the service chain 200 requests a lot of LBs 202, and have to use resources in a virtual area on a general purpose server.

Hereinafter, embodiments of a service chain construction method capable of suppressing the transfer delay and a server apparatus disclosed herein are described in detail with reference to the accompanying drawings. However, the disclosed technique is not limited to the embodiments. The embodiments described below may be combined together as appropriate without causing inconsistency.

Figure 1:
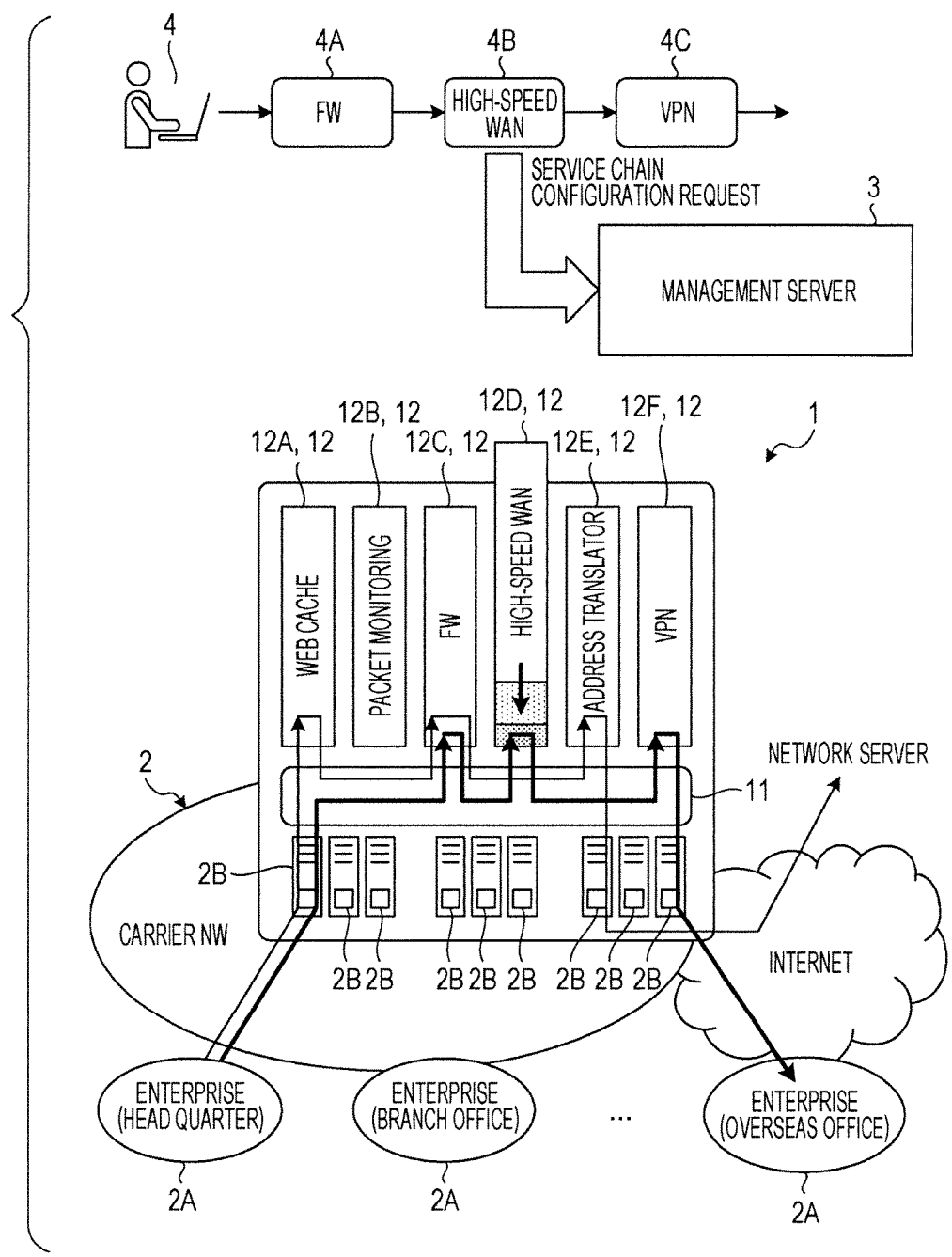
FIG. 1 illustrates an example of a service chain system.

FIG. 1 illustrates an example of a service chain system 1. The service chain system 1 illustrated in FIG. 1 includes a carrier NW 2, a management server 3, and a terminal device 4. The carrier NW 2 is, for example, a NW coupling bases 2A such as a head quarter, branch offices, and overseas offices of an enterprise to each other. The carrier NW 2 is constituted, for example, by a plurality of general purpose servers 2B, and includes a virtual NW 11 operating in a virtual area in a resource area of the general purpose servers 2B, and a plurality of VNFs 12 arranged on the virtual NW 11. The management server 3 establishes a service chain for communicating between the bases 2A in the virtual area.

The VNF 12 is a virtual NW function such as, for example, a web cache 12A, a packet monitoring 12B, a FW 12C, a high-speed WAN 12D, an address translator 12E, a VPN 12F, an IDS, and a Proxy. The web cache 12A is a NW function that stores cache data communicated with a web server (not illustrated). The packet monitoring 12B is a NW function that monitors the state of the packet on a communication route. The FW 12C is a NW function that averts an unauthorized access. The high-speed WAN 12D is a NW function such as a high-speed WAN. The address translator 12E is a NW function that translates the address. The VPN 12F is a NW function such as a virtual lease line. The IDS is a NW function that detects an unauthorized intrusion from the outside. The Proxy is a NW function of a proxy server. The VNF 12 is a virtual communication function virtually arranged in a virtual area on the general purpose server 2B.

The management server 3 is a server apparatus configured to arrange a desired virtual NW 11 and VNF 12 on a virtual area of each general purpose server 2B in the carrier NW 2 in response to a service chain configuration request from the terminal device 4. The terminal device 4 is, for example, a terminal device of a system administrator that is coupled with the management server 3 via the FW 4A, high-speed WAN 4B, and VPN 4C and is configured to instruct the service chain configuration request to the management server 3. The configuration request is a command that requests arrangement of one or more VNFs 12 on a packet transfer communication route. The configuration request designates the instance number of the VNFs 12 and LBs 13, and in some cases, may designate the instance number of the VNFs 12 only. In some cases, the configuration request may designate, for example, a requested quality of the service chain. When a configuration request designating a requested quality is detected, the management server 3 determines the instance number of the VNFs 12 and LBs 13 based on a desired function designated by the configuration request and a load status.

Figure 2:
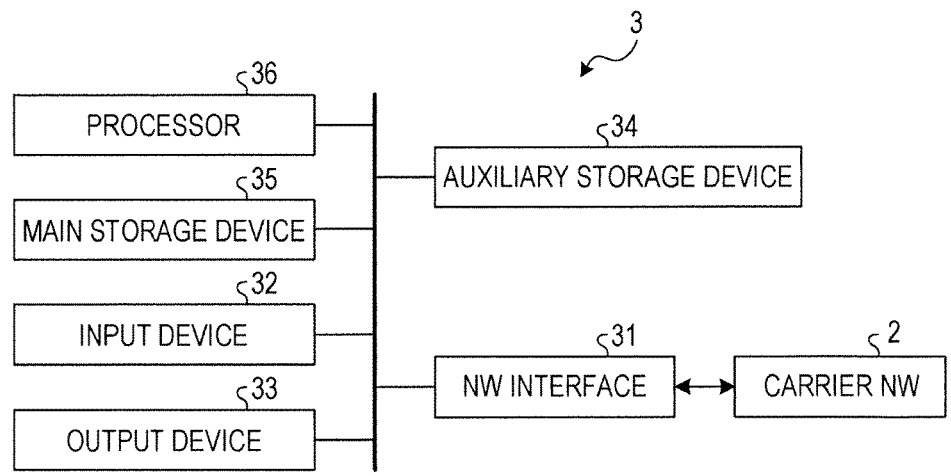
FIG. 2 illustrates an example of a hardware configuration of a management server.

FIG. 2 illustrates an example of a hardware configuration of the management server 3. The management server 3 illustrated in FIG. 2 corresponds to, for example, a dedicated computer or a general purpose computer as a NW server. The management server 3 includes a NW interface 31, an input device 32, an output device 33, an auxiliary storage device 34, a main storage device 35, and a processor 36. The NW interface 31 is a communication interface coupled with the carrier NW 2 as well as the VNF 12. Also, the NW interface 31 is, for example, a communication interface that controls wired or wireless communication. The NW interface 31 is a communication card such as, for example, a network interface card (NIC) and a local area network (LAN) card.

The input device 32 is an input interface through which various information is inputted, such as, for example, a keyboard and a pointing device like a mouse. The output device 33 is an output interface through which various information is outputted, such as, for example, a sound output device and a display device. The auxiliary storage device 34 is, for example, a non-volatile memory such as an erasable programmable ROM (EPROM) or a hard disc drive, which stores, for example, various programs and various information of data used by the processor 36. Further, the auxiliary storage device 34 is an area to store, for example, an operating system (OS) and other various application programs.

The main storage device 35 is a semiconductor memory that provides an area or a work area for loading various information such as, for example, a program stored in the auxiliary storage device 34, such as, for example, a random access memory (RAM). The processor 36 is a control unit that controls entire management server 3, such as, for example, a central processing unit (CPU). The processor 36 implements various processing functions by executing an OS and various application programs stored in the auxiliary storage device 34 or a portable recording medium after loading into the main storage device 35. The number of processors 36 is not limited to one, but may be two or more.

Figure 3:
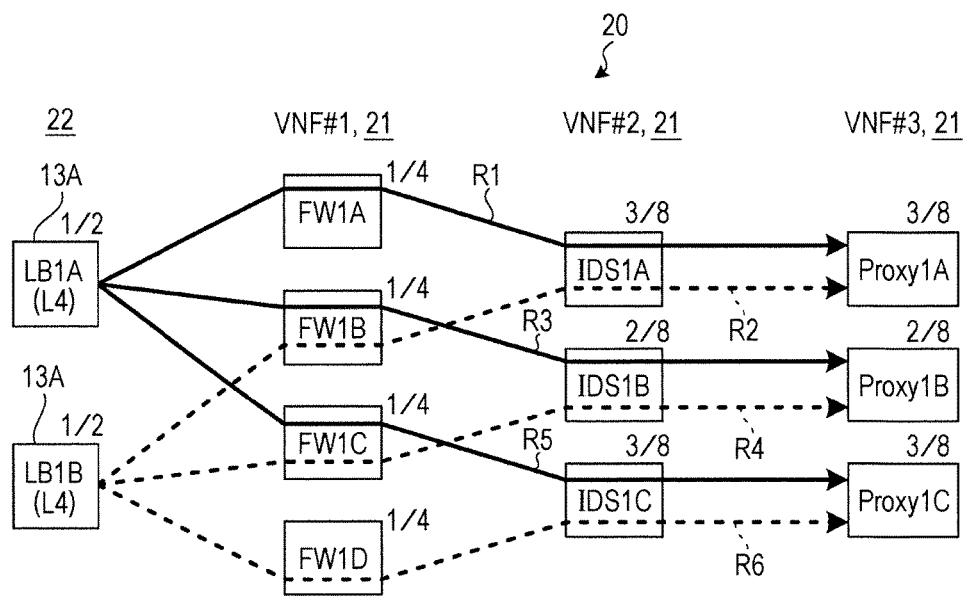
FIG. 3 illustrates an example of a service chain.

FIG. 3 illustrates an example of a service chain 20. The service chain 20 illustrated in FIG. 3 includes a plurality of VNF groups 21 and LB groups 22. The plurality of VNF groups 21 include a VNF #1, a VNF #2, and a VNF #3, which are arranged in a predetermined order. The VNF #1 includes, for example, FW 1A to FW 1D. The VNF #2 includes, for example, IDS 1A to IDS 1C. The VNF #3 includes, for example, Proxy 1A to Proxy 1C. The LB group 22 includes, for example, LB 1A and LB 1B.

Upon detecting the configuration request, the processor 36 determines, based on the instance number of VNFs 12 in each VNF group 21 designated in the configuration request, the number of aggregation LBs 13A to be arranged upstream of a VNF group 21 which is most upstream in a predetermined order, or the VNF #1. The predetermined order is, for example, an order in which the VNF #1 (FW), the VNF #2 (IDS), and the VNF #3 (Proxy) are arranged from the upstream.

Upon detecting the configuration request, the processor 36 identifies, based on the configuration request, the LB group 22 (LB 13 (L4) relative to VNF #3) of the upper layer "L4 level" among properties of the LB 13 which distributes traffics to VNF groups 21. Distribution processing based on the L4 level (TCP session) may implement distribution processing based on the L3 level (IP) as well. The processor 36 identifies a LB 13 of a largest instance number of LBs among the LB groups 22 implementing distribution processing of the upper layer "L4 level", and determines the instance number of identified LBs as an instance number of the aggregation LBs 13A. For example, in a case where the instance number of LBs of the VNF #3 is two of the L4 level LB, the processor 36 determines the two of the L4 level LB as the number of aggregation LBs 13A. Identification of the VNF group 21 of the L4 level is performed to implement a L3 level-based (IP) processing in a L4 level-based (TCP session) processing.

Further, the processor 36 determines a topology configuration as an arrangement order of the VNF #1, VNF #2, and VNF #3. As illustrated in FIG. 3, the processor 36 determines a topology configuration in which the VNF #1 is arranged at the most upstream in the service chain 20, the VNF #2 is arranged downstream (at the next stage) of the VNF #1, and the VNF #3 is arranged downstream of the VNF #2, and further, the aggregation LB 13A is arranged upstream of the most upstream VNF #1. The topology configuration is a configuration in which LB 1A and LB 1B in the aggregation LB 13A are arranged at the most upstream, FW 1A to FW 1D in the VNF #1 are arranged downstream thereof, IDS 1A to IDS 1C in the VNF #2 are arranged next downstream, and Proxy 1A to Proxy 1C in the VNF #3 are arranged further next downstream.

The processor 36 determines traffic distribution ratios of the aggregation LB at which traffics from the aggregation LB 13A to VNFs 12 in a terminating VNF group 21 among a plurality of VNF groups 21 are distributed, and the traffic ratio among the VNFs 12. The processor 36 determines the VNFs 12 in the terminating VNF group 21 among the plurality of VNF groups 21, and optimum routes from the aggregation LB 13A to the terminating VNFs 12.

As the aggregation LB 13A is a L4 level LB, the processor 36 determines, for example, Proxy 1A to Proxy 1C of the VNF #3 as a terminating VNF group 21 that terminates the L4 level from the aggregation LB 13A. "LB 1A" of the aggregation LB 13A determines three routes of Proxy 1A to Proxy 1C. Further, "LB 1B" of the aggregation LB 13A also determines three routes of Proxy 1A to Proxy 1C. "LB 1A" and "LB 1B" of the aggregation LB 13A are terminal type LBs capable of distributing traffics for the number of terminating VNFs 12. For example, the LB 1A may distribute the traffic to three routes as the terminating VNF group 21 includes three units of VNFs 12, Proxy 1A to Proxy 1C.

The processor 36 calculates a shortest route in three routes from "LB 1A" of the aggregation LB 13A to a terminating VNF 12 or Proxy 1A to Proxy 1C by increasing a link cost on calculated routes in a shortest route cost method such as, for example, a Dijkstra method. In the shortest route calculation of three routes from the LB 1A to the terminating VNF 12, the processor 36 determines optimum routes R1, R3, and R5 distributed from routes passing through the VNF #1 and VNF #2. The processor 36 uses a shortest route cost method and adds a link cost in three routes from "LB 1B" of the aggregation LB 13A to a terminating VNF 12 or Proxy 1A to Proxy 1C. Then, with the calculation, the processor 36 determines optimum routes R2, R4, and R6 to which routes passing through the VNF #1 and VNF #2 are distributed.

The processor 36 determines a traffic distribution ratio from the aggregation LB 13A to each upstream VNF 12 such that an equal traffic amount is distributed to each VNF 12 of a VNF group 21 having a largest instance number of VNFs 12 among VNF groups 21 arranged in each of optimum routes R1 to R6. The processor 36 identifies a VNF 12 of a largest number, or the VNF #1 (FW 1A to FW 1D) among the VNF #1 to VNF #3. The processor 36 calculates the distribution ratio of the traffic amount distributed from "LB 1A" and "LB 1B" of the aggregation LB 13A to FW 1A to FW 1D in the VNF #1 such that the traffic amounts of FW 1A to FW 1D of the VNF #1 among six optimum routes become equal to each other. Assuming that the traffic amount of entire service chain 20 is 1, the distribution ratio from the LB 1A to the FW 1A is 1/4 of the entire traffic amount, the distribution ratio from the LB 1A to the FW 1B is 1/8 of the entire traffic amount, and the distribution ratio from the LB 1A to the FW 1C is 1/8 of the entire traffic amount. Further, the distribution ratio from the LB 1B to the FW 1D is 1/4 of the entire traffic amount, the distribution ratio from the LB 1B to the FW 1B is 1/8 of the entire traffic amount, and the distribution ratio from LB 1B to FW 1C is 1/8 of the entire traffic. As a result, each of the FW 1A to the FW 1D is equally assigned with 1/4 of the entire traffic amount.

The processor 36 calculates the traffic ratio between a VNF 12 and a VNF 12 downstream thereof for each of optimum routes such that the traffic ratios among the traffic amounts of the VNFs 12 become optimum. After determining the distribution ratio of the traffic amounts from the LB 1A and LB 1B of the aggregation LB 13A to the FW 1A and FW 1D in each of VNFs #1, the processor 36 determines transfer routes on the determined optimum routes R1 to R6. Further, the processor 36 determines the distribution ratio to each VNF 12 on the transfer routes. The transfer route is, among optimum routes, a route through which a VNF 12 transfers a packet to a VNF 12 downstream thereof.

The transfer route of the LB 1A of the aggregation LB 13A turns a route for transferring a packet destined to the Proxy 1A to the FW 1A, a route for transferring a packet destined for the Proxy 1B to the FW 1B, and a route for transferring a packet destined for the Proxy 1C to the FW 1C. The transfer route of the LB 1B of the aggregation LB 13A turns a route for transferring a packet destined to the Proxy 1A to the FW 1B, a route for transferring a packet destined for the Proxy 1B to the FW 1C, and a route for transferring a packet destined for the Proxy 1C to the FW 1D.

Further, the transfer route of the FW 1A turns a route for transferring a packet destined for the Proxy 1A to the IDS 1A. The transfer route of the FW 1B turns a route for transferring a packet destined to the Proxy 1A to the IDS 1A and a route for transferring packet destined for the Proxy 1B to the IDS 1B. The transfer route of the FW 1C turns a route for transferring a packet destined for the Proxy 1B to the IDS 1B and a route for transferring a packet destined for the Proxy 1C to the IDS 1C. The transfer route of the FW 1D turns a route for transferring a packet destined for the Proxy 1C to the IDS 1C.

Further, the transfer route of IDS 1A turns a route for transferring a packet destined for the Proxy 1A to the Proxy 1A. The transfer route of the IDS 1A turns a route for transferring a packet destined for the Proxy 1B to the Proxy 1B. The transfer route of IDS 1C turns a route for transferring a packet destined for the Proxy 1C to the Proxy 1C. Further, the processor determines the traffic ratio of each VNF 12 such that the traffic amount of each VNF 12 in each transfer route is optimum. The traffic ratio of each VNF 12 is calculated by, for example, a weighted round robin system or weighted hash distribution system.

The processor 36 determines the traffic ratio among transfer routes from the VNF #1 to the VNF #2. The traffic ratio of the transfer route from the FW 1A to the IDS 1A is 2/8 of the entire traffic amount, the traffic ratio of the traffic route from the FW 1B to the IDS 1A is 1/8 of the entire traffic amount, and the traffic ratio of the traffic route from the FW 1B to the IDS 1B is 1/8 of the entire traffic amount. The traffic ratio of the transfer route from the FW 1C to the IDS 1B is 1/8 of the entire traffic amount, the traffic ratio of the traffic route from the FW 1C to the IDS 1C is 1/8 of the entire traffic amount, and the traffic ratio of the traffic route from the FW 1D to the IDS 1C is 2/8 of the entire traffic amount.

Further, the processor 36 determines the traffic ratio for each of transfer routes from the VNF #2 to the VNF #3. For example, the traffic ratio of the transfer route from the IDS 1A to the Proxy 1A is 3/8, the traffic ratio of the traffic route from the IDS 1B to the Proxy 1B is 2/8, and the traffic ratio of the traffic route from the IDS 1C to the Proxy 1C is 3/8. A traffic ratio among transfer routes from the VNF #2 to the VNF #3 is determined as, for example, 3/8, 2/8, and 3/8 for convenience of explanation. However, the traffic ratio may be adjusted such that the traffic amounts may be equal among the transfer routes.

Based on the number of aggregation LBs 13A and VNFs 12, optimum routes R1 to R6, and transfer routes, the processor 36 arranges aggregation LBs 13A and VNFs 12 in a virtual area such as in the general purpose server 2B and activates. The processor 36 sets the determined distribution ratio of the aggregation LB 13A to the arranged aggregation LB 13A. The processor 36 sets the determined traffic ratio of each VNF 12 to each of arranged VNFs 12. As a result, a service chain 20 according to the configuration request may be constructed in a virtual environment.

The management server 3 constructs a service chain 20 according to the configuration request in a virtual area of a designated general purpose server 2B on the carrier NW 2 based on the aggregation LB 13A, the optimum route from the aggregation LB 13A to a terminating VNF 12, the distribution ratio of the aggregation LB 13A, and the traffic ratio of each VNF 12.

Figure 4:
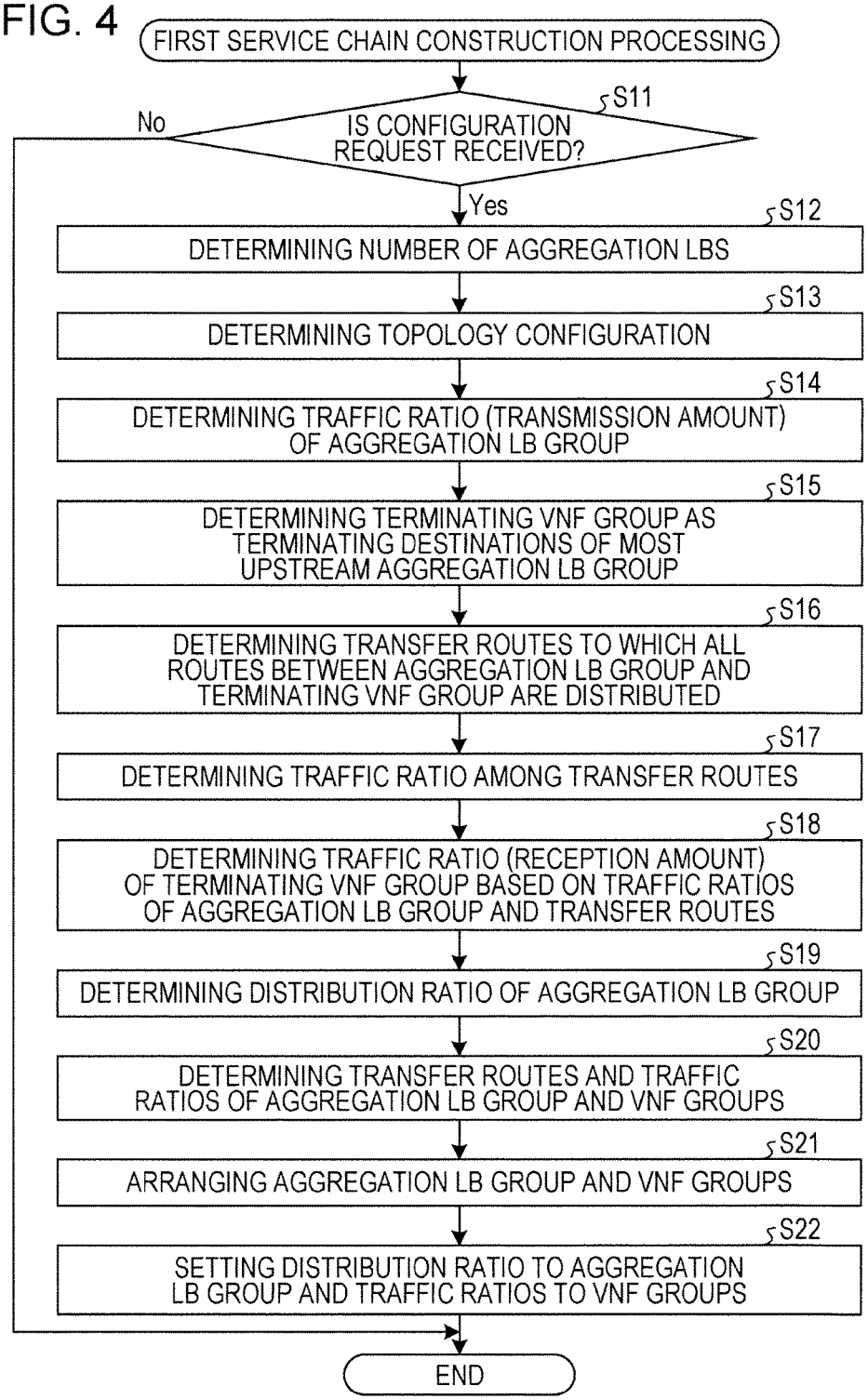
FIG. 4 is a flowchart illustrating an example of a processing operation of the management server related to a first service chain construction processing.

Next, a service chain system 1 is described. FIG. 4 is a flowchart illustrating an example of a processing operation of the management server 3 related to the first service chain construction processing.

In FIG. 4, the processor 36 in the management server 3 determines whether a configuration request is received from the terminal device 4 (operation S11). In a case where a configuration request is received (operation S11: Yes), the processor 36 determines the number of aggregation LBs 13A based on the instance number of VNFs 12 in the VNF group 21 and the instance number of LBs 13 for each of VNF groups 21 in the configuration request (operation S12). The processor 36 identifies, for example, a VNF group 21 having a largest instance number of VNFs 12 among VNF groups 21 of the upper level in the configuration request, and determines the number of LB instances of the identified VNF group 21 as the number of aggregation LBs 13A. Further, as illustrated in FIG. 3, the processor 36 determines a topology configuration of the aggregation LB group 22 of the aggregation LB 13A and the VNF group 21 based on the VNF group 21 in the configuration request (operation S13).

The processor 36 determines the traffic ratio (transmission amount) of the most upstream LB group 22 of the service chain 20 (operation S14). As illustrated in FIG. 3, the traffic ratio (transmission amount) of the aggregation LB group 22 transmitted by the LB 1A is 1/2 of the entire traffic amount, and the traffic ratio transmitted by the LB 1B is 1/2 of the entire traffic amount. The processor 36 identifies a terminating VNF group 21 as a terminating destination of the most upstream aggregation LB group 22 (operation S15). The terminating VNF group 21 corresponds to, for example, the VNF #3 illustrated in FIG. 3, and terminating VNFs 12 are the Proxy 1A to Proxy 1C.

The processor 36 determines the transfer route to which all routes between the aggregation LB group 22 and a terminating VNF group 21 are distributed (operation S16). As illustrated in FIG. 3, all routes include the transfer route between the LB 1A and the Proxy 1A, the transfer route between the LB 1A and the Proxy 1B, the transfer route between the LB 1A and the Proxy 1C, the transfer route between the LB 1B and the Proxy 1A, the transfer route between the LB 1B and the Proxy 1B, and the transfer route between the LB 1B and the Proxy 1C. The processor 36 determines the traffic ratio among transfer routes (operation S17).

Based on the traffic ratio in the aggregation LB group 22 and transfer routes, the processor 36 determines the traffic ratio (reception amount) of each VNF 12 in an terminating VNF group 21 (operation S18). As the terminating VNF group 21 is the VNF #3, the Proxy 1A receives 3/8 of the entire traffic amount, the Proxy 1B receives 2/8 of the entire traffic amount, and the Proxy 1C receives 3/8 of the entire traffic amount.

Then, the processor 36 determines the distribution ratio of the aggregation LB group 22 (operation S19). Further, the processor 36 determines the transfer routes and the traffic ratios of the aggregation LB group 22 and VNF group 21 (operation S20), and thereafter arranges the aggregation LB group 22 and VNF group 21 in a virtual area on the general purpose server 2B and activates functions thereof (operation S21). Further, the processor 36 sets the distribution ratio of the aggregation LB group 22 to the aggregation LB 13A on the virtual area, and sets the traffic ratio of the VNF group 21 to each VNF 12 on the virtual area (operation S22). Then, the processor 36 ends the processing operation illustrated in FIG. 4. As a result, the service chain 20 according to the configuration request may be arranged on the virtual area. In a case where the configuration request is not received (operation S11: No), the processor 36 ends the processing operation illustrated in FIG. 4.

In the above example, a plurality of aggregation LBs 13A are arranged most upstream of the service chain 20, and the distribution ratio of the aggregation LB group 22 and the traffic ratio of VNFs 12 are determined such that the traffic amounts from the aggregation LB 13A to the terminating VNF group 21 become equal. As a result, the number of LBs 13 is reduced, and thereby transfer delay may be suppressed and a limited resource in the virtual area may be saved.

Figure 5:
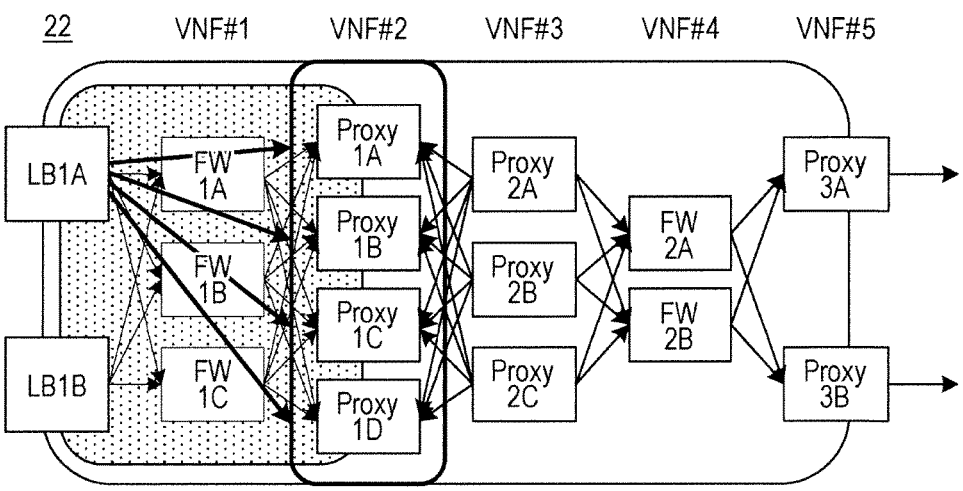
FIG. 5 illustrates an example of a traffic distribution method of an aggregation LB group in the service chain.

However, the aggregation LB 13A used in the service chain 20 of the above embodiment is a terminating type LB that distributes the received packet to a plurality of terminating destinations. FIG. 5 illustrates an example of a traffic distribution method of the aggregation LB group 22 in the service chain 20A. The service chain 20A illustrated in FIG. 5 has a configuration in which a VNF #1, a VNF #2, a VNF #3, a VNF #4, and a VNF #5 are arranged in this order, and the aggregation LB group 22 is arranged upstream of the most upstream VNF #1. The aggregation LB group 22 is, for example, a terminating type LB including LB 1A and LB 1B. The VNF #1 includes, for example, FW 1A to FW 1C, the VNF #2 includes, for example, Proxy 1A to Proxy 1D, and the VNF #3 includes, for example, Proxy 2A to Proxy 2C. The VNF #4 includes, for example, FW 2A to FW 2B, and the VNF #5 includes Proxy 3A to Proxy 3B. The VNF #2, VNF #3, and VNF #5 are terminating VNF groups 21. Terminating VNF groups 21 have a NW function that terminates the TCP session and implements packet processing to transmit the packet to a new TC session, and a NW function that relays the received packet by translating the destination IP address thereof to another destination IP address.

When Proxy 1A to Proxy 1D are arranged downstream of FW 1A to FW 1C, terminating destination of the reception traffic of aggregation LB 1A and LB 1B in the service chain 20A illustrated in FIG. 5 are four terminating VNFs or Proxy 1A to Proxy 1D. Therefore, aggregation LB 1A and LB 1B distribute the reception traffic to four VNFs, Proxy 1A to Proxy 1D. However, in a case where a terminating VNF 12 is arranged downstream of Proxy 1A to Proxy 1D, aggregation LB 1A and LB 1B may distribute the traffic amount to each terminating VNF 12 in the VNF #2, but may not distribute the traffic amount of the VNF #3 and VNF #5, which are downstream of the VNF #2. Thus, the terminating type LB may distribute the traffic according to the number of terminating VNFs 12 in a first terminating VNF group 21, but may not distribute according to the number of terminating VNFs 12 in a terminating VNF group 21 downstream of the first terminating VNF group 21.

For addressing such a case, an embodiment of the service chain system 1 that distributes the traffic even according to the number of terminating VNFs 12 in a terminating VNF group 21 downstream of a first terminating VNF group 21 is described below as a first embodiment. Description of the configuration and operation of the same components as in the service chain system 1 described above is omitted by assigning same reference numerals.

First Embodiment

Figure 6:
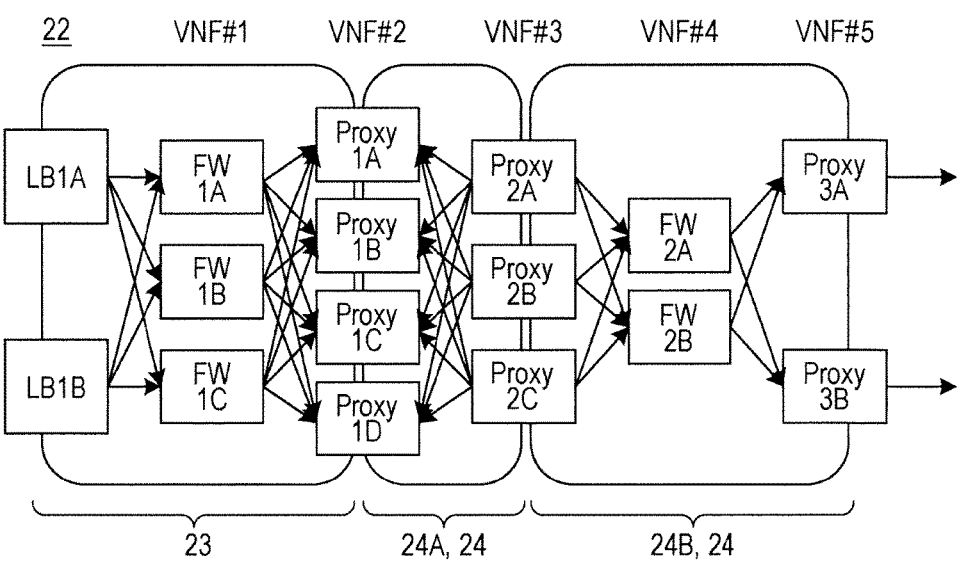
FIG. 6 illustrates an example of a service chain of a first embodiment.

FIG. 6 illustrates an example of an arrangement configuration of a service chain 20B according to the first embodiment. The service chain 20B illustrated in FIG. 6 includes a plurality of VNF groups 21 including VNF #1 to VNF #5, and an aggregation LB group 22 arranged upstream of the most upstream VNF #1 among the plurality of VNF groups 21. The VNF #1 includes, for example, FW 1A to FW 1C. The VNF #2 includes, for example, Proxy 1A to Proxy 1D. The VNF #3 includes, for example, Proxy 2A to Proxy 2C. The VNF #4 includes, for example, FW 2A and FW 2B. The VNF #5 includes, for example, Proxy 3A to Proxy 3B. VNF #2, VNF #3, and VNF #5 are terminating VNF groups 21. The aggregation LB group 22 is a L3 terminating type LB; the VNF #2, VNF #3, and VNF #5 are L3 terminating type VNFs; and the VNF #1 and VNF #4 are L3 relay type VNFs.

Figure 7:
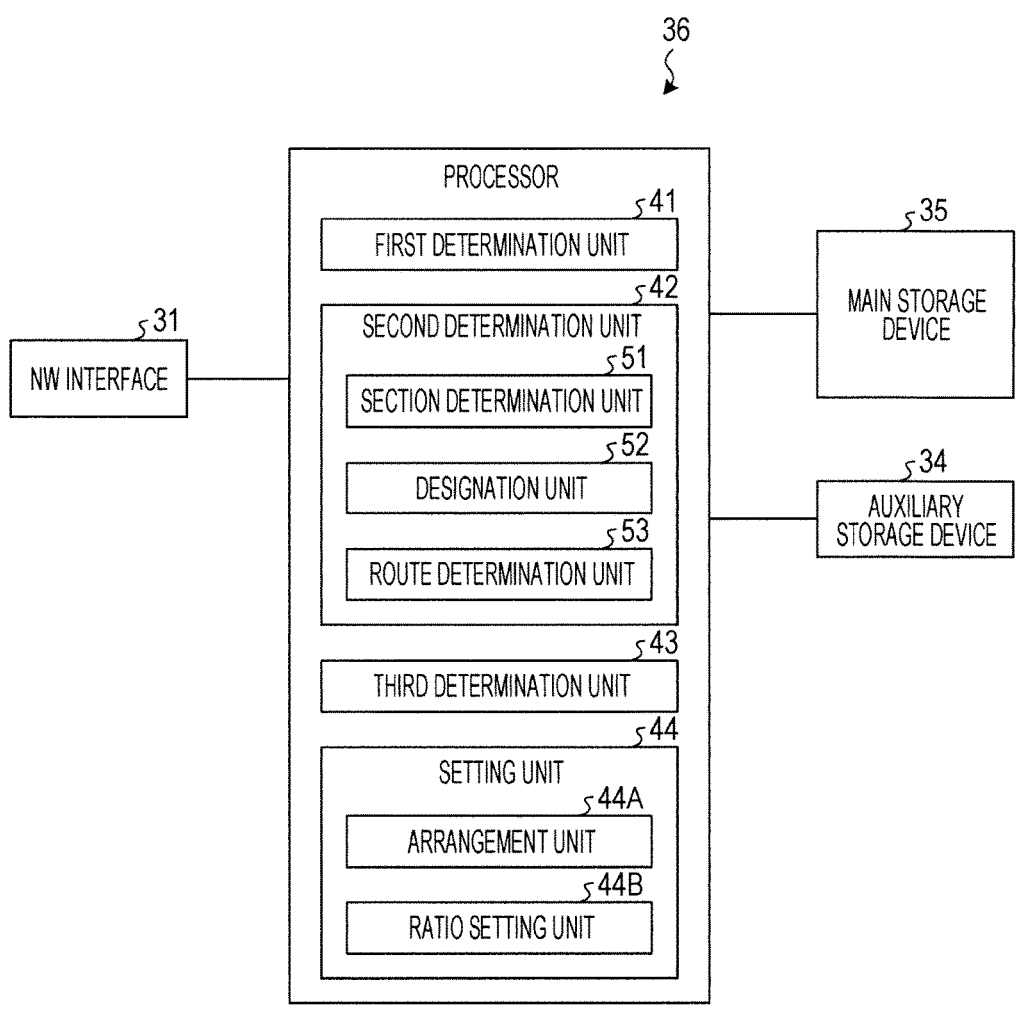
FIG. 7 illustrates an example of a functional configuration of a processor in a management server of the first embodiment.

FIG. 7 illustrates an example of a functional configuration of a processor 36 in a management server 3 of the first embodiment. The processor 36 illustrated in FIG. 7 includes a first determination unit 41, a second determination unit 42, a third determination unit 43, and a setting unit 44. The auxiliary storage device 34 stores a processing program related to the service chain construction method. The processor 36 reads the processing program related to the service chain construction method from the auxiliary storage device 34 and implements functions of the first determination unit 41, second determination unit 42, third determination unit 43, and setting unit 44 on the processor 36. The first determination unit 41 determines the number and topology configuration of aggregation LB groups 22 of the service chain 20B in response to the configuration request.

The second determination unit 42 includes a section determination unit 51, a designation unit 52, and a route determination unit 53. The section determination unit 51 determines a LB section 23 and LB-less section 24 based on the terminating VNF groups 21 and aggregation LB group 22 from the topology configuration of the service chain 20B. The LB section 23 is a section between the aggregation LB group 22 and a next terminating VNF group 21 downstream thereof. The LB-less section 24 is a section having no aggregation LB 13A between a terminating VNF group 21 and a next terminating VNF group 21 downstream thereof. The LB section 23 illustrated in FIG. 6 is a section, for example, between the aggregation LB group 22 (LB 1A, LB 1B) and the terminating VNF #2 (Proxy 1A to Proxy 1D). A first LB-less section 24A is a section, for example, between a terminating VNF #2 (Proxy 1A to Proxy 1D) and a terminating VNF #3 (Proxy 2A to Proxy 2C). A second LB-less section 24B is a section, for example, between a terminating VNF #3 (Proxy 2A to Proxy 2C) and a terminating VNF #5 (Proxy 3A to Proxy 3B).

The designation unit 52 designates sections one by one in the ascending order of LB section 23→first LB-less section 24A→second LB-less section 24B. The route determination unit 53 determines transfer routes and traffic ratios of the aggregation LB group 22 and the VNF groups 21 in the LB section 23. Traffic ratios of transfer routes of the aggregation LB group 22 and the VNF groups 21 in the LB section 23 are traffic amounts that may be averaged among VNF groups 21 on the transfer routes. The route determination unit 53 determines transfer routes and a traffic ratio of VNF groups 21 in each LB-less section 24. The traffic ratio among the transfer routes between the VNF groups 21 in the LB-less section 24 is determined such that the transmission allows the reception amounts to be averaged in the most downstream terminating VNF group 21 in the LB-less section 24, and that the distribution allows the traffic amounts processed by all VNFs 12 in the LB-less section 24 to be averaged.

The third determination unit 43 determines the distribution ratio of the aggregation LB group 22 and transfer routes and traffic ratios in VNF groups 21 based on transfer routes and traffic ratios of the aggregation LB group 22 and VNF groups 21 in the LB section 23 and LB-less section 24. The setting unit 44 arranges and activates VNF groups 21 and aggregation LB group 22 on a virtual area based on the topology configuration, and sets the transfer route and traffic ratios to the arranged VNF groups 21 and aggregation LB group 22. The setting unit 44 includes an arrangement unit 44A and a ratio setting unit 44B. The arrangement unit 44A arranges and activates VNF groups 21 and aggregation LB group 22 on a virtual area based on the topology configuration. The ratio setting unit 44B sets the transfer route and traffic ratios to the arranged VNF groups 21 and aggregation LB group 22.

Figure 8A:
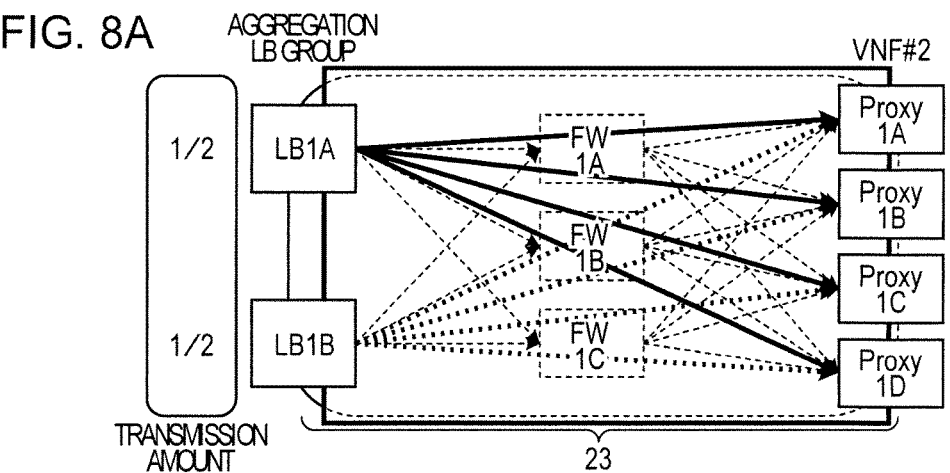
FIG. 8A illustrates an example of a terminating destination in a LB section.

FIG. 8A illustrates an example of terminating destinations in the LB section 23. The terminating VNF group 21 in the LB section 23 illustrated in FIG. 8A is, for example, Proxy 1A to Proxy 1D in the VNF #2. As there is no section upstream of the aggregation LB group 22 and the aggregation LB group 22 includes two LBs, LB 1A and LB 1B, the route determination unit 53 in the second determination unit 42 determines the traffic ratio (reception amount) of the aggregation LB group 22 as 1/2 of the entire traffic amount. The route determination unit 53 determines a terminating VNF group 21 (Proxy 1A to Proxy 1D in the VNF #2) which becomes a terminating destination of the aggregation LB group 22 in the LB section 23.

Figure 8B:
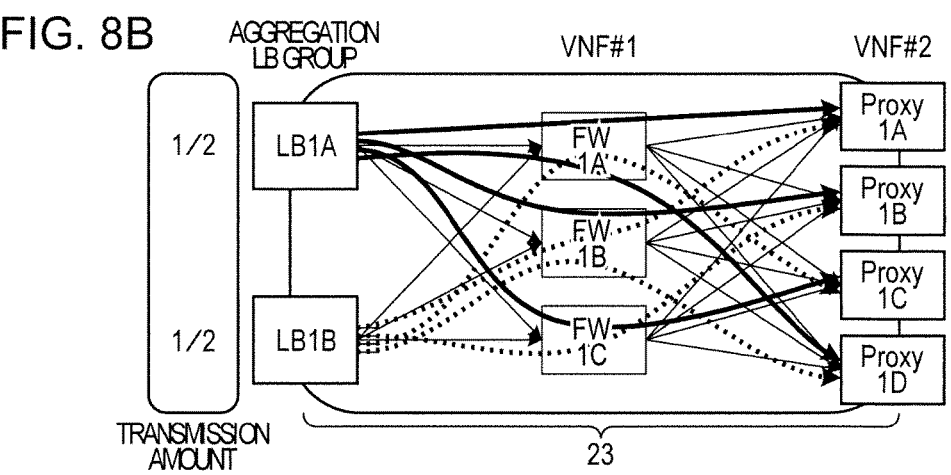
FIG. 8B illustrates an example of transfer routes in the LB section.

FIG. 8B illustrates an example of transfer routes in the LB section 23. The route determination unit 53 determines transfer routes distributing all routes between the aggregation LB group 22 and a terminating VNF group 21 in the LB section 23. The route determination unit 53 determines four transfer routes from the LB 1A to the Proxy 1A to the Proxy 1D and four transfer routes from the LB 1B to the Proxy 1A to the Proxy 1D in the LB section 23.

Figure 8C:
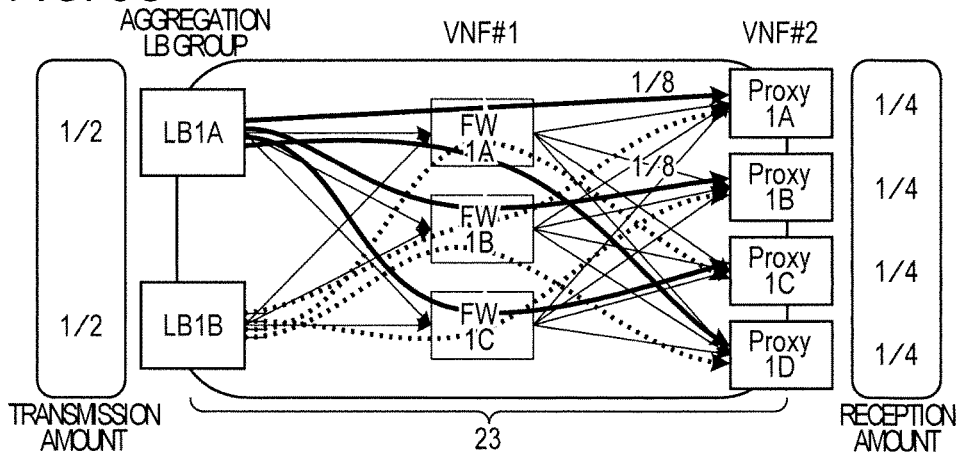
FIG. 8C illustrates an example of a traffic ratio (reception amount) of a terminating VNF group in the LB section.

FIG. 8C illustrates an example of a traffic ratio (reception amount) of a terminating VNF group 21 in the LB section 23. The route determination unit 53 determines the traffic ratio among transfer routes in the LB section 23 based on the traffic ratio (transmission amount) of the aggregation LB group 22 and transfer routes in the LB section 23. Further, the route determination unit 53 determines the traffic ratio (reception amount) among the most downstream VNFs #2 in the LB section 23 based on the traffic ratio among the transfer routes in the LB section 23.

The route determination unit 53 calculates the traffic amounts flowing in the respective transfer routes such that the traffic amounts of the VNF #2 having a largest number of VNFs among a plurality of VNF groups 21 in the LB section 23 may be averaged. In the example of FIG. 8C, the traffic amounts of the respective proxies in the VNF #2 are 1/8. The traffic ratio of the LB 1A corresponding to 1/8 of the entire traffic amount or 1/4 of the traffic amount that the LB 1A receives is transmitted to the Proxy 1A via the FW 1A. Further, the traffic ratio of the LB 1A corresponding to 1/8 of the entire traffic amount or 1/4 of the traffic amount that the LB 1A receives is transmitted to the Proxy 1B via the FW 1B. The traffic ratio of the LB 1A corresponding to 1/8 of the entire traffic amount or 1/4 of the traffic amount that the LB 1A receives is transmitted to the Proxy 1C via the FW 1C.

Further, the traffic ratio of the LB 1A corresponding to 1/8 of the entire traffic amount or 1/4 of the traffic amount that the LB 1A receives is transmitted to the Proxy 1D via the FW 1A. The traffic ratio of the LB 1B corresponding to 1/8 of the entire traffic amount or 1/4 of the traffic amount that the LB 1B receives is transmitted to the Proxy 1A via the FW 1B. The traffic ratio of the LB 1B corresponding to 1/8 of the entire traffic amount or 1/4 of the traffic amount that the LB 1B receives is transmitted to the Proxy 1B via the FW 1C. The traffic ratio of the LB 1B corresponding to 1/8 of the entire traffic amount or 1/4 of the traffic amount that the LB 1B receives is transmitted to the Proxy 1C via the FW 1A. Further, the traffic ratio of the LB 1B corresponding to 1/8 of the entire traffic amount or 1/4 of the traffic amount that the LB 1B receives is transmitted to the Proxy 1D via the FW 1B. Assume that the traffic ratio of the Proxy 1A is 1/4 of the entire traffic amount, the traffic ratio of the Proxy 1B is 1/4 of the entire traffic amount; the traffic ratio of the Proxy 1C is 1/4 of the entire traffic amount; and the traffic ratio of the Proxy 1D is 1/4 of the entire traffic amount.

Figure 9A:
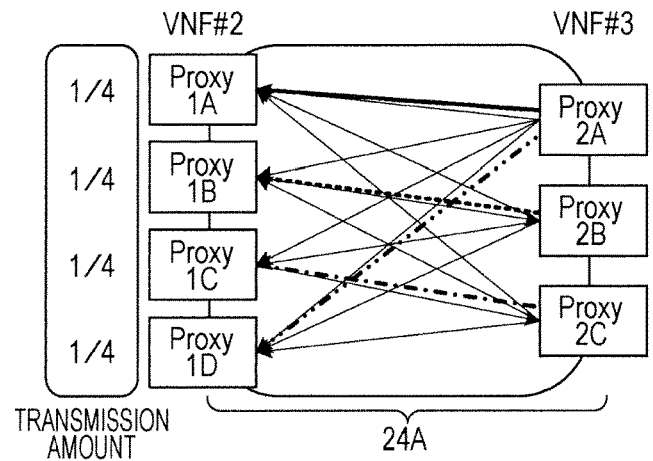
FIG. 9A illustrates an example of terminating destinations in a first LB-less section.

FIG. 9A illustrates an example of terminating destinations in the first LB-less section 24A. The terminating VNF group 21 in the first LB-less section 24A illustrated in FIG. 9A is, for example, the Proxy 2A to the Proxy 2C of the VNF #3. The route determination unit 53 determines the traffic ratio (reception amount) of the most downstream VNF #2 in the LB section 23 as the traffic ratio (transmission amount) of the most upstream VNF #2 in the first LB-less section 24A. The Proxy 1A transmits 1/4 of the entire traffic amount to the Proxy 2A, and the Proxy 1B transmits 1/4 of the entire traffic amount to the Proxy 2B. The Proxy 1C transmits 1/4 of the entire traffic amount to the Proxy 2C, and the Proxy 1D transmits 1/4 of the entire traffic amount to the Proxy 2A. The route determination unit 53 determines the most downstream terminating VNF group 21 (Proxy 2A to Proxy 2C in the VNF #3) as a terminating destination of the VNF #2 (Proxy 1A to Proxy 1D) in the first LB-less section 24A.

Figure 9B:
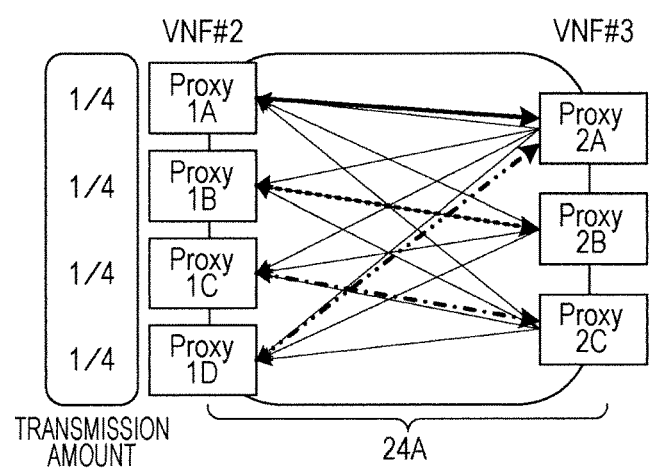
FIG. 9B illustrates an example of transfer routes in the first LB-less section.

FIG. 9B illustrates an example of transfer routes in the first LB-less section 24A. The route determination unit 53 determines transfer routes to which all routes between the VNF #2 and the VNF #3 in the first LB-less section 24A are distributed. Transfer routes are determined such that the traffic amounts passing through the respective transfer routes in the first LB-less section 24A become equal. The route determination unit 53 determines the transfer route between the Proxy 1A and the Proxy 2A, the transfer route between the Proxy 1B and the Proxy 2B, the transfer route between the Proxy 1C and the Proxy 2C, and the transfer route between the Proxy 1D and the Proxy 2A in the first LB-less section 24A.

Figure 9C:
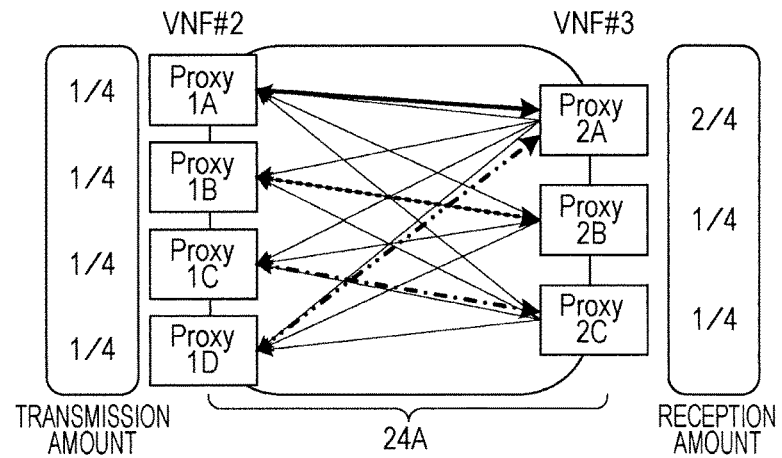
FIG. 9C illustrates an example of a traffic ratio (reception amount) of a terminating VNF group in the first LB-less section.

FIG. 9C illustrates an example of the traffic ratio (reception amount) of the most downstream VNF group 21 in the first LB-less section 24A. The route determination unit 53 determines the traffic ratio among transfer routes in the first LB-less section 24A based on the traffic ratio (transmission amount) of the VNF #2 and the transfer routes in the first LB-less section 24A. Further, the route determination unit 53 determines the traffic ratio (reception amount) of the most downstream VNF #3 in the first LB-less section 24A based on the traffic ratio among the transfer routes in the first LB-less section 24A. Assume that the traffic ratio of the Proxy 2A in the VNF #3 is 2/4 of the entire traffic amount; the traffic ratio of the Proxy 2B is 1/4 of the entire traffic amount; and the traffic ratio of the Proxy 2C is 1/4 of the entire traffic amount.

Figure 10A:
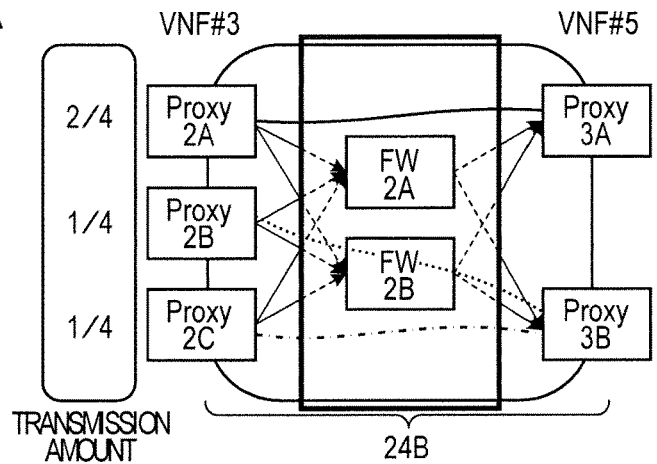
FIG. 10A illustrates an example of terminating destinations in a second LB-less section.

FIG. 10A illustrates an example of terminating destinations in the second LB-less section 24B. Assume that the terminating VNF group 21 in the second LB-less section 24B includes, for example, Proxy 3A and Proxy 3B of the VNF #5. The route determination unit 53 determines the traffic ratio (reception amount) of the most downstream VNF #3 in the first LB-less section 24A as the traffic ratio (transmission amount) of the most upstream VNF #3 in the second LB-less section 24B. The Proxy 2A transmits 2/4 of the entire traffic amount to the Proxy 3A, the Proxy 2B transmits 1/4 of the entire traffic amount to the Proxy 3B, and the Proxy 2C transmits 1/4 of the entire traffic amount to the Proxy 3B. The route determination unit 53 determines the most downstream terminating VNF group 21 (Proxy 3A and Proxy 3B in the VNF #5) as a terminating destination of the Proxy 2A to the Proxy 2C in the most upstream VNF #3 in the second LB-less section 24B.

Figure 10B:
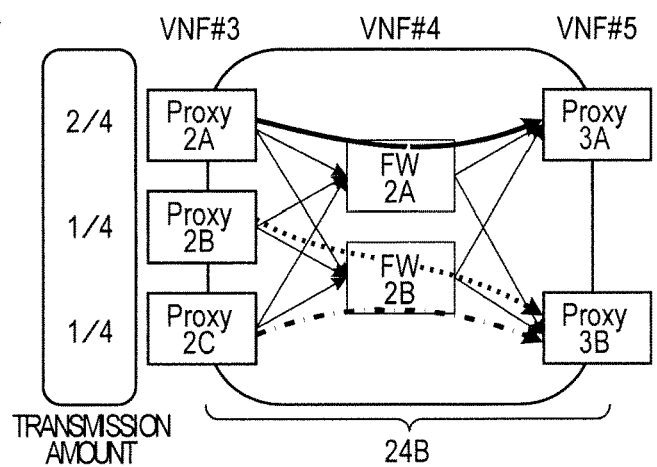
FIG. 10B illustrates an example of transfer routes in the second LB-less section.

FIG. 10B illustrates an example of transfer routes in the second LB-less section 24B. The route determination unit 53 determines transfer routes to which all routes between the VNF #3 and the VNF #5 in the second LB-less section 24B are distributed. There are various methods of determining the transfer route. The method used in the embodiment determines routes, for example, in the descending order of the traffic amount. In this case, the route from the Proxy 2A to the Proxy 3A is determined first. When determining the route, a VNF 12 having a least passing traffic amount in each stage is determined as a via node. Since the FW 2A and FW 2B have no passing traffic, the FW 2A is selected, and transfer routes of Proxy 2A→FW 2A→Proxy 3A are calculated. Next, the route from the Proxy 2B having a large bandwidth to the Proxy 3B is determined. Since 2/4 of the entire traffic has passed through the FW 2A, the FW 2B is selected, and the transfer route of Proxy 2B→FW 2B→Proxy 3B is calculated. All transfer routes are determined in the same manner by repeating the above steps. The route determination unit 53 determines the transfer route between the Proxy 2A and the Proxy 3A, the transfer route between the Proxy 2B and the Proxy 3B, and the transfer route between the Proxy 2C and the Proxy 3B in the second LB-less section 24B.

Figure 10C:
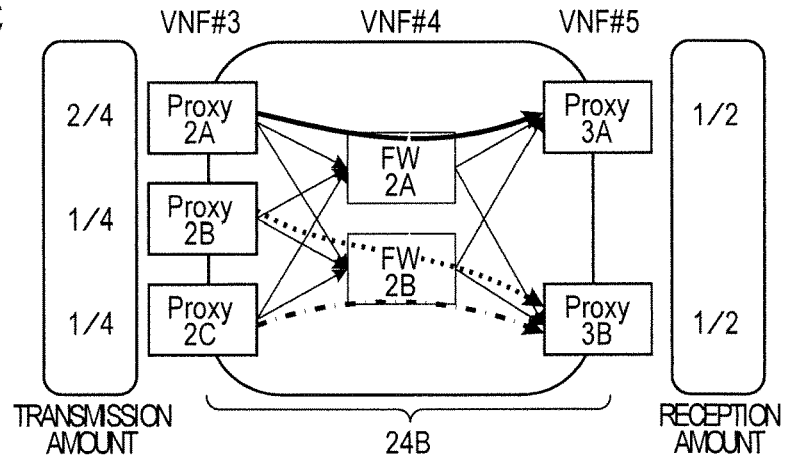
FIG. 10C illustrates an example of a traffic ratio (reception amount) of a terminating VNF group in the second LB-less section.

FIG. 10C illustrates an example of the traffic ratio (reception amount) of the most downstream terminating VNF group 21 in the second LB-less section 24B. The route determination unit 53 determines the traffic ratio among transfer routes in the second LB-less section 24B based on the traffic ratio (transmission amount) of the VNF #3 and transfer routes in the second LB-less section 24B. Further, the route determination unit 53 determines the traffic ratio (reception amount) of a terminating VNF #5 in the second LB-less section 24B based on traffic ratio among the transfer routes in the second LB-less section 24B. Assume that the traffic ratio of the Proxy 3A of the VNF #5 is 1/2 of the entire traffic amount, and the traffic ratio of the Proxy 3B is 1/2 of the entire traffic amount.

The third determination unit 43 registers setting information into the setting unit 44 based on transfer routes in the LB section 23 and the LB-less section 24 and the traffic ratio among transfer routes. Setting information includes the traffic ratio of the LB 1A, the traffic ratio of the LB 1B, and transfer routes among the LB 1A, LB 1B, FW 1A to FW 1C, Proxy 1A to Proxy 1D, Proxy 2A to Proxy 2C, FW 2A, FW 2B, Proxy 3A, and Proxy 3B.

The traffic ratio of the LB 1A is set such that 1/4 of the traffic is transmitted to the Proxy 1A, 1/4 of the traffic is transmitted to the Proxy 1B, 1/4 of the traffic is transmitted to the Proxy 1C, and 1/4 of the traffic is transmitted to the Proxy 1D. The traffic ratio of the LB 1B is set such that 1/4 of the traffic is transmitted to the Proxy 1A, 1/4 of the traffic is transmitted to the Proxy 1B, 1/4 of the traffic is transmitted to the Proxy 1C, and 1/4 of the traffic is transmitted to the Proxy 1D.

Transfer routes of the LB 1A are set such that the traffic destined for the Proxy 1A is transferred to the FW 1A; the traffic destined for the Proxy 1B is transferred to the FW 1B; the traffic destined for the Proxy 1C is transferred to the FW 1C; and the traffic destined for the Proxy 1D is transferred to the FW 1A. Transfer routes of LB 1B are set such that the traffic destined for the Proxy 1A is transferred to the FW 1B; the traffic destined for the Proxy 1B is transferred to the FW 1C; the traffic destined for the Proxy 1C is transferred to the FW 1A; and the traffic destined for the Proxy 1D is transferred to the FW 1B.

Transfer routes of the FW 1A are set such that the traffic destined for the Proxy 1A is transferred to the Proxy 1A; the traffic destined for the Proxy 1C is transferred to the Proxy 1C; and the traffic destined for the Proxy 1D is transferred to the Proxy 1D. Transfer routes of the FW 1B are set such that the traffic destined for the Proxy 1A is transferred to the Proxy 1A; the traffic destined for the Proxy 1B is transferred to the Proxy 1B; and the traffic destined for the Proxy 1D is transferred to the Proxy 1D. Transfer routes of the FW 1C are set such that the traffic destined for the Proxy 1B is transferred to the Proxy 1B, and the traffic destined for the Proxy 1C is transferred to the Proxy 1C.

Setting of the Proxy 1A as a high-order Proxy is transmitted to the Proxy 2A, and setting of the Proxy 1B as a high-order Proxy is transmitted to the Proxy 2B. Setting of the Proxy 1C as a high-order Proxy is transmitted to the Proxy 2C, and setting of the Proxy 1D as a high-order Proxy is transmitted to the Proxy 2A.

The transfer route of the Proxy 1A is set such that the traffic destined for the Proxy 2A is transferred to the Proxy 2A. The transfer route of the Proxy 1B is set such that the traffic destined for the Proxy 2B is transferred to the Proxy 2B. The transfer route of the Proxy 1C is set such that the traffic destined for the Proxy 2C is transferred to the Proxy 2C. The transfer route of the Proxy 1D is set such that the traffic destined for the Proxy 2A is transferred to the Proxy 2A.

Setting of the Proxy 2A as a high-order Proxy is transmitted to the Proxy 3A, and setting of the Proxy 2B as a high-order Proxy is transmitted to the Proxy 3B. Setting of the Proxy 2C as a high-order Proxy is transmitted to the Proxy 3B.

The transfer route of the Proxy 2A is set such that the traffic destined for the Proxy 3A is transferred to the FW 2A. The transfer route of the Proxy 2B is set such that the traffic destined for the Proxy 3B is transferred to the FW 2B. The transfer route of the Proxy 2C is set such that the traffic destined for the Proxy 3B is transferred to the FW 2B. The transfer route of the FW 2A is set such that the traffic destined for the Proxy 3A is transferred to the Proxy 3A. The transfer route of the FW 2B is set such that the traffic destined for the Proxy 3B is transferred to the Proxy 3B.

Figure 11:
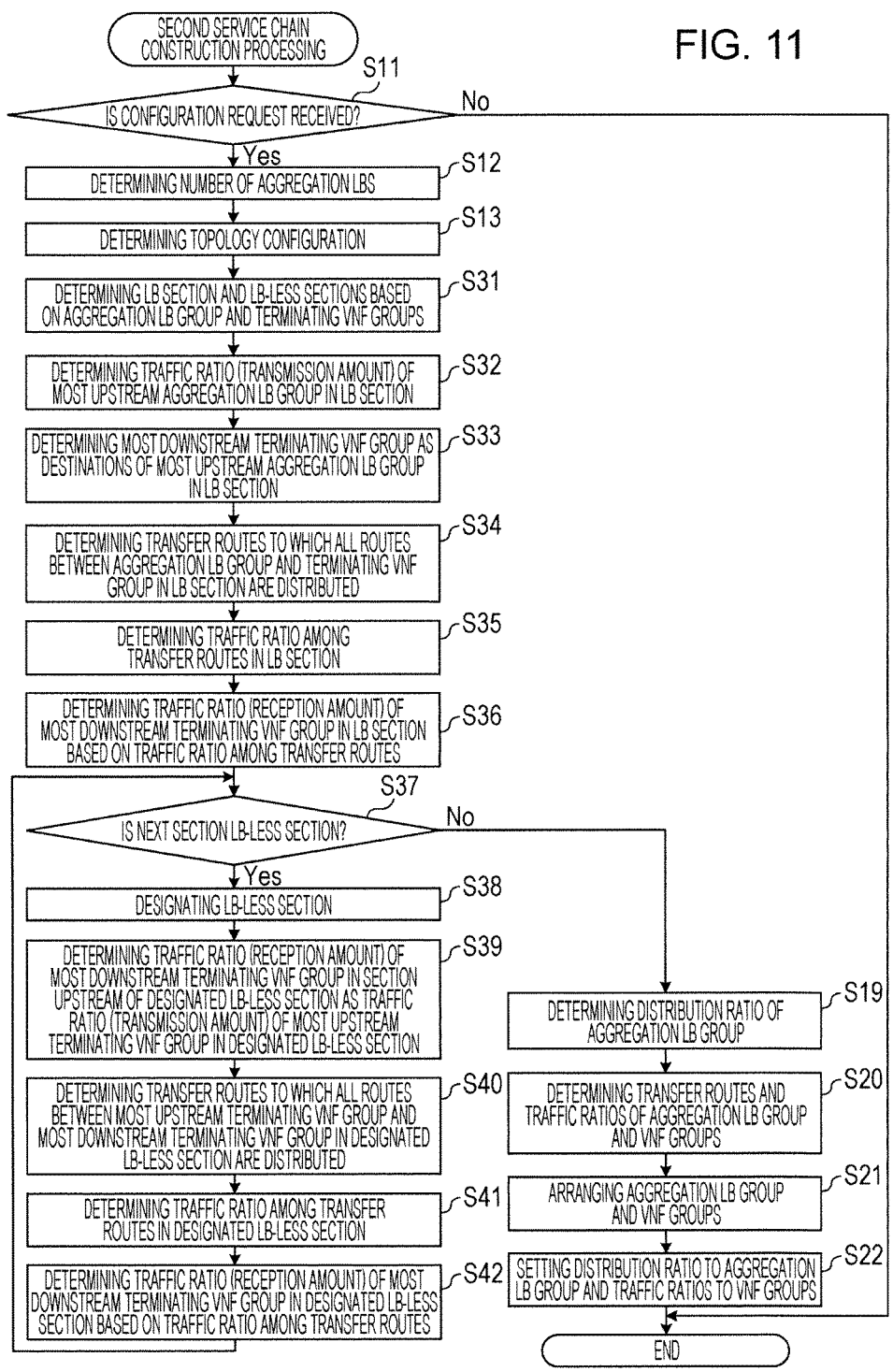
FIG. 11 is a flowchart illustrating an example of a processing operation of a management server related to a second service chain construction processing.

Next, operation of the service chain system 1 according to the first embodiment is described. FIG. 11 is a flowchart illustrating an example of a processing operation of the processor 36 in the management server 3 related to a second service chain construction processing.

The section determination unit 51 in the second determination unit 42 determines the topology configuration of the service chain 20B in the operation S13 and then determines the LB section 23 and LB-less section 24 based on the aggregation LB group 22 and terminating VNF groups 21 of the service chain 20B (operation S31). The route determination unit 53 in the second determination unit 42 determines the traffic ratio (transmission amount) of the most upstream aggregation LB group 22 in the LB section 23 (operation S32). The route determination unit 53 determines the most downstream terminating VNF group 21 as a terminating destination of the most upstream aggregation LB group 22 in the LB section 23 (operation S33). The route determination unit 53 determines the VNF #2 (Proxy 1A to Proxy 1D) as the terminating destination as illustrated in FIG. 8A.

The route determination unit 53 determines transfer routes to which all routes between the aggregation LB group 22 and a terminating VNF group 21 in the LB section 23 are distributed (operation S34). The route determination unit 53 determines three routes between the LB 1A and the VNF #2 and three routes between the LB 1B and the VNF #2 by the shortest route calculation as illustrated in FIG. 8B. The route determination unit 53 determines the traffic ratio among transfer routes in the LB section 23 based on the traffic ratio (transmission amount) of the aggregation LB group 22 in the LB section 23 and transfer routes in the LB section 23 (operation S35).

The route determination unit 53 determines the traffic ratio (reception amount) of the most downstream terminating VNF group 21 in the LB section 23 based on the traffic ratio among the transfer routes in the LB section 23 (operation S36).

The designation unit 52 in the second determination unit 42 determines whether the next section is a LB-less section 24 (operation S37). In a case where the next section is the LB-less section 24 (operation S37: Yes), the designation unit 52 designates the LB-less section 24 (operation S38). The route determination unit 53 determines the traffic ratio (reception amount) of the most downstream terminating VNF group 21 in a section upstream of the designated LB-less section as the traffic ratio (transmission amount) of the most upstream VNF group 21 in the designated LB-less section 24 (operation S39).

The route determination unit 53 determines transfer routes to which all routes between the most upstream VNF group 21 and the most downstream VNF group 21 in the designated LB-less section 24 are distributed (operation S40). The route determination unit 53 determines the traffic ratio among transfer routes in the designated LB-less section 24 (operation S41).

The route determination unit 53 determines the traffic ratio (reception amount) of the most downstream terminating VNF group 21 in the designated LB-less section 24 based on the traffic ratio among the transfer routes in the designated LB-less section 24 (operation S42). Then, the route determination unit 53 proceeds to the operation S37 to determine whether the next section is a LB-less section 24.

In a case where the next section is not a LB-less section 24 (operation S37: No), the designation unit 52 proceeds to the operation S19 to determine the distribution ratio of the aggregation LB group 22. As a result, a service chain 20B according to the configuration request may be arranged on the virtual area.

The management server 3 of the first embodiment partitions the service chain 20B into the LB section 23 and LB-less section 24 based on the locations of the aggregation LB group 22 and a terminating VNF group 21 arranged in the service chain 20B. The management server 3 designates the LB section 23 and the LB-less section 24 one by one in the ascending order from the most upstream to the most downstream of the service chain 20B. The management server 3 determines the traffic ratio (transmission amount) of the most upstream, the traffic ratio among the transfer routes, and the traffic ratio of the most downstream, for each designated section of the LB section 23 and the LB-less section 24. Then, the management server 3 determines the distribution ratio of the aggregation LB group 22 and the traffic ratios of the VNF groups 21 in the service chain 20B based on the traffic ratio of the most upstream, the traffic ratio among the transfer routes, and the traffic ratio of the most downstream in each of the LB section 23 and the LB-less section 24. As a result, even when a terminating VNF group 21 is arranged downstream of a first terminating VNF group 21, the service chain 20B may distribute the traffic amount reflecting the number of VNF groups 21 downstream of the first terminating VNF group 21. Furthermore, a low-cost service chain 20B may be constructed by reducing virtual resources allocated to the LB 13.

The management server 3 designates the LB section 23, first LB-less section 24A, and second LB-less section 24B in this order in the service chain 20B. In a case where the first LB-less section 24A is designated, the management server 3 sets the traffic ratio of the most downstream VNF group 21 in the LB section 23 being an upstream section as the traffic ratio of the most upstream VNF group 21 in the first LB-less section 24A. In a case where the second LB-less section 24B is designated, the management server 3 sets the traffic ratio of the most downstream VNF group 21 in the first LB-less section 24A being an upstream section as the traffic ratio of the most upstream VNF group 21 in the second LB-less section 24B. Thus, processing load for setting the traffic ratio may be reduced.

When determining the traffic ratio among transfer routes in the LB section 23 in the operation S35 illustrated in FIG. 11 or when determining the traffic ratio among transfer routes in the LB-less section 24 in the operation S41, the management server 3 determines whether a load distribution target VNF group 21 in the section is designated. In a case where a load distribution target VNF group 21 in the section is designated, the processor 36 may determine the traffic ratio among the transfer routes in the section such that traffic amounts of VNFs 12 in the load distribution target VNF group 21 become equal. In a case where a load distribution target VNF group 21 in the section is not designated, the processor 36 determines the traffic ratio among the transfer routes such that the traffic amounts of VNFs 12 in a VNF group having a largest number of VNFs in the section 21 become equal.

Figure 12:
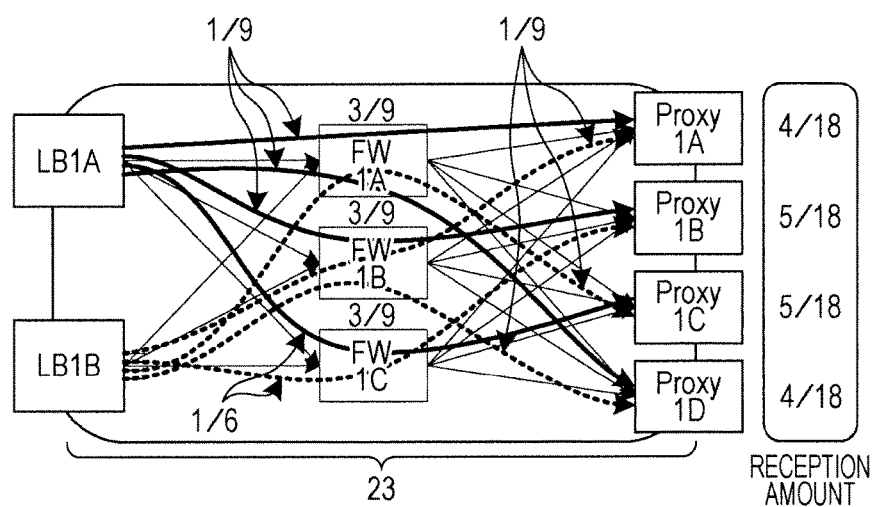
FIG. 12 illustrates an example of transfer routes and traffic ratios of VNF groups in the LB section.

FIG. 12 illustrates an example of transfer routes in the LB section 23 and traffic ratios of VNF groups 21. FIG. 12 also illustrates that traffic ratio in the VNF #1 (FW 1A to FW 1C) in the LB section 23 is equally set to 1/3 of the entire traffic amount; three routes are set to the FW 1A and FW 1B; and two routes are set to the FW 1C. In a case where the VNF #1 is designated as a load distribution target VNF group 21 in the LB section 23, the route determination unit 53 determines the traffic ratio among the transfer routes in the LB section 23 such that the traffic amounts of the load distribution target VNF #1 become equal. The route determination unit 53 determines the traffic ratio of the VNF #2 based on the traffic ratio among the transfer routes in the LB section 23.

In the example of FIG. 12, the traffic amounts of the respective Proxies in the VNF #2 are 1/9. The traffic ratio of the LB 1A corresponding to 1/9 of the entire traffic amount or 2/9 of the traffic amount that the LB 1A receives is transmitted to the Proxy 1A via the FW 1A. Further, the traffic ratio of the LB 1A corresponding to 1/9 of the entire traffic amount or 2/9 of the traffic amount that the LB 1A receives is transmitted to the Proxy 1B via the FW 1B. The traffic ratio of the LB 1A corresponding to 1/9 of the entire traffic amount or 2/9 of the traffic amount that the LB 1A receives is transmitted to the Proxy 1C via the FW 1C. Further, the traffic ratio of the LB 1A corresponding to 1/6 of the entire traffic amount or 3/9 of the traffic amount that the LB 1A receives is transmitted to the Proxy 1D via the FW 1A. The traffic ratio of the LB 1B corresponding to 1/9 of the entire traffic amount or 2/9 of the traffic amount that the LB 1B receives is transmitted to the Proxy 1A via the FW 1B. Further, the traffic ratio of the LB 1B corresponding to 1/6 of the entire traffic amount or 3/9 of the traffic amount that the LB 1B receives is transmitted to the Proxy 1B via the FW 1C. The traffic ratio of the LB 1B corresponding to 1/9 of the entire traffic amount or 2/9 of the traffic amount that the LB 1B receives is transmitted to the Proxy 1C via the FW 1A. Further, the traffic ratio of the LB 1B corresponding to 1/9 of the entire traffic amount or 2/9 of the traffic amount that the LB 1B receives is transmitted to the Proxy 1D via the FW 1B. As a result, the traffic ratio of the Proxy 1A in the VNF #2 is 4/18 of the entire traffic amount, and the traffic ratio of the Proxy 1B is 5/18 of the entire traffic amount. Further, the traffic ratio of the Proxy 1C is 5/18 of the entire traffic amount, and the traffic ratio of the Proxy 1D is 4/18 of the entire traffic amount.

The management server 3 of the first embodiment calculates the transfer routes and traffic ratios for each section in the ascending order of most upstream LB section 23→first LB-less section 24A→second LB-less section 24B. However, the order is not limited to the ascending order of LB section 23→first LB-less section 24A→second LB-less section 24B, and may be altered as appropriate. For example, the transfer routes and traffic ratios for each section may be calculated in the descending order of second LB-less section 24B→first LB-less section 24A→LB section 23. An embodiment thereof is described below as a second embodiment. Description of duplicated configuration and operation of the same components as in the service chain system 1 of the first embodiment described above is omitted by assigning same reference numerals.

Second Embodiment

Figure 13:
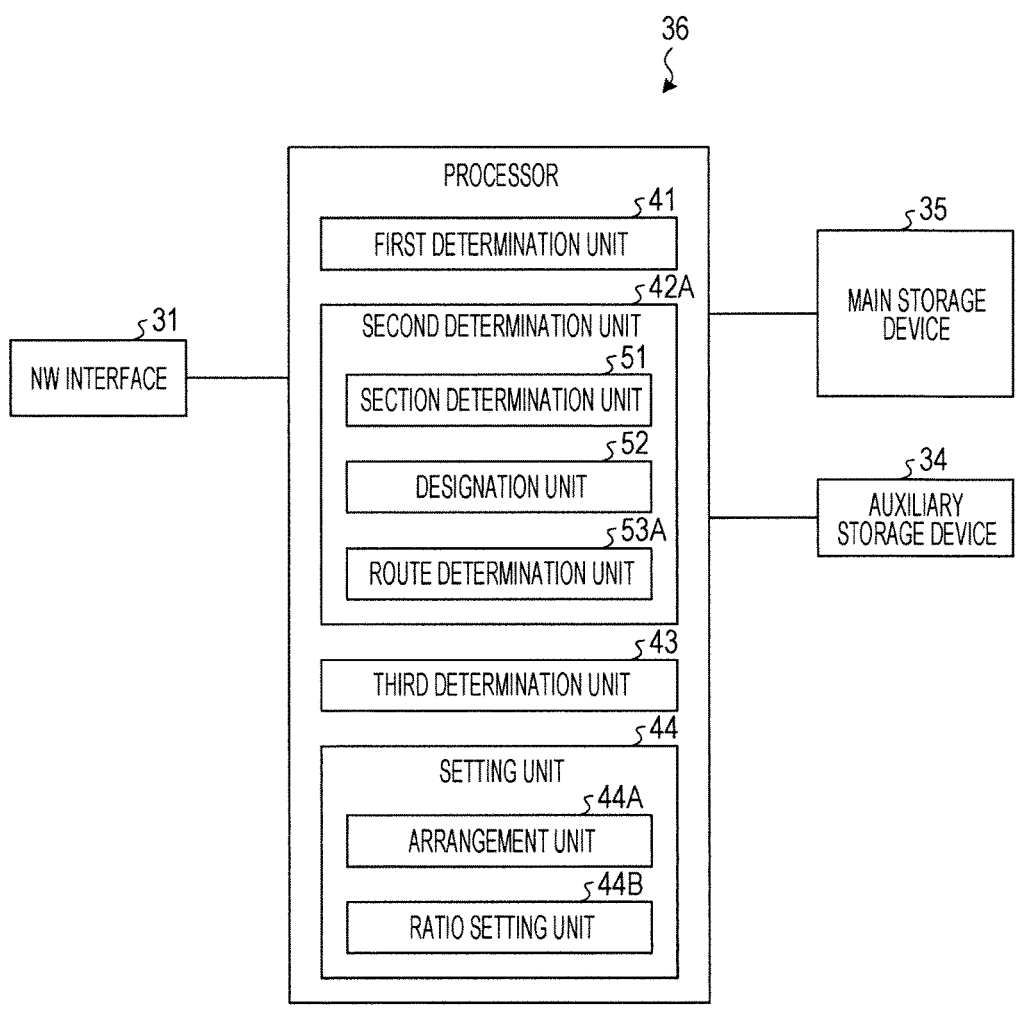
FIG. 13 illustrates an example of a functional configuration of a processor in a management server of a second embodiment.

FIG. 13 illustrates an example of a functional configuration of a processor 36 in a management server 3 according to the second embodiment. A designation unit 52 in a second determination unit 42A illustrated in FIG. 13 designates sections one by one in the descending order of second LB-less section 24B→first LB-less section 24A→LB section 23. The route determination unit 53A in the second determination unit 42A determines the distribution ratio of the aggregation LB group 22 and traffic ratios among transfer routes of the VNF groups 21 of the service chain 20B based on the transfer routes and the traffic ratios of the LB section 23 and LB-less section 24.

Figure 14A:
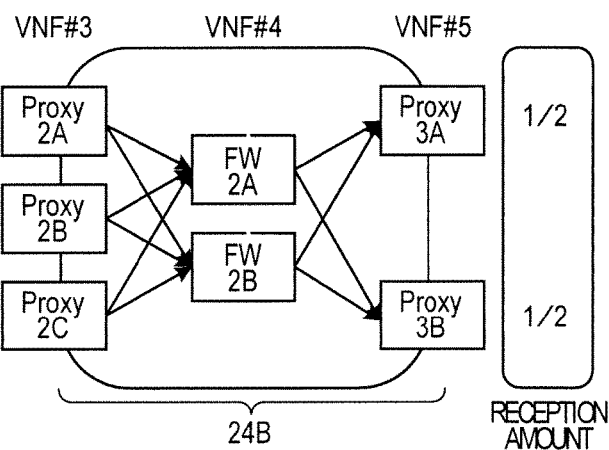
FIG. 14A illustrates an example of a traffic ratio (reception amount) of the most downstream terminating VNF group in the second LB-less section.

FIG. 14A illustrates an example of the traffic ratio (reception amount) of the most downstream terminating VNF group 21 in the second LB-less section 24B. The designation unit 52 designates the most downstream second LB-less section 24B of the service chain 20B. As there are two terminating VNFs 12 in the terminating destination VNF group 21 in the second LB-less section 24B, the route determination unit 53A determines the traffic ratio (reception amount) of the terminating VNF group 21 in the second LB-less section 24B as 1/2 of the entire traffic amount.

Figure 14B:
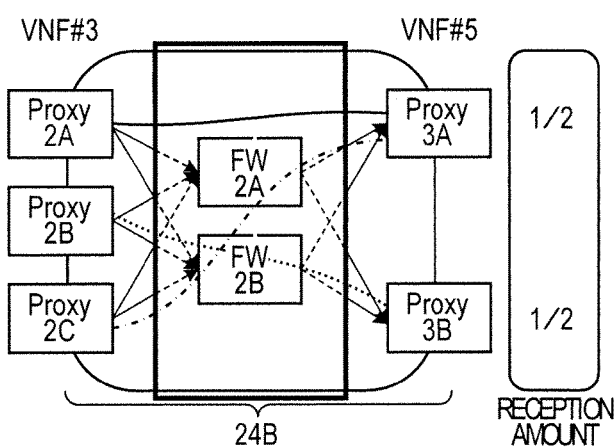
FIG. 14B illustrates an example of transfer routes in the second LB-less section.

FIG. 14B illustrates an example of transfer routes in the second LB-less section 24B. The route determination unit 53A determines the Proxy 2A to the Proxy 2C in the most upstream VNF #3 as a transmission source of the most downstream terminating VNF group 21 (Proxy 3A and Proxy 3B in the VNF #5) in the second LB-less section 24B. The route determination unit 53A determines transfer routes to which all routes between the VNF #3 and the VNF #5 in the second LB-less section 24B are distributed. The route determination unit 53A determines the transfer route between the Proxy 2A and the Proxy 3A, the transfer route between the Proxy 2B and the Proxy 3B, and the transfer route between the Proxy 2C and the Proxy 3A in the second LB-less section 24B.

Figure 14C:
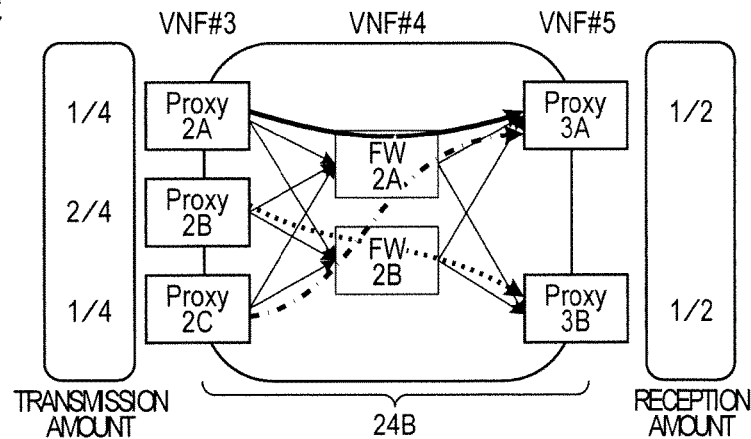
FIG. 14C illustrates an example of a traffic ratio (transmission amount) of the most upstream terminating VNF group in the second LB-less section.

FIG. 14C illustrates an example of the traffic ratio (transmission amount) of the most upstream terminating VNF group 21 in the second LB-less section 24B. The route determination unit 53A determines the traffic ratio among transfer routes in the second LB-less section 24B based on the traffic ratio (reception amount) and transfer route of the most downstream VNF group 21 in the second LB-less section 24B. Further, the route determination unit 53A determines the traffic ratio (transmission amount) of the most upstream VNF group 21 in the second LB-less section 24B based on the traffic ratio among transfer routes in the second LB-less section 24B. The traffic ratio of the Proxy 2A is 1/4 of the entire traffic amount, the traffic ratio of the Proxy 2B is 2/4 of the entire traffic amount, and the traffic ratio of the Proxy 2C is 1/4 of the entire traffic amount.

Figure 15A:
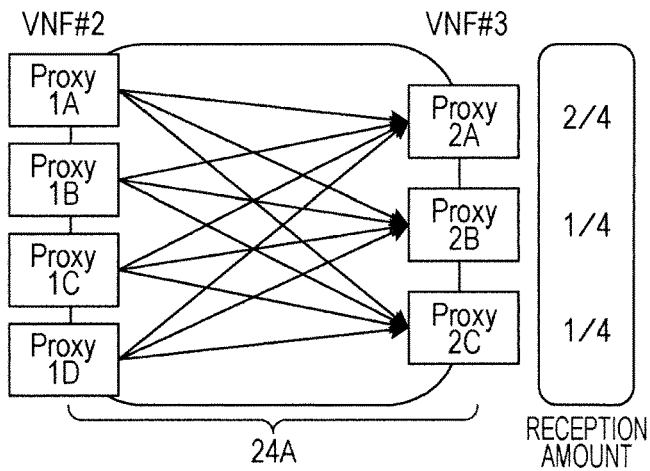
FIG. 15A illustrates an example of a traffic ratio (reception amount) of the most downstream terminating VNF group in the first LB-less section.

FIG. 15A illustrates an example of the traffic ratio (reception amount) of the most downstream terminating VNF group 21 in the first LB-less section 24A. The route determination unit 53A determines the traffic ratio (transmission amount) of the most upstream VNF group 21 in the second LB-less section 24B as the traffic ratio (reception amount) of the most downstream VNF group 21 in the first LB-less section 24A. The Proxy 1A receives 2/4 of the entire traffic amount for the Proxy 3A; the Proxy 1B receives 1/4 of the entire traffic amount for the Proxy 3B; and the Proxy 1C receives 1/4 of the entire traffic amount for the Proxy 2C.

Figure 15B:
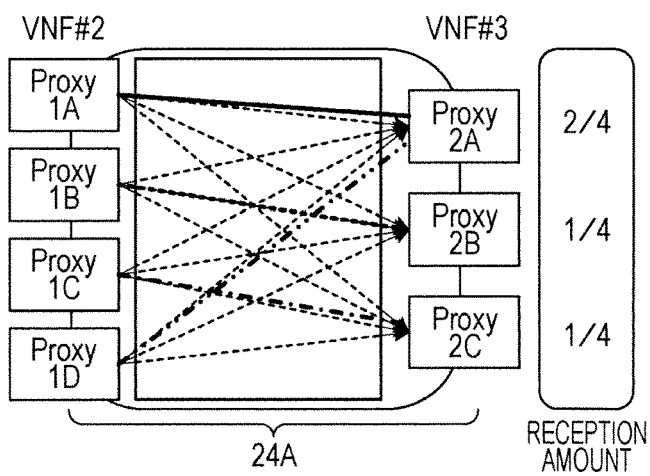
FIG. 15B illustrates an example of transfer routes in the first LB-less section.

FIG. 15B illustrates an example of transfer routes in the first LB-less section 24A. The route determination unit 53A determines the Proxy 1A to the Proxy 1D in the most upstream VNF #2 that becomes a transmission source of the most downstream terminating VNF group 21 (Proxy 2A to Proxy 2C in the VNF #3) in the first LB-less section 24A. The route determination unit 53A determines transfer routes to which all routes between the VNF #2 and the VNF #3 in the first LB-less section 24A are distributed. The route determination unit 53A determines the transfer route between the Proxy 1A and the Proxy 2A, the transfer route between the Proxy 1B and the Proxy 2B, the transfer route between the Proxy 1C and Proxy 2B, and the transfer route between the Proxy 1C and the Proxy 2C in the first LB-less section 24A.

Figure 15C:
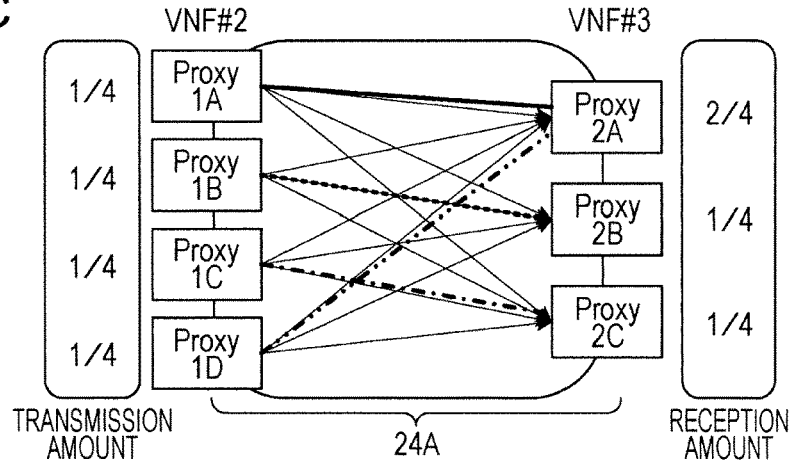
FIG. 15C illustrates an example of a traffic ratio (transmission amount) of the most upstream terminating VNF group in the first LB-less section.

FIG. 15C illustrates an example of the traffic ratio (transmission amount) of the most upstream terminating VNF group 21 in the first LB-less section 24A. The route determination unit 53A determines the traffic ratio amount transfer routes in the first LB-less section 24A based on the traffic ratio (reception amount) and transfer route of the most downstream VNF group 21 in the first LB-less section 24A. Further, the route determination unit 53A determines the traffic ratio (transmission amount) of the most upstream VNF group 21 in the first LB-less section 24A based on the traffic ratio among transfer routes in the first LB-less section 24A. Assume that the traffic ratio of the Proxy 1A is 1/4 of the entire traffic amount; the traffic ratio of the Proxy 1B is 1/4 of the entire traffic amount; the traffic ratio of the Proxy 1C is 1/4 of the entire traffic amount; and the traffic ratio of the Proxy 1D is 1/4 of the entire traffic amount.

Figure 16A:
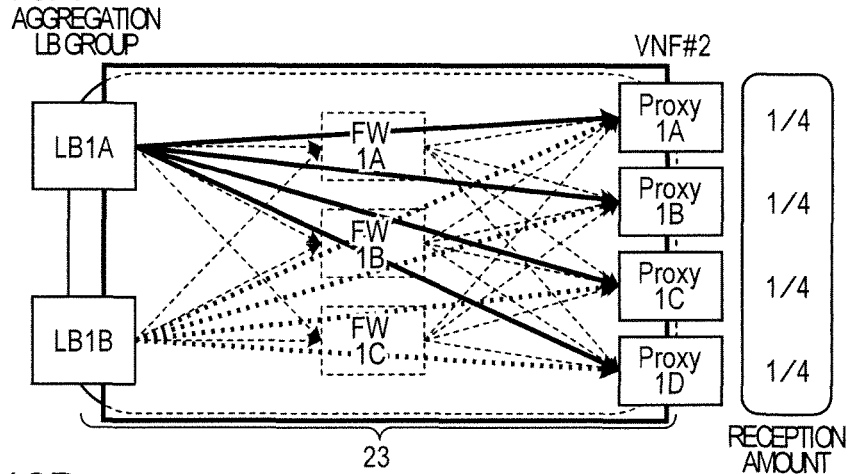
FIG. 16A illustrates an example of a traffic ratio (reception amount) of the most downstream terminating VNF group in the LB section.

FIG. 16A illustrates an example of the traffic ratio (reception amount) of the most downstream terminating VNF group 21 in the LB section 23. The route determination unit 53A determines the traffic ratio (transmission amount) of the most upstream VNF group 21 with the first LB-less section 24A as the traffic ratio (reception amount) of the most downstream VNF group 21 in the LB section 23.

Figure 16B:
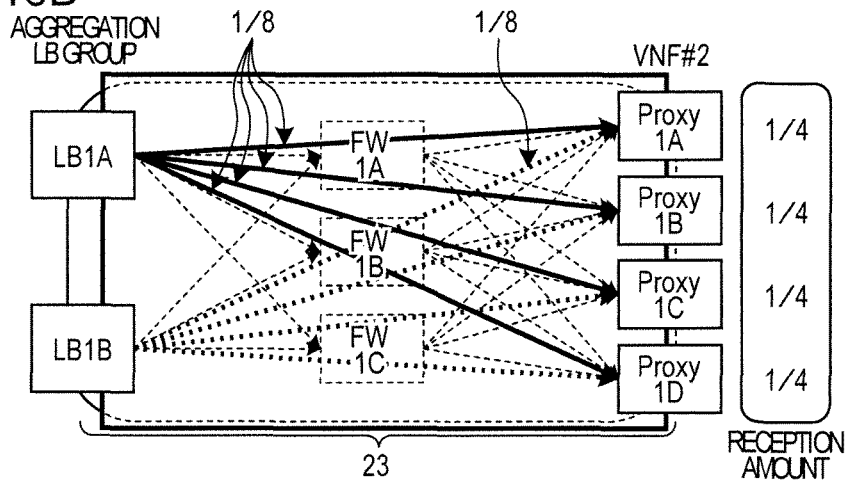
FIG. 16B illustrates an example of transfer routes in the LB section.

FIG. 16B illustrates an example of transfer routes in the LB section 23. The route determination unit 53A determines the LB 1A and LB 1B in the most upstream aggregation LB group 22 that becomes a transmission source of the most downstream terminating VNF group 21 (Proxy 1A to Proxy 1D in the VNF #2) in the LB section 23. The route determination unit 53A determines transfer routes to which all routes between the aggregation LB group 22 and the VNF #2 in the LB section 23 are distributed. The route determination unit 53A determines the transfer route between the LB 1A and the Proxy 1A, the transfer route between the LB 1A and the Proxy 1B, the transfer route between the LB 1A and the Proxy 1C, and the transfer route between the LB 1A and the Proxy 1D in the LB section 23. The route determination unit 53A determines the transfer route between the LB 1B and the Proxy 1A, the transfer route between the LB 1B and the Proxy 1B, the transfer route between the LB 1B and the Proxy 1C, and the traffic route between the LB 1B and the Proxy 1D in the LB section 23.

Figure 16C:
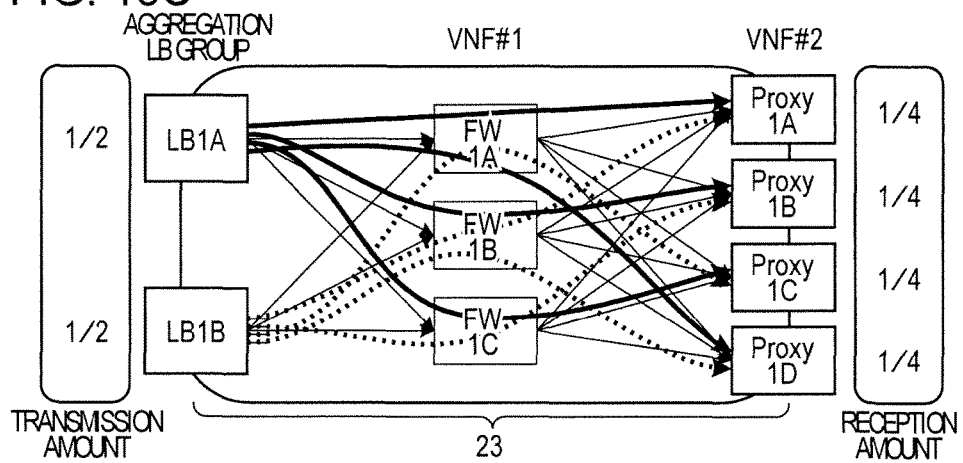
FIG. 16C illustrates an example of a traffic ratio (transmission amount) of the most upstream terminating VNF group in the LB section.

FIG. 16C illustrates an example of the traffic ratio (transmission amount) of the most upstream aggregation LB group 22 in the LB section 23. The route determination unit 53A determines the traffic ratio among transfer routes in the LB section 23 based on the traffic ratio (reception amount) and transfer route of the most downstream VNF group 21 in the LB section 23. Further, the route determination unit 53A determines the traffic ratio (transmission amount) of the most upstream aggregation LB group 22 in the LB section 23 based on the traffic ratio among the transfer routes in the LB section 23. Assume that the traffic ratio of the LB 1A is 1/2 of the entire traffic amount, and the traffic ratio of the LB 1B is 1/2 of the entire traffic amount.

The third determination unit 43 registers setting information into the setting unit 44 based on the transfer routes in the LB section 23 and LB-less section 24 and the traffic ratio among the transfer routes. Setting information includes the traffic ratio of the LB 1A, the traffic ratio of the LB 1B, and transfer routes among LB 1A, LB 1B, FW 1A to FW 1C, Proxy 1A to Proxy 1D, Proxy 2A to Proxy 2C, FW 2A, FW 2B, Proxy 3A, and Proxy 3B.

The traffic ratio of the LB 1A is set such that 1/4 of the traffic is transmitted to the Proxy 1A; 1/4 of the traffic is transmitted to the Proxy 1B; 1/4 of the traffic is transmitted to the Proxy 1C; and 1/4 of the traffic is transmitted to the Proxy 1D. The traffic ratio of the LB 1B is set such that 1/4 of the traffic is transmitted to the Proxy 1A, 1/4 of the traffic is transmitted to the Proxy 1B, 1/4 of the traffic is transmitted to the Proxy 1C, and 1/4 of the traffic is transmitted to the Proxy 1D.

Transfer routes of the LB 1A are set such that the traffic destined for the Proxy 1A is transferred to the FW 1A; the traffic destined for the Proxy 1B is transferred to the FW 1B; the traffic destined for the Proxy 1C is transferred to the FW 1C; and the traffic destined for the Proxy 1D is transferred to the FW 1A. Transfer routes of the LB 1B are set such that the traffic destined for the Proxy 1A is transferred to the FW 1B; the traffic destined for the Proxy 1B is transferred to the FW 1C; the traffic destined for the Proxy 1C is transferred to the FW 1A; and the traffic destined for the Proxy 1D is transferred to the FW 1B.

Transfer routes of the FW 1A are set such that the traffic destined for the Proxy 1A is transferred to the Proxy 1A; the traffic destined for the Proxy 1C is transferred to the Proxy 1C; and the traffic destined for the Proxy 1D is transferred to the Proxy 1D. Transfer routes of the FW 1B are set such that the traffic destined for the Proxy 1A is transferred to the Proxy 1A; the traffic destined for the Proxy 1B is transferred to the Proxy 1B; and the traffic destined for the Proxy 1D is transferred to the Proxy 1D. Transfer routes of the FW 1C are set such that the traffic destined for the Proxy 1B is transferred to the Proxy 1B, and the traffic destined for the Proxy 1C is transferred to the Proxy 1C.

Setting of the Proxy 1A as a high-order Proxy is transmitted to the Proxy 2A, and setting of the Proxy 1B as a high-order Proxy is transmitted to the Proxy 2B. Setting of the Proxy 1C as a high-order Proxy is transmitted to the Proxy 2C, and setting of the Proxy 1D as a high-order Proxy is transmitted to the Proxy 2A.

The transfer route of the Proxy 1A is set such that the traffic destined for the Proxy 2A is transferred to the Proxy 2A. The transfer route of the Proxy 1B is set such that the traffic destined for the Proxy 2B is transferred to the Proxy 2B. The transfer route of Proxy 1C is set such that the traffic destined for the Proxy 2C is transferred to the Proxy 2C. The transfer route of the Proxy 1D is set such that the traffic destined for the Proxy 2A is transferred to the Proxy 2A.

Setting of the Proxy 2A as a high-order Proxy is transmitted to the Proxy 3A, and setting of the Proxy 2B as a high-order Proxy is transmitted to the Proxy 3B. Setting of the Proxy 2C as a high-order Proxy is transmitted to the Proxy 3B.

The transfer route of the Proxy 2A is set such that the traffic destined for the Proxy 3A is transferred to the FW 2A. The transfer route of the Proxy 2B is set such that the traffic destined for the Proxy 3B is transferred to the FW 2B. The transfer route of the Proxy 2C is set such that the traffic destined for the Proxy 3B is transferred to the FW 2B. The transfer route of the FW 2A is set such that the traffic destined for the Proxy 3A is transferred to the Proxy 3A. The transfer route of the FW 2B is set such that the traffic destined for the Proxy 3B is transferred to the Proxy 3B.

Next, operation of the service chain system 1 according to the second embodiment is described. FIG. 17 is a flowchart illustrating an example of a processing operation of a processor 36 in a management server 3 related to a third service chain construction processing.

The section determination unit 51 in the second determination unit 42A determines the topology configuration of the service chain 20B in the operation S13 and then determines the LB section 23 and LB-less section 24 based on the aggregation LB group 22 and a terminating VNF group 21 of the service chain 20B (operation S51).

The route determination unit 53A in the second determination unit 42A designates the most downstream LB-less section 24 of the service chain 20B (operation S52), and determines the traffic ratio (reception amount) of the most downstream terminating VNF group 21 in the designated LB-less section 24 (operation S53).

The route determination unit 53A determines transfer routes to which all routes between the most upstream VNF group 21 and the most downstream terminating VNF group 21 in the designated LB-less section 24 are distributed (operation S54). The route determination unit 53A determines the traffic ratio among transfer routes in the designated LB-less section 24 (operation S55).

The route determination unit 53A determines the traffic ratio (transmission amount) of the most upstream terminating VNF group 21 in the designated LB-less section 24 based on the traffic ratio among transfer routes in the designated LB-less section 24 (operation S56).

The designation unit 52 in the second determination unit 42A determines whether the next section is a LB-less section 24 in the descending order (operation S57). The descending order is, for example, an order of second LB-less section 24B→first LB-less section 24A→LB section 23. In a case where the next section is a LB-less section 24 (operation S57: Yes), the designation unit 52 designates the LB-less section 24 (operation S58). Further, the route determination unit 53A determines the traffic ratio (transmission amount) of the most downstream VNF group 21 in a section downstream of the designated LB-less section 24 as the traffic ratio (reception amount) of the most downstream VNF group 21 in the designated LB-less section 24 (operation S59), and proceeds to the operation S54.

In a case where the next section is not a LB-less section 24 (operation S57: No), the designation unit 52 designates the LB section 23 (operation S60). The route determination unit 53A determines the traffic ratio (transmission amount) of the most upstream terminating VNF group 21 in a section downstream of the designated LB section 23 as the traffic ratio (reception amount) of the most downstream terminating VNF group 21 in the LB section 23 (operation S61). Further, the route determination unit 53A determines transfer routes to which all routes between the most upstream aggregation LB group 22 and the most downstream terminating VNF group 21 in the designated LB section 23 are distributed (operation S62). The route determination unit 53A determines the traffic ratio among transfer routes in the designated LB section 23 (operation S63).

The route determination unit 53A determines the traffic ratio (transmission amount) of the most upstream aggregation LB group 22 in the designated LB section 23 based on the traffic ratio among transfer routes in the designated LB section 23 (operation S64), and proceeds to the operation S19 to determine the distribution ratio of the aggregation LB group 22.

The management server 3 of the second embodiment partitions the service chain 20B into the LB section 23 and LB-less section 24 based on the locations of the aggregation LB group 22 and a terminating VNF group 21 arranged in the service chain 20B. The management server 3 designates the LB section 23 and LB-less section 24 one by one in the descending order from the most downstream to the most upstream of the service chain 20B. The management server 3 determines the traffic ratio (transmission amount) of the most upstream, the traffic ratio among transfer routes, and the traffic ratio of the most downstream (reception amount), for each of the designated LB section 23 and LB-less section 24. Then, the management server 3 determines the distribution ratio of the aggregation LB group 22 and the traffic ratio of the VNF group 21 in the service chain 20B based on the traffic ratio of the most upstream, the traffic ratio among transfer routes, and the traffic ratio of the most downstream in the LB section 23 and LB-less section 24. As a result, even when a terminating VNF group 21 is arranged downstream of a first terminating VNF group 21, the service chain 20B may distribute the traffic reflecting the number of VNF groups 21 downstream of the first terminating VNF group 21. Furthermore, a low-cost service chain 20B may be constructed by reducing virtual resources to be allocated to the LB 13.

The management server 3 designates sections one by one in the service chain 20B in the order of second LB-less section 24B→first LB-less section 24A→LB section 23. In a case where the first LB-less section 24A is designated, the management server 3 sets the traffic ratio of the most upstream VNF group 21 in the second LB-less section 24B being a downstream section as the traffic ratio of the most downstream VNF group 21 in the first LB-less section 24A. In a case where the LB section 23 is designated, the management server 3 sets the traffic ratio of the most upstream VNF group 21 in the first LB-less section 24A being a downstream section as the traffic ratio of the most downstream VNF group 21 in the LB section 23. Thus, processing load for setting the traffic ratio may be reduced.

The service chain system 1 of the first and second embodiments have a configuration in which the aggregation LB group 22 is arranged at the most upstream respectively. However, the aggregation LB group 22 may be arranged in the middle as well as the most upstream. An embodiment thereof is described below as a third embodiment.

Third Embodiment

Figure 18:
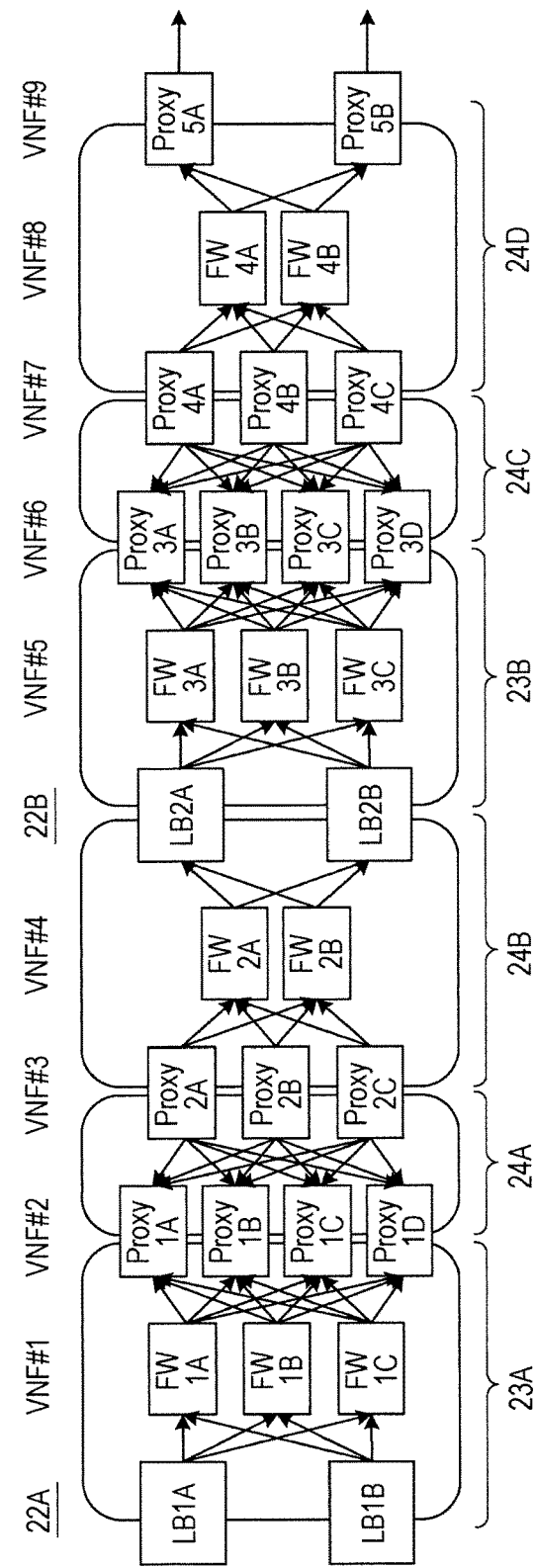
FIG. 18 illustrates an example of a service chain of a third embodiment.

FIG. 18 illustrates an example of a service chain 20C of the third embodiment. The service chain 20C illustrated in FIG. 18 has a configuration in which a first aggregation LB group 22A, VNF #1 to VNF #4, a second aggregation LB group 22B, and VNF #5 to VNF #9 are arranged. The first aggregation LB group 22A includes, for example, the LB 1A and LB 1B; the VNF #1 includes, for example, the FW 1A to FW 1C; and the VNF #2 includes, for example, the Proxy 1A to Proxy 1D. The VNF #3 includes, for example, the Proxy 2A to Proxy 2C, and the VNF #4 includes, for example, the FW 2A and FW 2B. The second aggregation LB group 22B includes the LB 2A and LB 2B, and the VNF #5 includes, for example, the FW 3A to FW 3C. The VNF #6 includes, for example, the Proxy 3A to Proxy 3D; the VNF #7 includes, for example, the Proxy 4A to Proxy 4C; the VNF #8 includes, for example, the FW 4A and FW 4B; and the VNF #9 includes, for example, the Proxy 5A and Proxy 5B. VNFs #2, #3, #6, #7, and #9 are terminating VNF groups.

Figure 19:
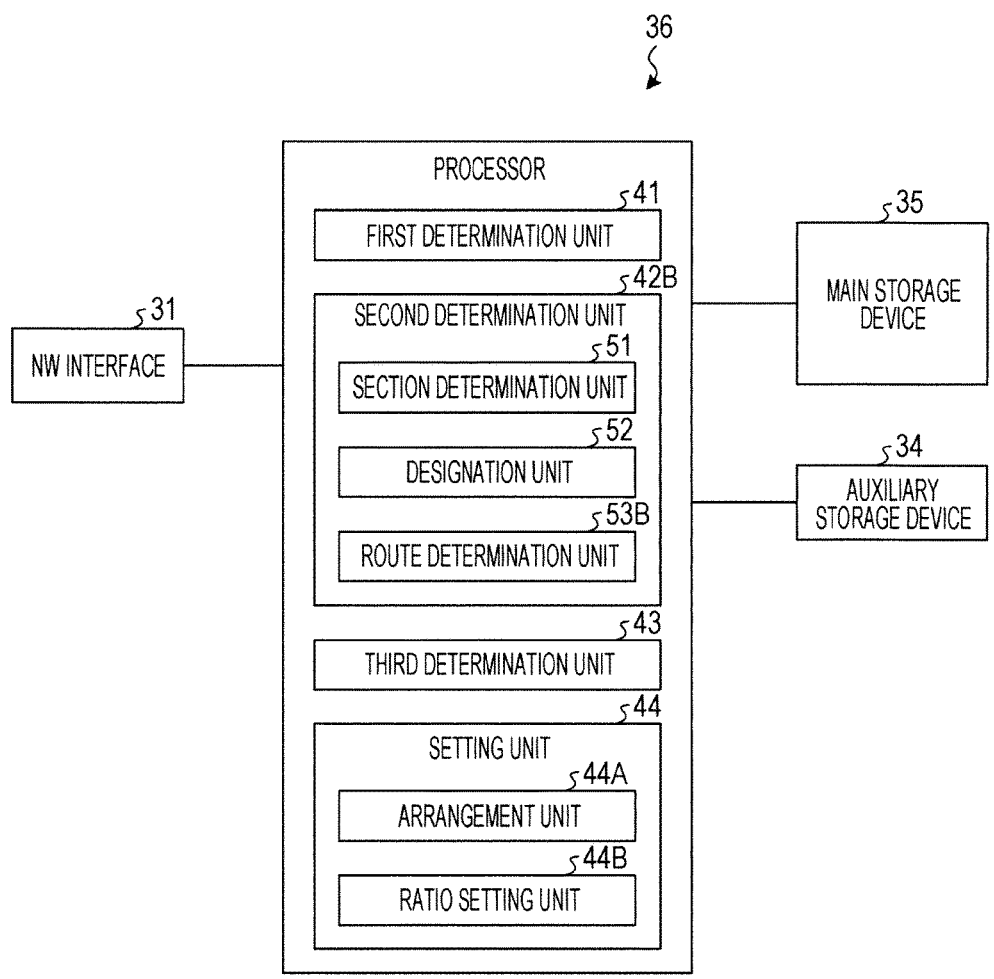
FIG. 19 illustrates an example of a functional configuration of a processor in a management server of the third embodiment.

FIG. 19 illustrates an example of a functional configuration of a processor 36 in a management server 3 according to the third embodiment. The section determination unit 51 in the second determination unit 42B partitions the service chain 20C into the LB section 23 and LB-less section 24 based on the locations of the aggregation LB group 22 and a terminating VNF group 21 arranged in the service chain 20C. The section determination unit 51 determines, in the topology configuration illustrated in FIG. 18, a first LB section 23A, a first LB-less section 24A, a second LB-less section 24B, a second LB section 23B, a third LB-less section 24C, and a fourth LB-less section 24D. The first LB section 23A is a section in which a first aggregation LB group 22A, a VNF #1, and a VNF #2 are arranged. The first LB-less section 24A is a section in which the VNF #2 and a VNF #3 are arranged. The second LB-less section 24B is a section in which the VNF #3, a VNF #4, and a second aggregation LB group 22B are arranged. The second LB section 23B is a section in which the second aggregation LB group 22B, a VNF #5, and a VNF #6 are arranged. The third LB-less section 24C is a section in which the VNF #6 and a VNF #7 are arranged. The fourth LB-less section 24D is a section in which the VNF #7, a VNF #8, and a VNF #9 are arranged.

The designation unit 52 in the second determination unit 42B designates sections one by one in the ascending order of first LB section 23A→first LB-less section 24A→second LB-less section 24B→second LB section 23B→third LB-less section 24C→fourth LB-less section 24D. The route determination unit 53B in the second determination unit 42B calculates the traffic ratio (transmission amount) of the most upstream, the traffic ratio among transfer routes, and the traffic ratio (reception amount) of the most downstream, for the designated LB section 23 or LB-less section 24. The route determination unit 53B calculates the distribution ratio of the aggregation LB group 22 and the traffic ratios of VNF groups 21 on transfer routes based on the traffic ratio (transmission amount) of the most upstream, the traffic ratio among transfer routes, and the traffic ratio (reception amount) of the most downstream for each of the LB section 23 and the LB-less section 24.

The route determination unit 53B calculates the traffic ratio of the most downstream second aggregation LB group 22B in the second LB-less section 24B. The route determination unit 53B determines the traffic ratio (reception amount) of the most downstream second aggregation LB group 22B in the second LB-less section 24B as the traffic ratio (transmission amount) of the most upstream second aggregation LB group 22B in the second LB section 23B.

Figure 20A:
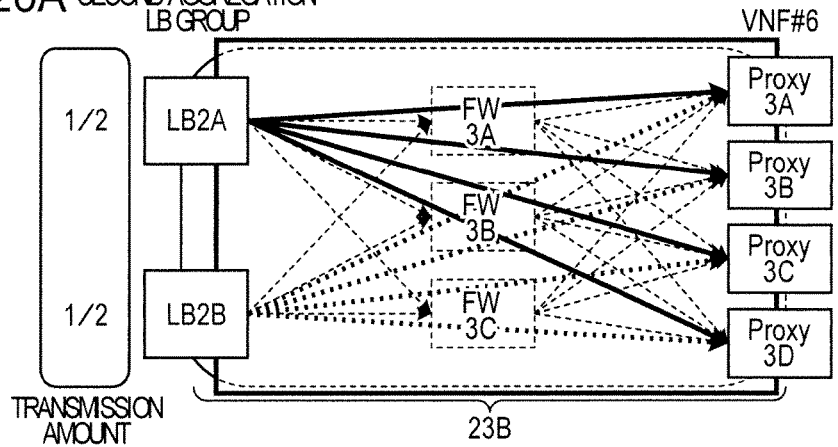
FIG. 20A illustrates an example of terminating destinations in a second LB section.

FIG. 20A illustrates an example of terminating destinations in the second LB section 23B. Proxy 3A to Proxy 3D in the VNF #6 are terminating VNF groups 21. The route determination unit 53B determines the traffic ratio (reception amount) of the most downstream second aggregation LB group 22B in the second LB-less section 24B as the traffic ratio (transmission amount) of the most upstream second aggregation LB group 22B in the second LB section 23B. The route determination unit 53B determines a terminating VNF group 21 (Proxy 3A to Proxy 3D in VNF #6) as a terminating destination of the second aggregation LB group 22B in the second LB section 23B.

Figure 20B:
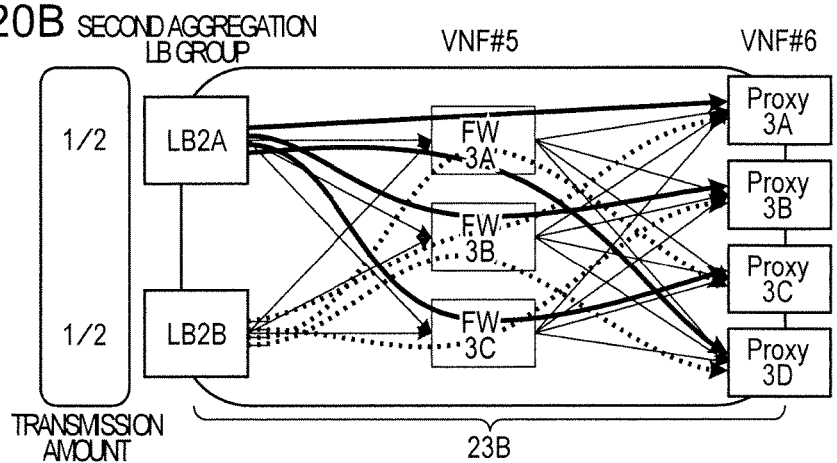
FIG. 20B illustrates an example of transfer routes in the second LB section.

FIG. 20B illustrates an example of transfer routes in the second LB section 23B. The route determination unit 53B determines transfer routes to which all routes between the second aggregation LB group 22B and a terminating VNF group 21 in the second LB section 23B are distributed. The route determination unit 53B determines four transfer routes between the LB 2A and the Proxy 3A to Proxy 3D, and four transfer routes between the LB 2B and the Proxy 3A to Proxy 3D in the second LB section 23B.

Figure 20C:
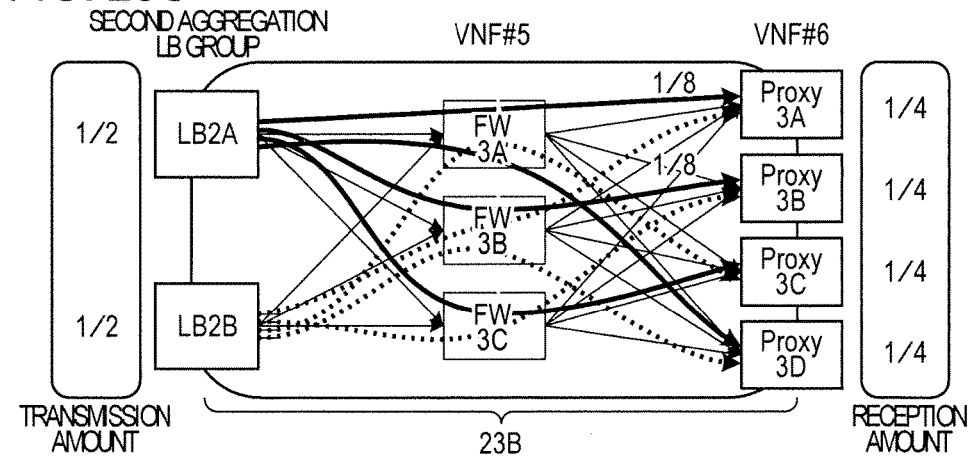
FIG. 20C illustrates an example of a traffic ratio (reception amount) of a terminating VNF group in the second LB section.

FIG. 20C illustrates an example of the traffic ratio (reception amount) of a terminating VNF group 21 in the second LB section 23B. The route determination unit 53B determines the traffic ratio among transfer routes in the second LB section 23B based on the traffic ratio (transmission amount) and transfer route of the most upstream aggregation LB group 22B in the second LB section 23B. Further, the route determination unit 53B determines the traffic ratio (reception amount) of the most downstream VNF #6 in the second LB section 23B based on the traffic ratio among transfer routes in the second LB section 23B. Assume that the traffic ratio of the Proxy 3A is 1/4 of the entire traffic amount; the traffic ratio of the Proxy 3B is 1/4 of the entire traffic amount; the traffic ratio of the Proxy 3C is 1/4 of the entire traffic amount; and the traffic ratio of the Proxy 3D is 1/4 of the entire traffic amount.

Figure 21A:
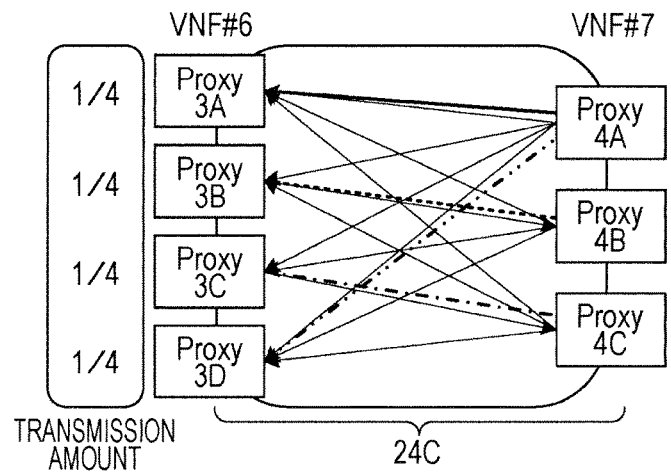
FIG. 21A illustrates an example of terminating destinations in a third LB-less section.

FIG. 21A illustrates an example of terminating destinations in the third LB-less section 24C. Assume that the Proxy 4A to Proxy 4C of the VNF #9 are terminating VNF groups 21. The route determination unit 53B determines the traffic ratio (reception amount) of the most downstream VNF #6 in the second LB section 23B as the traffic ratio (transmission amount) of the most upstream VNF #6 in the third LB-less section 24C. The route determination unit 53B determines the most downstream terminating VNF group 21 (Proxy 4A to Proxy 4C in the VNF #7) as a terminating destination of the VNF #6 (Proxy 3A to Proxy 3D) in the third LB-less section 24C.

Figure 21B:
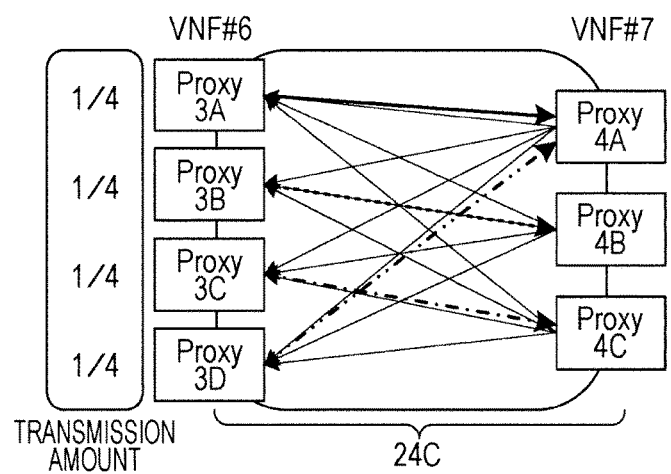
FIG. 21B illustrates an example of transfer routes in the third LB-less section.

FIG. 21B illustrates an example of transfer routes in the third LB-less section 24C. The route determination unit 53B determines transfer routes to which all routes between the VNF #6 and the VNF #7 in the third LB-less section 24C are distributed. The route determination unit 53B determines the transfer route between the Proxy 3A and the Proxy 4A, the transfer route between the Proxy 3B and the Proxy 4B, the transfer route between the Proxy 3C and the Proxy 4C, and the transfer route between the Proxy 3D and the Proxy 4A in the third LB-less section 24C.

Figure 21C:
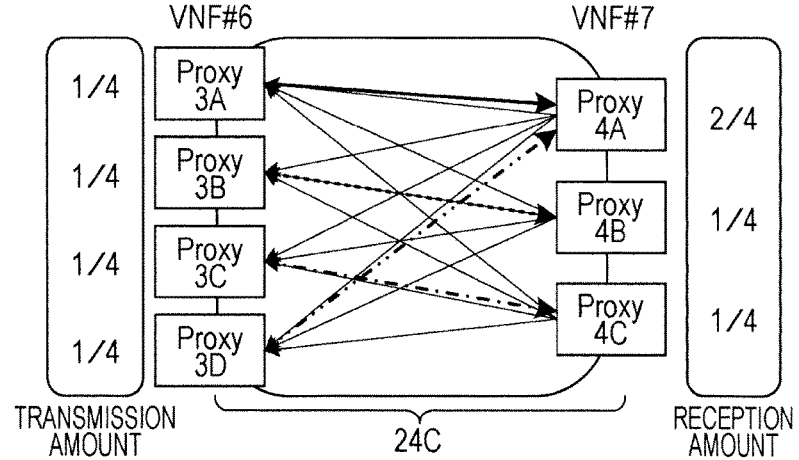
FIG. 21C illustrates an example of a traffic ratio (reception amount) of a terminating VNF group in the third LB-less section.

FIG. 21C illustrates an example of the traffic ratio (reception amount) of the most downstream VNF group 21 in the third LB-less section 24C. The route determination unit 53B determines the traffic ratio among transfer routes in the third LB-less section 24C based on the traffic ratio (transmission amount) and transfer route of the most upstream VNF group 21 in the third LB-less section 24C. Further, the route determination unit 53B determines the traffic ratio (reception amount) of the most downstream VNF #7 in the third LB-less section 24C based on the traffic ratio among transfer routes in the third LB-less section 24C. Assume that the traffic ratio of the Proxy 4A in the VNF #7 is 2/4 of the entire traffic amount; the traffic ratio of the Proxy 4B is 1/4 of the entire traffic amount; and the traffic ratio of the Proxy 4C is 1/4 of the entire traffic amount.

Figure 22A:
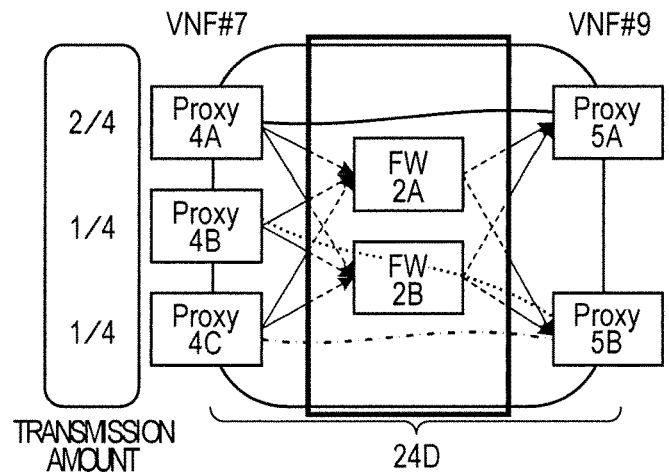
FIG. 22A illustrates an example of terminating destinations in a fourth LB-less section.

FIG. 22A illustrates an example of terminating destinations in the fourth LB-less section 24D. Assume that Proxy 5A and Proxy 5B of the VNF #7 are terminating VNF groups 21. The route determination unit 53B determines the traffic ratio (reception amount) of the most downstream VNF #7 in the third LB-less section 24C as the traffic ratio (transmission amount) of the most upstream VNF #7 in the fourth LB-less section 24D. The route determination unit 53B determines the most downstream terminating VNF group 21 (Proxy 5A and Proxy 5B in the VNF #9) as the terminating destination of the Proxy 4A to Proxy 4C in the most upstream VNF #7 in the fourth LB-less section 24D.

Figure 22B:
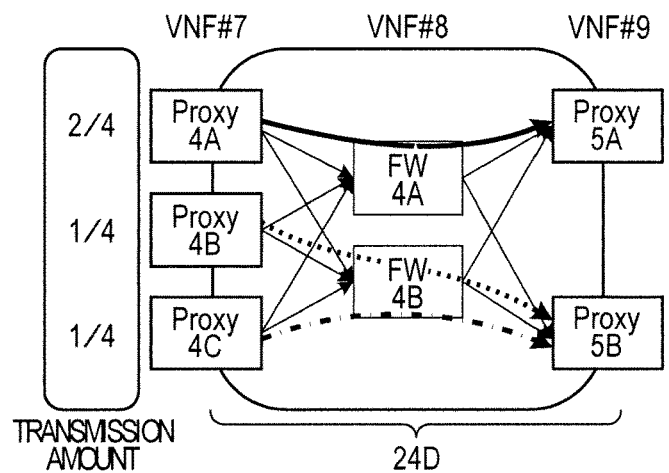
FIG. 22B illustrates an example of transfer routes in the fourth LB-less section.

FIG. 22B illustrates an example of transfer routes in the fourth LB-less section 24D. The route determination unit 53B determines transfer routes to which all routes between the VNF #7 and the VNF #9 in the fourth LB-less section 24D are distributed. The route determination unit 53B determines the transfer route between the Proxy 4A and the Proxy 5A, the transfer route between the Proxy 4B and the Proxy 5B, and the transfer route between the Proxy 4C and the Proxy 56 in the fourth LB-less section 24D.

Figure 22C:
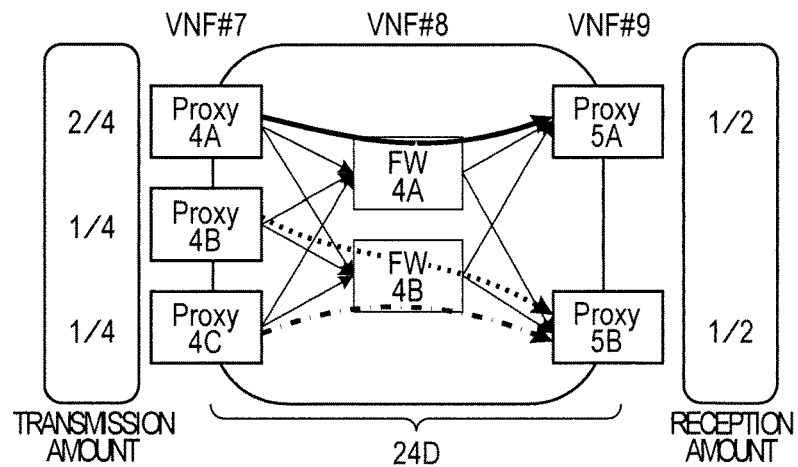
FIG. 22C illustrates an example of a traffic ratio (reception amount) of a terminating VNF group in the fourth LB-less section.

FIG. 22C illustrates an example of the traffic ratio (reception amount) of the most downstream terminating VNF group 21 in the fourth LB-less section 24D. The route determination unit 53B determines the traffic ratio among transfer routes in the fourth LB-less section 24D based on the traffic ratio (transmission amount) and transfer route of the most upstream VNF group 21 in the fourth LB-less section 24D. Further, the route determination unit 53B determines the traffic ratio (reception amount) of a terminating VNF group 21 in the fourth LB-less section 24D based on the traffic ratio among transfer routes in the fourth LB-less section 24D. Assume that the traffic ratio of the Proxy 5A is 1/2 of the entire traffic amount, and the traffic ratio of the Proxy 5B is 1/2 of the entire traffic amount.

The third determination unit 43 registers setting information into the setting unit 44 based on transfer routes in the LB section 23 and the LB-less section 24 and the traffic ratios among the transfer routes. The setting information includes the traffic ratio of the LB 1A, the traffic ratio of LB 1B, and transfer routes among LB 1A, LB 1B, FW 1A to FW 1C, Proxy 1A to Proxy 1D, Proxy 2A to Proxy 2C, FW 2A, FW 2B, Proxy 3A, and Proxy 3B. Setting information includes the traffic ratio of the LB 2A, the traffic ratio of the LB 2B, and transfer routes between FW 3A to FW 3C, among Proxy 3A to Proxy 3D, among Proxy 4A to Proxy 4C, between FW 4A and FW 4B, and between Proxy 5A and Proxy 5B.

Figure 23:
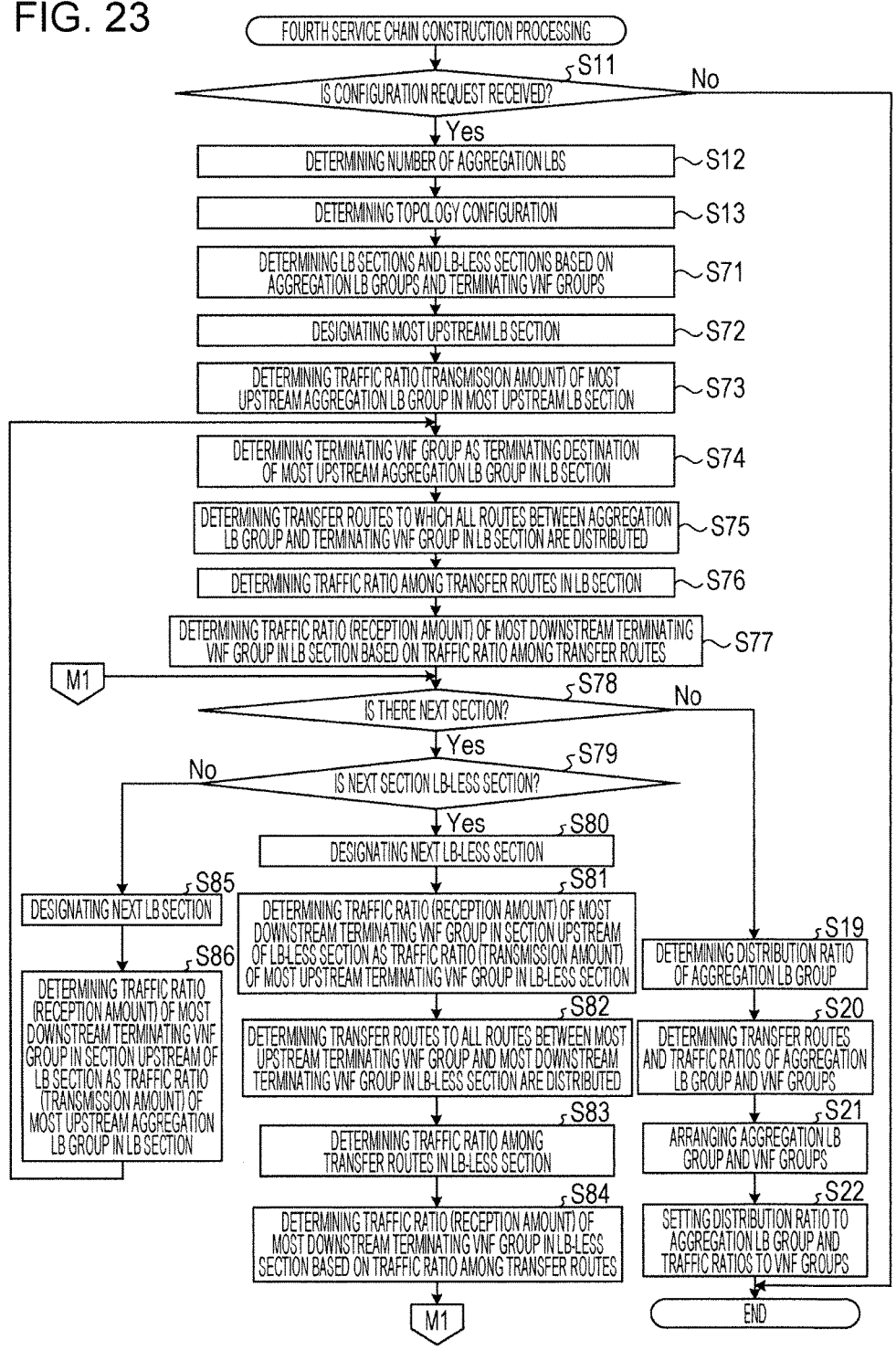
FIG. 23 is a flowchart illustrating an example of a processing operation of a management server related to a fourth service chain construction processing.

Next, operation of the service chain system 1 according to the third embodiment is described. FIG. 23 is a flowchart illustrating an example of a processing operation of a processor 36 in a management server 3 related to a fourth service chain construction processing.

The route determination unit 53B of the second determination unit 42B determines the topology configuration of the service chain 20C in the operation S13 and then determines the LB section 23 and LB-less section 24 based on the aggregation LB group 22 and a terminating VNF group 21 of the service chain 20C (operation S71). The designation unit 52 in the second determination unit 42B designates the most upstream LB section 23 (operation S72). The most upstream LB section 23 is the first LB section 23A.

The route determination unit 53B in the second determination unit 42B determines the traffic ratio (transmission amount) of the most upstream aggregation LB group 22 in the designated LB section 23 (operation S73). The route determination unit 53B determines the most downstream terminating VNF group 21 as a terminating destination of the most upstream aggregation LB group 22 in the designated LB section 23 (operation S74).

The route determination unit 53B determines transfer routes to which all routes between the aggregation LB group 22 and a terminating VNF group 21 in the designated LB section 23 are distributed (operation S75). The route determination unit 53B determines the traffic ratio among transfer routes in the designated LB section 23 (operation S76).

The route determination unit 53B determines the traffic ratio (reception amount) of the most downstream terminating VNF group 21 in the designated LB section 23 based on the traffic ratio among transfer routes in the designated LB section 23 (operation S77). The designation unit 52 determines whether there is a next section in the ascending order (operation S78). In a case where there is a next section (operation S78: Yes), the designation unit 52 determines whether the next section is a LB-less section 24 (operation S79). In a case where the next section is a LB-less section 24 (operation S79: Yes), the designation unit 52 designates a next LB-less section 24 (operation S80). The route determination unit 53B determines the traffic ratio (reception amount) of the most downstream terminating VNF group 21 in an upstream section as the traffic ratio (transmission amount) of the most upstream VNF group 21 in the designated LB-less section 24 (operation S81).

The route determination unit 53B determines transfer routes to which all routes between the most upstream VNF group 21 and the most downstream VNF group 21 in the designated LB-less section 24 are distributed (operation S82). The route determination unit 53B determines the traffic ratio among transfer routes in the designated LB-less section 24 (operation S83).

The route determination unit 53B determines the traffic ratio (reception amount) of the most downstream terminating VNF group 21 in the designated LB section 23 based on the traffic ratio among transfer routes in the designated LB section 23 (operation S84), and proceeds to the operation S78 to determine whether there is a next section.

In a case where the next section is not a LB-less section 24 (operation S79: No), the designation unit 52 designates a next LB section 23 (operation S85). The route determination unit 53B determines the traffic ratio (reception amount) of the most downstream terminating VNF group 21 in a section upstream of the LB section 23 as the traffic ratio (transmission amount) of the most upstream aggregation LB group 22 in the LB section 23 (operation S86). Then, the route determination unit 53B proceeds to the operation S74 to determine a terminating VNF group 21 in the designated LB section 23. In a case where the configuration request is not received (operation S11: No), the first determination unit 41 ends the processing operation illustrated in FIG. 23. In a case where there is no next section (operation S78: No), the designation unit 52 proceeds to the operation S19 to determine the distribution ratio of the aggregation LB group 22.

The management server 3 of the third embodiment partitions the service chain 20C into the LB section 23 and LB-less section 24 based on the locations of the aggregation LB group 22 and a terminating VNF group 21 arranged in the service chain 20C. The management server 3 specifies the LB section 23 and the LB-less section 24 one by one in the ascending order from the most upstream to the most downstream of the service chain 20C. The management server 3 determines the traffic ratio (transmission amount) of the most upstream, the traffic ratio among transfer routes, and the traffic ratio (reception amount) of the most downstream, for each of the designated LB section 23 and LB-less section 24. Then, the management server 3 determines the distribution ratio of the aggregation LB group 22 and the traffic ratio of VNF groups 21 in the service chain 20C based on the traffic ratio of the most upstream, the traffic ratio among transfer routes, and the traffic ratio of the most downstream in each of the LB section 23 and the LB-less section 24. As a result, even when the aggregation LB group 22 is arranged in the middle, the service chain 20C may distribute the traffic amount reflecting the number of VNF groups 21 downstream of the first terminating VNF group 21.

The management server 3 designates sections in the service chain 20C in the order of first LB section 23A→first LB-less section 24A→second LB-less section 24B→second LB section 23B→third LB-less section 24C→fourth LB-less section 24D. For example, in a case where the second LB section 236 is designated, the management server 3 sets the traffic ratio of the most downstream VNF group 21 in the second LB section 23B being an upstream section as the traffic ratio of the most upstream VNF group 21 in the second LB section 23B. Also, for example, in a case where the fourth LB-less section 24D is designated, the management server 3 sets the traffic ratio of the most downstream VNF group 21 in the third LB-less section 24C being an upstream section as the traffic ratio of the most upstream VNF group 21 in the fourth LB-less section 24D. Thus, processing load for setting the traffic ratio may be reduced.

The management server 3 of the third embodiment calculates the transfer route and the traffic ratio for each section, one by one, in the ascending order of first LB section 23A→first LB-less section 24A→second LB-less section 246→second LB section 23B→third LB-less section 24C→fourth LB-less section 24D. However, the order is not limited to the ascending order of first LB section 23A→first LB-less section 24A→second LB-less section 24B→second LB section 23B→third LB-less section 24C→fourth LB-less section 24D, and may be altered as appropriate. For example, the transfer route and the traffic ratio may be calculated for each section, one by one, in the descending order of fourth LB-less section 24D→third LB-less section 24C→second LB section 23B→second LB-less section 246→first LB-less section 24A→first LB section 23A. An embodiment thereof is described below as a fourth embodiment. Description of duplicated configuration and operation of the same components as in the service chain system 1 of the third embodiment described above is omitted by assigning same reference numerals.

Fourth Embodiment

Figure 24:
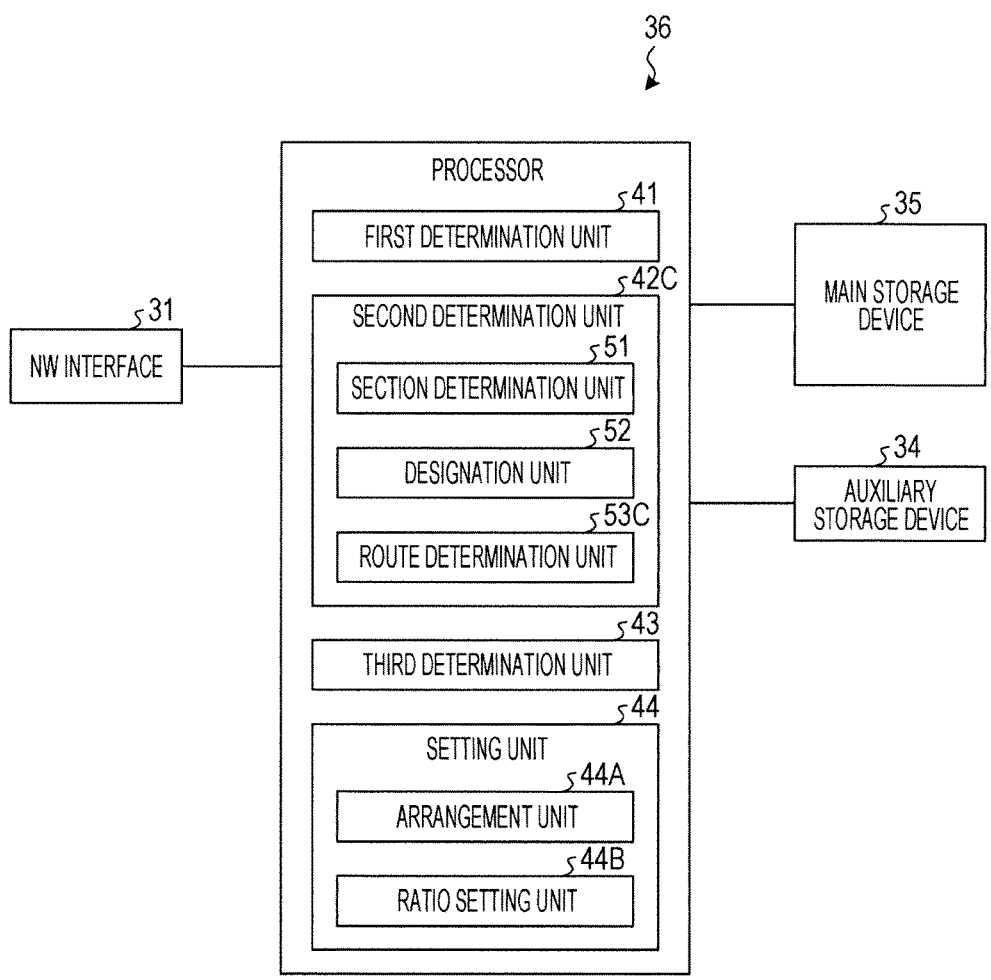
FIG. 24 illustrates an example of a functional configuration of a processor in a management server of the fourth embodiment.

FIG. 24 illustrates an example of a functional configuration of a processor 36 in a management server 3 according to the fourth embodiment. The designation unit 52 in the second determination unit 42C illustrated in FIG. 24 designates sections one by one in the descending order of fourth LB-less section 24D→third LB-less section 24C→second LB section 23B→second LB-less section 24B→first LB-less section 24A→first LB section 23A. The route determination unit 53C in the second determination unit 42C determines the distribution ratio of the aggregation LB group 22, the traffic ratios of VNF groups 21, and a traffic ratio among transfer routes of the service chain 20C based on the transfer routes and the traffic ratios of the LB section 23 and LB-less section 24.

Figure 25A:
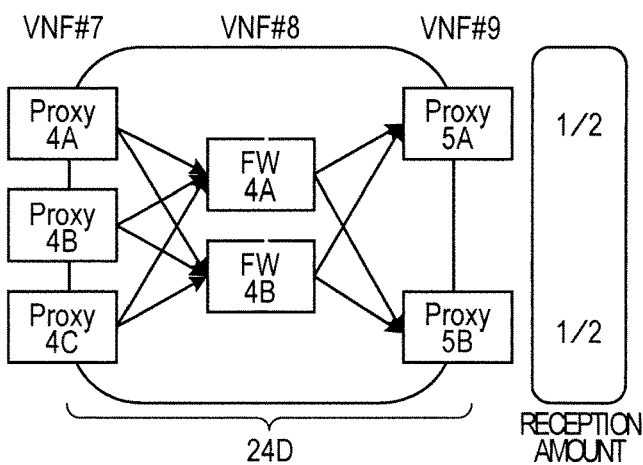
FIG. 25A illustrates an example of a traffic ratio (reception amount) of the most downstream terminating VNF group in the fourth LB-less section.

The designation unit 52 designates the most downstream fourth LB-less section 24D in the service chain 20C illustrated in FIG. 18. FIG. 25A illustrates an example of the traffic ratio (reception amount) of the most downstream terminating VNF group 21 in the fourth LB-less section 24D. As there are two terminating VNFs 12 in the terminating destination VNF group 21 in the fourth LB-less section 24D, the route determination unit 53C determines the traffic ratio (reception amount) of the most downstream VNF group 21 in the fourth LB-less section 24D as 1/2 of the entire traffic amount.

Figure 25B:
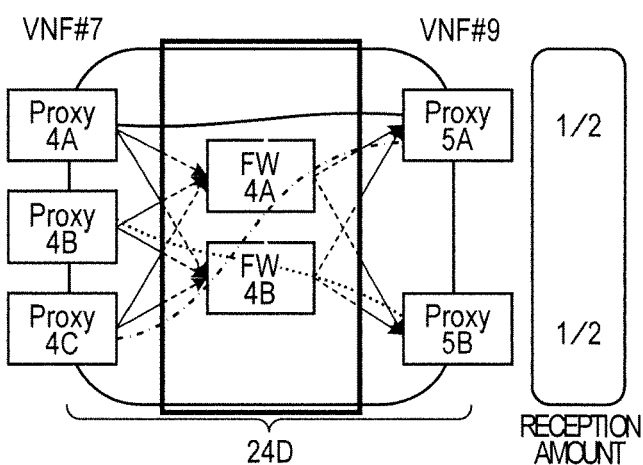
FIG. 25B illustrates an example of transfer routes in the fourth LB-less section.

FIG. 25B illustrates an example of transfer routes in the fourth LB-less section 24D. The route determination unit 53C determines the Proxy 4A to Proxy 4C in the most upstream VNF #7 as a transmission source of the most downstream terminating VNF group 21 (Proxy 5A and Proxy 5B in the VNF #9) in the fourth LB-less section 24D. The route determination unit 53C determines transfer routes to which all routes between the VNF #7 and the VNF #9 in the fourth LB-less section 24D are distributed. The route determination unit 53C determines the transfer route between the Proxy 4A and the Proxy 5A, the transfer route between the Proxy 4B and the Proxy 5B, and the transfer route between the Proxy 4C and the Proxy 5A in the fourth LB-less section 24D.

Figure 25C:
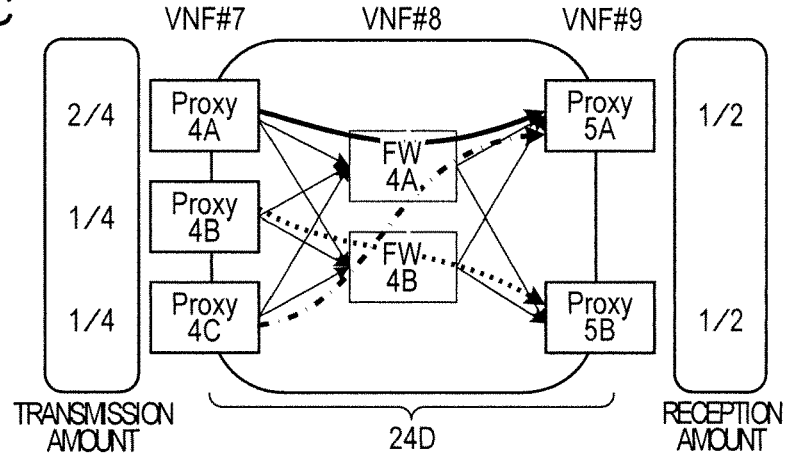
FIG. 25C illustrates an example of a traffic ratio (transmission amount) of the most upstream terminating VNF group in the fourth LB-less section.

FIG. 25C illustrates an example of the traffic ratio (transmission amount) of the most upstream terminating VNF group 21 in the fourth LB-less section 24D. The route determination unit 53C determines the traffic ratio among transfer routes in the fourth LB-less section 24D based on the traffic ratio (reception amount) and transfer route of the most downstream VNF group 21 in the fourth LB-less section 24D. Further, the route determination unit 53C determines the traffic ratio (transmission amount) of the most upstream VNF group 21 in the fourth LB-less section 24D based on the traffic ratio among transfer routes in the fourth LB-less section 24D. Assume that the traffic ratio of the Proxy 4A is 2/4 of the entire traffic amount, the traffic ratio of the Proxy 4B is 1/4 of the entire traffic amount, and the traffic ratio of the Proxy 4C is 1/4 of the entire traffic amount.

Figure 26A:
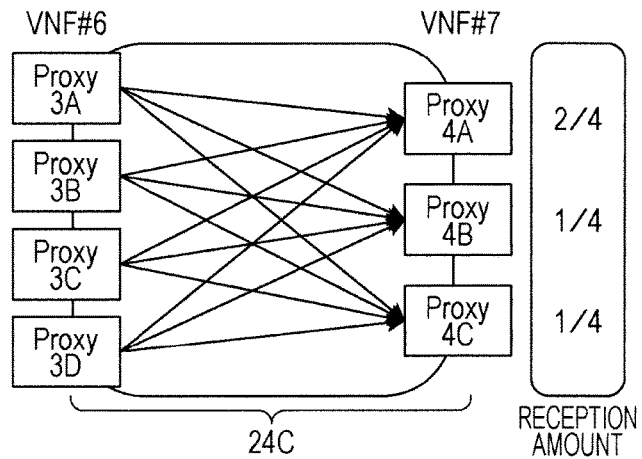
FIG. 26A illustrates an example of a traffic ratio (reception amount) of the most downstream terminating VNF group in the third LB-less section.

FIG. 26A illustrates an example of the traffic ratio (reception amount) of the most downstream terminating VNF group 21 in the third LB-less section 24C. The route determination unit 53C determines the traffic ratio (transmission amount) of the most upstream VNF group 21 in the fourth LB-less section 24D as the traffic ratio (reception amount) of the most downstream VNF group 21 in the third LB-less section 24C.

Figure 26B:
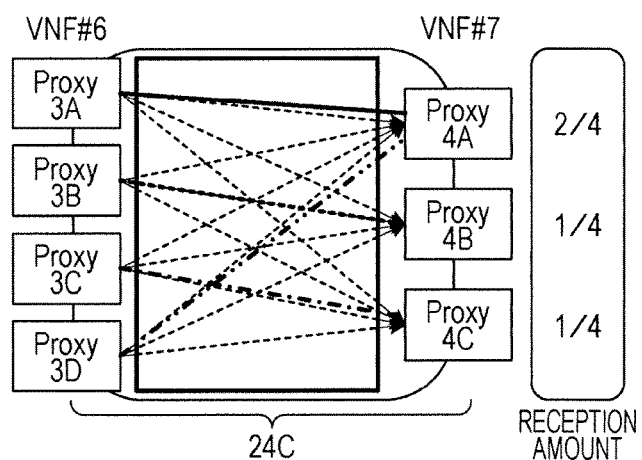
FIG. 26B illustrates an example of transfer routes in the third LB-less section.

FIG. 26B illustrates an example of transfer routes in the third LB-less section 24C. The route determination unit 53C determines the Proxy 3A to Proxy 3D in the most upstream VNF #6 as a transmission source of the most downstream terminating VNF group 21 (Proxy 4A to Proxy 4C in the VNF #7) in the third LB-less section 24C. The route determination unit 53C determines transfer routes to which all routes between the VNF #6 and the VNF #7 in the third LB-less section 24C are distributed. The route determination unit 53C determines the transfer route between the Proxy 3A and the Proxy 4A, the transfer route between the Proxy 3B and the Proxy 4B, the transfer route between the Proxy 3C and the Proxy 4C, and the transfer route between the Proxy 3D and the Proxy 4A in the third LB-less section 24C.

Figure 26C:
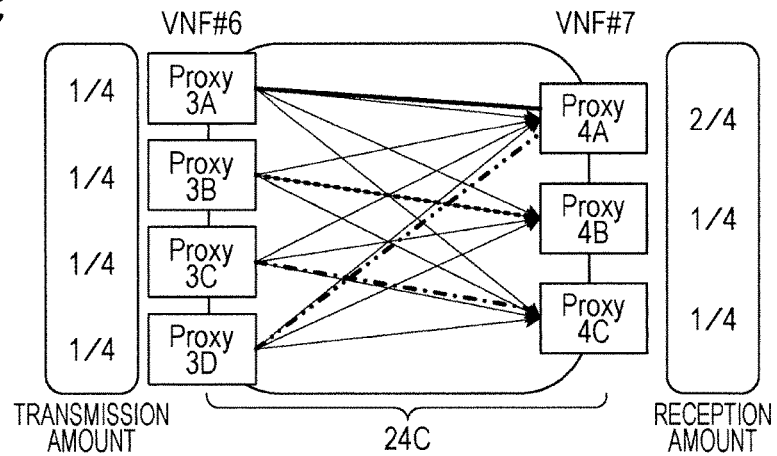
FIG. 26C illustrates an example of a traffic ratio (transmission amount) of the most upstream terminating VNF group in the third LB-less section.

FIG. 26C illustrates an example of the traffic ratio (transmission amount) of the most upstream terminating VNF group 21 in the third LB-less section 24C. The route determination unit 53C determines the traffic ratio among transfer routes in the third LB-less section 24C based on the traffic ratio (reception amount) and transfer route of the most downstream VNF group 21 in the third LB-less section 24C. Further, the route determination unit 53C determines the traffic ratio (transmission amount) of the most upstream VNF group 21 in the third LB-less section 24C based on the traffic ratio among transfer routes in the third LB-less section 24C. Assume that the traffic ratio of the Proxy 3A is 1/4 of the entire traffic amount, the traffic ratio of the Proxy 3B is 1/4 of the entire traffic amount, the traffic ratio of the Proxy 3C is 1/4 of the entire traffic amount, and the traffic ratio of the Proxy 3D is 1/4 of the entire traffic amount.

Figure 27A:
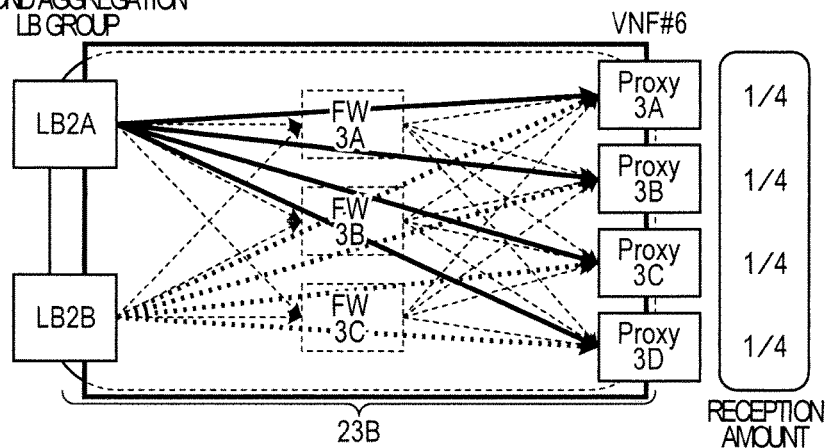
FIG. 27A illustrates an example of a traffic ratio (reception amount) of the most downstream terminating VNF group in the second LB section.

FIG. 27A illustrates an example of the traffic ratio (reception amount) of the most downstream terminating VNF group 21 in the second LB section 23B. The route determination unit 53C determines the traffic ratio (transmission amount) of the most upstream VNF group in the third LB-less section 24C as the traffic ratio (reception amount) of the most downstream VNF group 21 in the second LB section 23B.

Figure 27B:
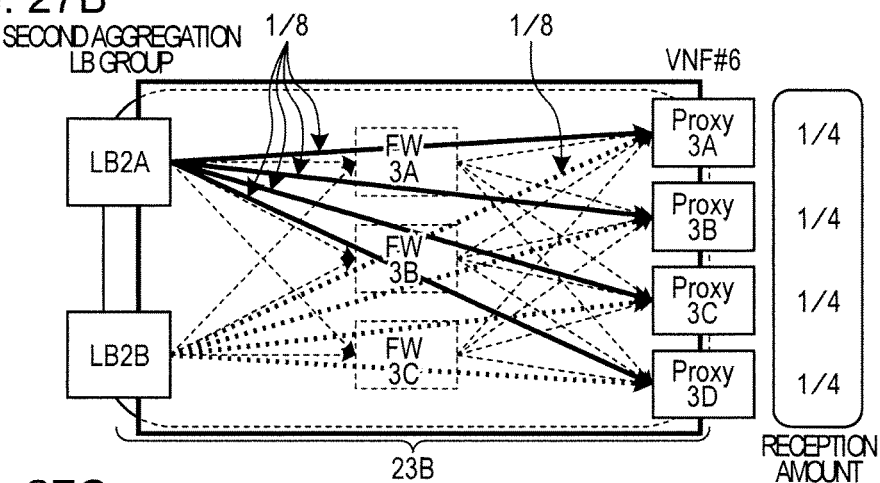
FIG. 27B illustrates an example of transfer routes in the second LB section.

FIG. 27B illustrates an example of transfer routes in the second LB section 23B. The route determination unit 53C determines the LB 2A and LB 2B in the most upstream second aggregation LB group 22B as a transmission source of the most downstream terminating VNF group 21 (Proxy 3A to Proxy 3D in the VNF #6) in the second LB section 23B. The route determination unit 53C determines transfer routes to which all routes between the second aggregation LB group 22B and VNF #6 in the second LB section 23B are distributed. The route determination unit 53C determines the transfer route between the LB 2A and the Proxy 3A, the transfer route between the LB 2A and the Proxy 3B, the transfer route between the LB 2A and the Proxy 3C, and the transfer route between the LB 2A and the Proxy 3D in the second LB section 23B. The route determination unit 53C determines the transfer route between the LB 2B and the Proxy 3A, the transfer route between the LB 2B and the Proxy 3B, the transfer route between the LB 2B and the Proxy 3C, and the transfer route between the LB 2B and the Proxy 3D in the second LB section 23B.

Figure 27C:
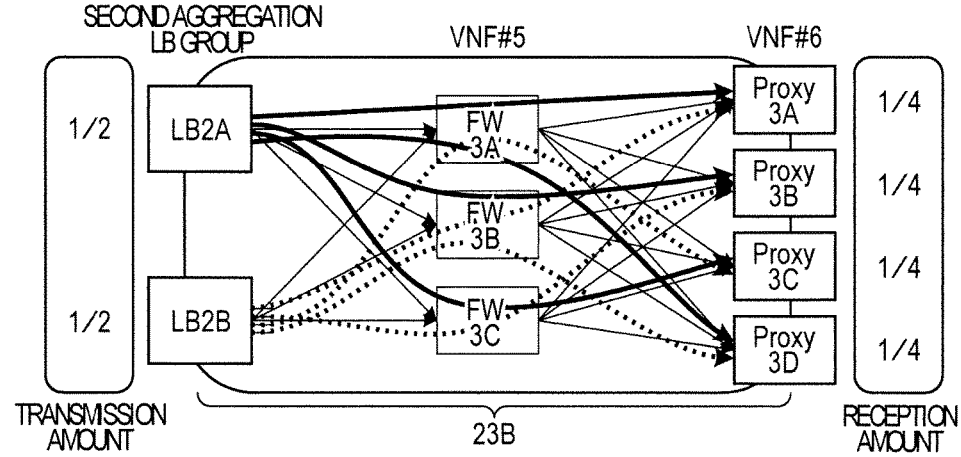
FIG. 27C illustrates an example of a traffic ratio (transmission amount) of the most upstream terminating VNF group in the second LB section.

FIG. 27C illustrates an example of the traffic ratio (transmission amount) of the most upstream second aggregation LB group 22B in the second LB section 23B. The route determination unit 53C determines the traffic ratio among transfer routes in the second LB section 23B. Further, the route determination unit 53C determines the traffic ratio (transmission amount) of the most upstream second aggregation LB group 22B in the second LB section 23B based on the traffic ratio of transfer routes in the second LB section 23B. Assume that the traffic ratio of the LB 2A is 1/2 of the entire traffic amount, and the traffic ratio of the LB 2B is 1/2 of the entire traffic amount.

Figure 28A:
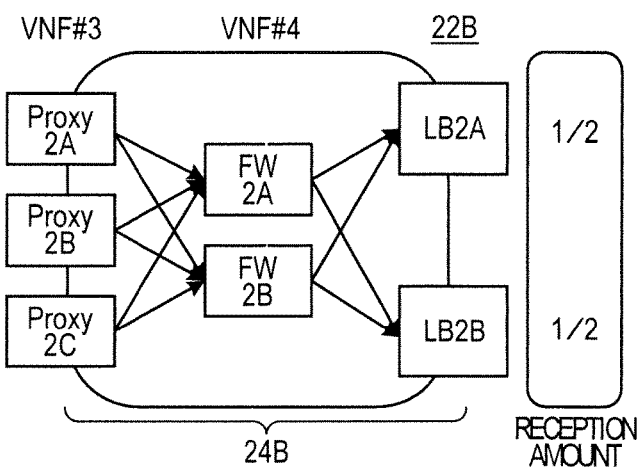
FIG. 28A illustrates an example of a traffic ratio (reception amount) of the most downstream terminating VNF group in the second LB-less section.

FIG. 28A illustrates an example of the traffic ratio (reception amount) of the most downstream terminating VNF group 21 in the second LB-less section 24B. The route determination unit 53C determines the traffic ratio (transmission amount) of the most upstream second aggregation LB group 22B in the second LB section 23B as the traffic ratio (reception amount) of the most downstream second aggregation LB group 226 in the second LB-less section 24B.

Figure 28B:
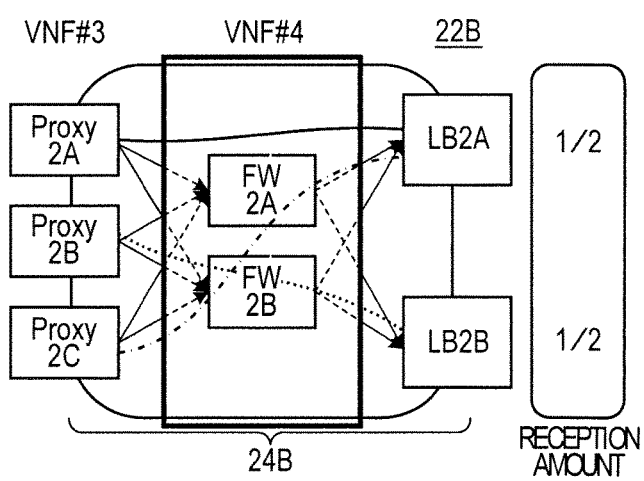
FIG. 28B illustrates an example of transfer routes in the second LB-less section.

FIG. 28B illustrates an example of transfer routes in the second LB-less section 24B. The route determination unit 53C determines the Proxy 2A to Proxy 2C in the most upstream VNF #3 as a transmission source of the most downstream second aggregation LB group 22B (LB 2A and LB 2B) in the second LB-less section 24B. The route determination unit 53C determines transfer routes to which all routes between the second aggregation LB group 226 and the VNF #3 in the second LB-less section 246 are distributed. The route determination unit 53C determines the transfer route between the LB 2A and the Proxy 2A, the transfer route between the LB 2B and the Proxy 2B, and the transfer route between the LB 2A and the Proxy 2C in the second LB-less section 24B.

Figure 28C:
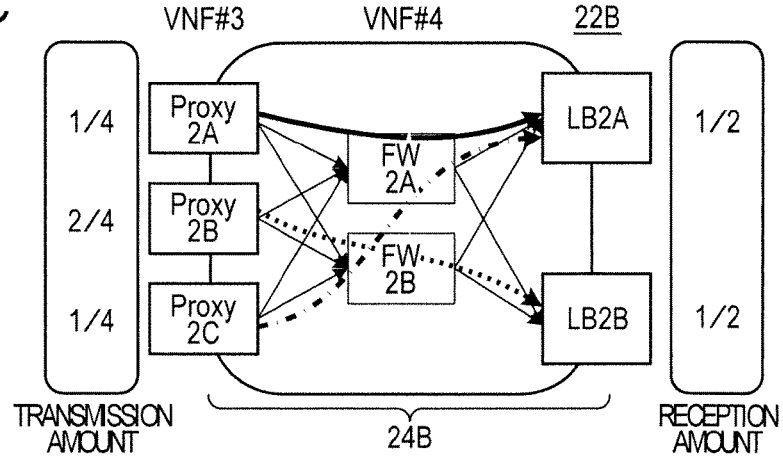
FIG. 28C illustrates an example of a traffic ratio (transmission amount) of the most upstream terminating VNF group in the second LB-less section.

FIG. 28C illustrates an example of the traffic ratio (transmission amount) of the most upstream VNF group 21 in the second LB-less section 24B. The route determination unit 53C determines the traffic ratio among transfer routes in the second LB-less section 24B. Further, the route determination unit 53C determines the traffic ratio (transmission amount) of the most upstream VNF #3 in the second LB-less section 24B based on the traffic ratio among transfer routes in the second LB-less section 24B. Assume that the traffic ratio of the Proxy 2A is 1/4 of the entire traffic amount; the traffic ratio of the Proxy 2B is 2/4 of the entire traffic amount; and the traffic ratio of the Proxy 2C is 1/4 of the entire traffic amount.

The third determination unit 43 registers setting information into the setting unit 44 based on transfer routes in the LB section 23 and the LB-less section 24 and the traffic ratio among the transfer routes. Setting information includes the traffic ratio of the LB 1A, the traffic ratio of the LB 1B, and transfer routes among LB 1A, LB 1B, FW 1A to FW 1C, Proxy 1A to Proxy 1D, Proxy 2A to Proxy 2C, FW 2A, FW 2B, Proxy 3A, and Proxy 3B. Setting information includes the traffic ratio of the LB 2A, the traffic ratio of the LB 2B, and the transfer routes among LB 2A, LB 2B, FW 3A to FW 3C, Proxy 3A to Proxy 3D, Proxy 4A to Proxy 4C, FW 4A, FW 4B, Proxy 5A, and Proxy 5B.

Next, operation of a service chain system 1 according to the fourth embodiment is described. FIG. 29 is a flowchart illustrating an example of a processing operation of a processor 36 in a management server 3 related to a fifth service chain construction processing.

The section determination unit 51 in the second determination unit 42C determines the topology configuration of the service chain 20C in the operation S13 and then determines the LB section 23 and LB-less section 24 based on the aggregation LB group 22 and terminating VNF group 21 of the service chain 20C (operation S91).

The designation unit 52 in the second determination unit 42C designates the most downstream LB-less section 24 of the service chain 20C (operation S92). The route determination unit 53C determines the traffic ratio (reception amount) of the most downstream terminating VNF group 21 in the designated LB-less section 24 (operation S93).

The route determination unit 53C determines transfer routes to which all routes between the most upstream terminating VNF group 21 and the most downstream terminating VNF group 21 in the designated LB-less section 24 are distributed (operation S94). The route determination unit 53C determines the traffic ratio among transfer routes in the designated LB-less section 24 (operation S95).

The route determination unit 53C determines the traffic ratio (transmission amount) of the most upstream terminating VNF group 21 in the designated LB-less section 24 based on the traffic ratio among transfer routes in the designated LB-less section 24 (operation S96).

The route designation unit 53C determines whether there is a next section in the descending order (operation S97). In a case where there is a next section (operation S97: Yes), the designation unit 52 determines whether the next section is a LB-less section 24 (operation S98). In a case where the next section is a LB-less section 24 (operation S98: Yes), the designation unit 52 designates a next LB-less section 24 (operation S99). Further, the route determination unit 53C determines the traffic ratio (transmission amount) of the most upstream VNF group 21 in a section downstream of the designated LB-less section 24 as the traffic ratio (reception amount) of the most downstream VNF group 21 of the designated LB-less section 24 (operation S100), and proceeds to the operation S94.

In a case where the next section is not a LB-less section 24 in the operation S98 (operation S98: No), the designation unit 52 designates the LB section 23 (operation S101). The route determination unit 53C determines the traffic ratio (transmission amount) of the most upstream terminating VNF group 21 in a section downstream of the designated LB section 23 as the traffic ratio (reception amount) of the most downstream terminating VNF group 21 of the LB section 23 (operation S102). Further, the route determination unit 53C determines transfer routes to which all routes between the most upstream aggregation LB group 22 and the most downstream terminating VNF group 21 in the designated LB section 23 are distributed (operation S103). The route determination unit 53C determines the traffic ratio among transfer routes in the designated LB section 23 (operation S104).

The route determination unit 53C determines the traffic ratio (transmission amount) of the most upstream aggregation LB group 22 in the designated LB section 23 based on the traffic ratio among transfer routes in the designated LB section 23 (operation S105), and proceeds to the operation S97 to determine whether there is a next section. In a case where there is not a next section (operation S97: No), the route designation unit 53C proceeds to the operation S19 to determine the distribution ratio of the aggregation LB group 22. In a case where the configuration request is not received (operation S11: No), the first determination unit 41 ends the processing operation illustrated in FIG. 29.

The management server 3 of the fourth embodiment partitions the service chain 20C into the LB section 23 and LB-less section 24 based on the locations of the aggregation LB group 22 and a terminating VNF group 21 arranged in the service chain 20C. The management server 3 designates the LB section 23 and the LB-less section 24 one by one in the descending order from the most downstream to the most upstream of the service chain 20C. The management server 3 determines the traffic ratio (transmission amount) of the most upstream, the traffic ratio among transfer routes, and the traffic ratio (reception amount) of the most downstream, for each of the designated LB section 23 and LB-less section 24. Then, the management server 3 determines the distribution ratio of the aggregation LB group 22 and the traffic ratio of VNF groups 21 in the service chain 20C based on the traffic ratio of the most upstream, the traffic ratio among transfer routes, and the traffic ratio of the most downstream in the LB section 23 and LB-less section 24. As a result, even when an aggregation LB group 22 is arranged in the middle, the service chain 20C may distribute the traffic amount reflecting the number of VNF groups 21 downstream of the first terminating VNF group 21.

The management server 3 designates sections in the service chain 20C the in the order of fourth LB-less section 24D→third LB-less section 24C→second LB section 23B→second LB-less section 24B→first LB-less section 24A→first LB section 23A. In a case where the third LB-less section 24C is designated, the management server 3 sets the traffic ratio of the most upstream VNF group 21 in the fourth LB-less section 24D being a downstream section as the traffic ratio of the most downstream VNF group 21 in the third LB-less section 24C. In a case where the second LB section 23B is designated, the management server 3 sets the traffic ratio of the most upstream VNF group 21 in the third LB-less section 24C being a downstream section as the traffic ratio of the most downstream VNF group 21 in the second LB section 23B. Thus, processing load for setting the traffic ratio may be reduced.

In the third embodiment, when determining the traffic ratio among transfer routes in the LB section 23 in the operation S76 or when determining the traffic ratio among transfer routes in the LB-less section 24 in the operation S83, the management server 3 determines whether a load distribution target VNF group 21 in the section is designated. In a case where a load distribution target VNF group 21 in the section is designated, the processor 36 may determine the traffic ratio among transfer routes in the section such that traffic amounts of VNFs 12 in the load distribution target VNF group 21 become equal to each other.

Figure 30A:
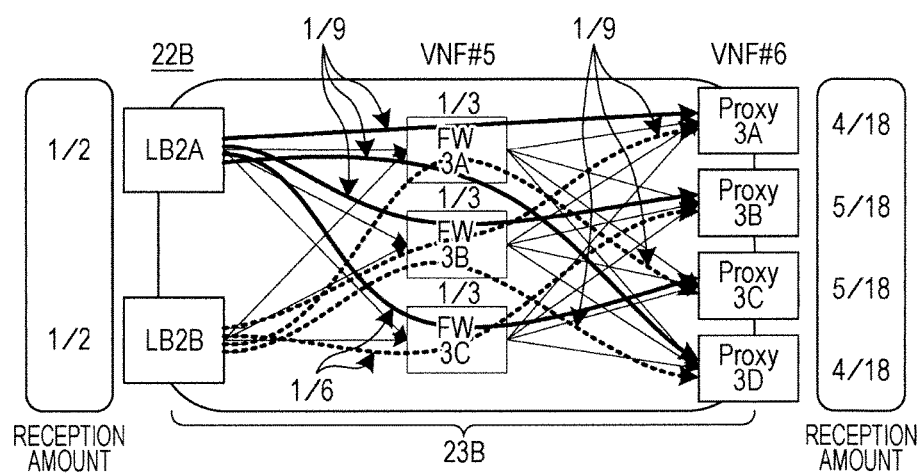
FIG. 30A illustrates an example of transfer routes and traffic ratios of VNF groups in the LB section.

FIG. 30A illustrates an example of transfer routes in the second LB section 23B and the traffic ratio of VNF groups 21. FIG. 30A illustrates the case where the traffic ratio in the VNF #5 (FW 3A to FW 3C) in the second LB section 23B is equally set as 1/3 of the entire traffic amount, and the traffic ratio in the second aggregation LB group 22B is set as 1/2 of the entire traffic amount. In a case where the VNF #5 is designated as a load distribution target VNF group 21 in the second LB section 23B, the route determination unit 53C determines the traffic ratio among transfer routes in the second LB section 23B such that the traffic amounts in the load distribution target VNF #5 become equal. The route determination unit 53C determines the traffic ratio of the VNF #6 based on the traffic ratio among transfer routes in the second LB section 23B. As a result, the traffic ratio of the Proxy 3A in the VNF #6 becomes 4/18 of the entire traffic amount, and the traffic ratio of the Proxy 3B becomes 5/18 of the entire traffic amount. Further, the traffic ratio of the Proxy 3C becomes 5/18 of the entire traffic, and the traffic ratio of the Proxy 3D becomes 4/18 of the entire traffic.

Figure 30B:
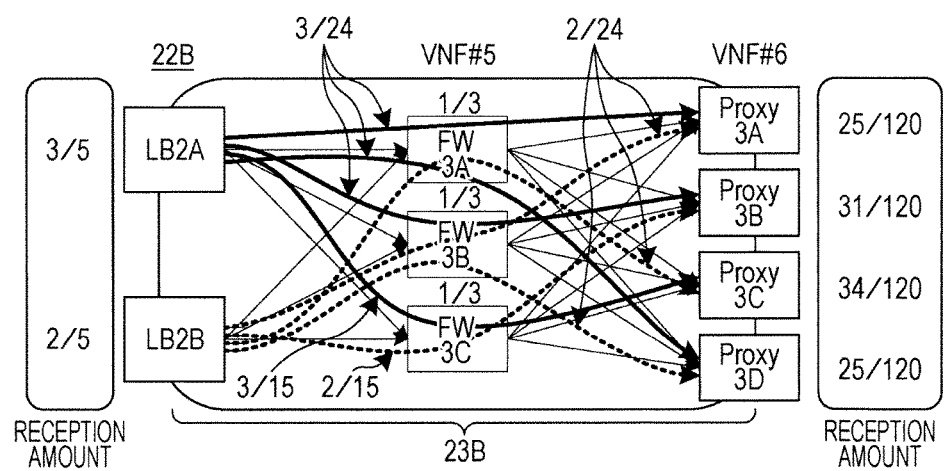
FIG. 30B illustrates an example of transfer routes and traffic ratios of VNF groups in the LB section.

FIG. 30B illustrates an example of transfer routes in the second LB section 23B and the traffic ratio of VNF groups 21. FIG. 30B illustrates the case where the traffic ratio in the VNF #5 (FW 3A to FW 3C) in the second LB section 23B is equally set to 1/3 of the entire traffic amount, and the traffic ratio of the LB 2A in the second aggregation LB group 22B is set 3/5 of the entire traffic amount. Further, FIG. 30B illustrates that the traffic ratio of the LB 2B is set to 2/5 of the entire traffic amount. In a case where the VNF #5 is designated as a load distribution target VNF group 21 in the second LB section 23B, the route determination unit 53C determines the traffic ratio among transfer routes in the second LB section 23B such that the traffic amounts in the load distribution target VNF #5 become equal. The route determination unit 53C determines the traffic ratio of the VNF #6 based on the traffic ratio among transfer routes in the second LB section 23B. As a result, the traffic ratio of the Proxy 3A in the VNF #6 becomes 25/120 of the entire traffic amount, and the traffic ratio of the Proxy 3B becomes 31/120 of the entire traffic amount. Further, the traffic ratio of the Proxy 3C becomes 34/120 of the entire traffic amount, and the traffic ratio of the Proxy 3D becomes 25/120 of the entire traffic amount.

In the third embodiment, information of VNF groups 21 and the aggregation LB 13A used in the VNF groups 21 is included as a format of the configuration request. However, information of the used aggregation LB 13A may not be included when one aggregation LB 13A is used for each of the VNF groups 21. As a result, volume of the configuration request may be made compact.

Based on the instance number of LBs for each of VNF groups 21 designated when arranging VNF groups 21 in multiple stages on a virtual area, the management server 3 determines the number of aggregation LBs 13A arranged upstream of the most upstream VNF group 21 (VNF #1). As a result, the management server 3 may determine a minimum number of aggregation LBs 13A requested for construction of the service chain.

The management server 3 identifies a desired functional property of each of VNF groups 21 designated by the configuration request such as, for example, a VNF group 21 of the L4 level, and determines the number of aggregation LBs 13A according to the instance number of LBs in the identified VNF group 21. As a result, the management server 3 may determine a minimum number of aggregation LBs 13A suitable for the desired functional property when constructing the service chain.

The management server 3 identifies a desired functional property of each of VNF groups 21 designated by the configuration request such as, for example, a VNF group 21 of the L4 level. Further, the management server 3 identifies a VNF group 21 having a largest number of VNFs 12, among the identified VNF groups 21. Further, the management server 3 determines the number of aggregation LBs 13A according to the instance number of LBs of the identified VNF group 21. As a result, when constructing the service chain, the management server 3 may determine a minimum number of aggregation LBs 13A suitable for the VNF group 21 accommodating a largest number of VNFs 12 of desired functional properties.

The management server 3 identifies a VNF group 21 of an upper layer property such as, for example, a L4 level VNF group 21 among VNF groups 21 designated by the configuration request, and determines the number of aggregation LBs 13A according to the instance number of LBs in the identified VNF group 21. As a result, when constructing the service chain, the management server 3 may determine a minimum number of aggregation LBs 13A suitable for the VNF group 21 accommodating a VNF 12 of an upper layer property.

The management server 3 identifies a VNF group 21 of an upper layer property among a plurality of VNF groups 21 based on the number of VNFs 12 for each of VNF groups 21 designated by the configuration request. Further, the management server 3 determines the number of aggregation LBs 13A according to the instance number of LBs in the identified VNF group 21, and deletes the number of designated LBs.

In the above embodiment, the number of aggregation LBs 13A is determined according to the instance number of LBs designated by the configuration request. However, the instance number of LBs may not be included in the configuration request. In this case, the management server 3 calculates a processing performance requested for each of VNF groups 21 based on the instance number of VNFs 12 of the VNF group 21 designated by the configuration request, and calculates the instance number of LBs requested for processing thereof. Further, the management server 3 may determine the number of aggregation LBs 13A based on the instance number of LBs for each of the calculated VNF groups 21.

Upon detecting the configuration request, the first determination unit 41 of the above embodiment identifies a L4 level VNF group 21 being an upper layer in the configuration request, and identifies a VNF group 21 having a largest instance number of VNFs 12 among the identified VNF groups 21. Then, the first determination unit 41 determines the number of aggregation LBs 13A according to the instance number of LBs in the identified VNF group 21. However, it is not limited thereto.

In the above embodiment, optimum routes of the most upstream VNF group 21 in the LB-less section 24 are determined, and then the traffic ratio among VNFs 12 in the most upstream VNF group 21 is calculated. However, optimum routes from the most upstream VNF group 21 to terminating VNFs 12 may be determined after calculating the traffic ratio among VNFs 12 in the most upstream VNF group 21.

In the above embodiment, the traffic ratio of VNFs 12 among optimum routes is calculated after calculating the distribution ratio of the aggregation LB 13A. However, the distribution ratio of the aggregation LB 13A may be calculated after calculating the traffic ratio of VNFs 12 among optimum routes, and the traffic ratio of VNFs 12 among optimum routes and the distribution ratio of the aggregation LB 13A may be calculated simultaneously by using a specific algorithm.

In the above embodiment, the number of aggregation LBs 13A is determined according to the functional property such as, for example, the instance number of L4 level VNF group 21 among a plurality of VNF groups 21 designated by the configuration request. However, as a functional property, for example, a VNF group 21 using a distributed calculation function may be identified by hash calculation of the transmission source address, and the number of aggregation LBs 13A may be determined with the instance number of LBs of the identified VNF group 21.

In the above embodiment, the instance number of the most upstream LB may be calculated by aggregating the instance number of LBs of VNF groups 21 designated by the configuration request to the most upstream LB 13. The configuration request may designate the most upstream aggregation LB 13A, a next stage VNF 12 coupled with the aggregation LB 13A, and the instance number of the VNF 12.

In the embodiment, a traffic ratio among VNFs 12 and the distribution ratio of the aggregation LB 13A are calculated to equalize the traffic amounts in the traffic ratio among VNFs 12 in the load distribution target VNF group 21 in the LB section 23 and the LB-less section 24. However, the traffic ratio equalization is not limited to VNFs 12 in the load distribution target VNF group 21, and the traffic ratio among VNFs 12 and the distribution ratio of the aggregation LB 13A may be calculated to equalize loads of all VNFs 12 of all VNF groups 21 in the LB section 23 and LB-less section 24. The management server 3 calculates the traffic ratio among VNFs 12 after determining transfer routes of VNFs 12. However, the management server 3 may calculate the transfer routes and the traffic ratio among VNFs 12 simultaneously.

In this embodiment, LB sections 23 or LB-less sections 24 are arranged at a plurality of sections. However, it is not limited thereto and may be altered as appropriate.

Illustrated components may not be physically configured in a same manner as illustrated. More specifically, specific separation and integration of devices are not limited to those illustrated, and devices may be configured by functionally or physically separating and/or integrating a whole or a portion thereof on an optional basis depending on various loads and utilization status.

Further, whole or any portion of various processing functions implemented by the apparatuses may be implemented by a central processing unit (CPU), a digital signal processor (DSP), or a field programmable gate array (FPGA). Whole or any portion of various processing functions may be implemented on a program executing analysis by the CPU or on a hardware by wired logic.

The area storing various information may be formed by, for example, a read only memory (ROM) or a random access memory (RAM) such as a synchronous dynamic random access memory (SDRAM), a magnetoresistive random access memory (MRAN), or non-volatile random access memory (NVRAM).

Figure 31:
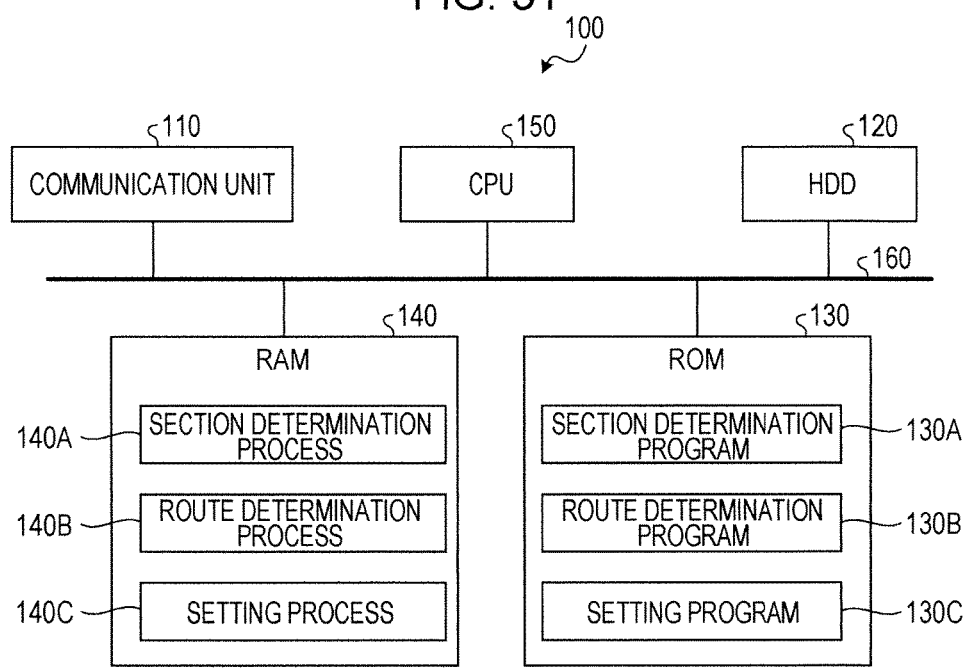
FIG. 31 illustrates an example of an information processing apparatus that implements a service chain construction program.
Figure 32:
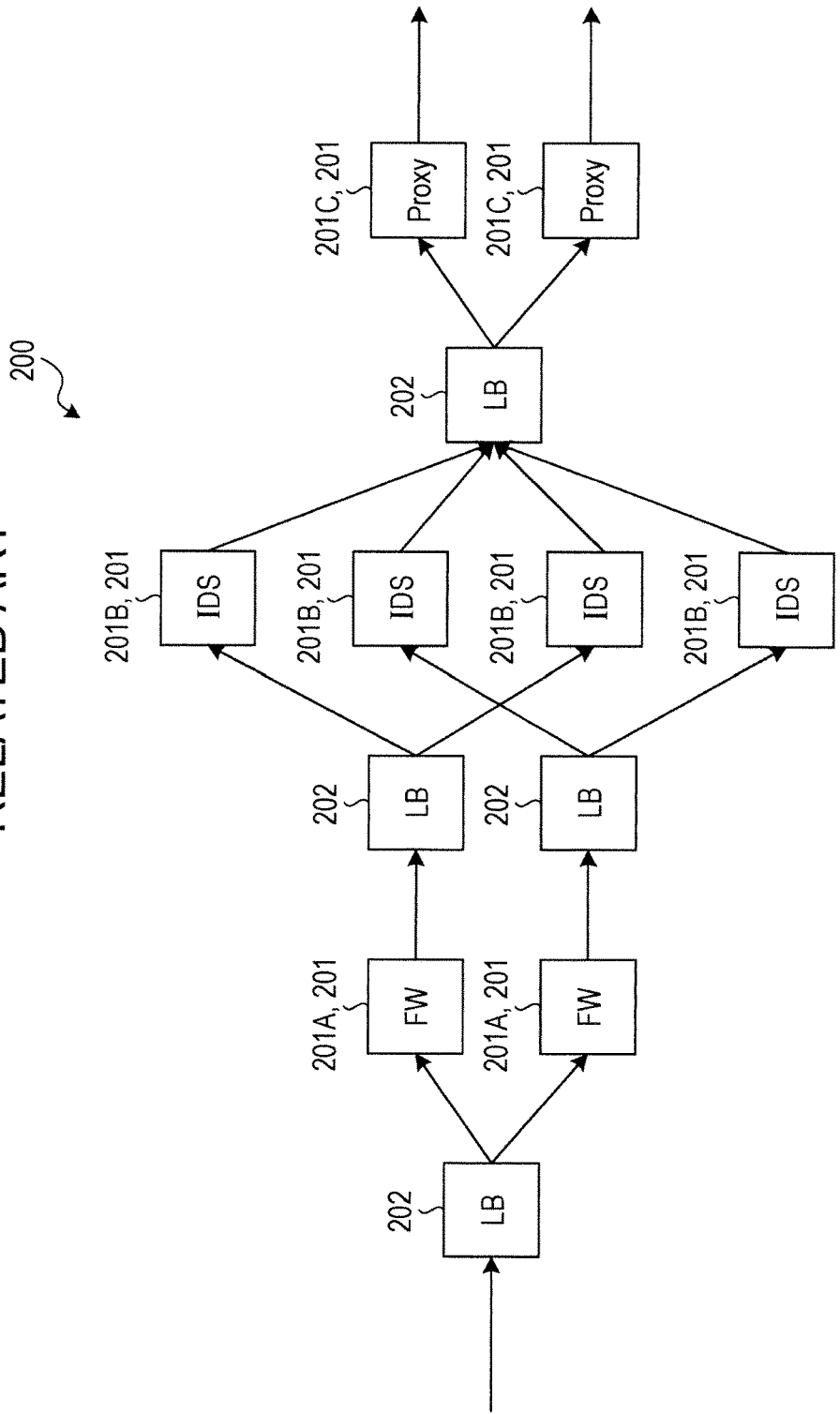
FIG. 32 illustrates an example of an arrangement configuration of a service chain.

Various processings described in this embodiment may be implemented by causing a processor such as a CPU in a computer to implement a program prepared in advance. Hereinafter, an example of an information processing apparatus 100 that implements a program having the same functions as the above embodiment. FIG. 31 illustrates an example of the information processing apparatus 100 that implements service chain construction programs.

The information processing apparatus 100 implementing service chain construction programs illustrated in FIG. 31 includes a communication unit 110, a hard disc drive (HDD) 120, a ROM 130, a RAM 140, and a CPU 150. The communication unit 110, HDD 120, ROM 130, RAM 140, and CPU 150 are coupled with each other via a bus 160. The communication unit 110 is coupled with another information processing apparatus (not illustrated) to communicate therewith. Then, the information processing apparatus 100 communicates with another information processing apparatus and constructs a service chain by arranging multiple stages of virtual communication function groups on a virtual area in the other information processing apparatus.

The ROM 130 pre-stores service chain construction programs exerting the same function as the above embodiment. The ROM 130 stores a section determination program 130A, a route determination program 130B, and a setting program 130C as service chain construction programs. The service chain construction programs may be recorded in a computer-readable recording medium in a drive (not illustrated), but not in the ROM 130. The recording medium may include, for example, a portable recording medium such as a CD-ROM, DVD disc, and USB memory or a semiconductor memory such as a flash memory.

Then, the CPU 150 reads the section determination program 130A from the ROM 130 and causes the program to function as a section determination process 140A on the RAM 140. Further, the CPU 150 reads the route determination program 130B from the ROM 130 and causes the program to function as a route determination process 140B on the RAM 140. Further, the CPU 150 reads the setting program 130C from the ROM 130 and causes the program to function as a setting process 140C on the RAM 140.

The CPU 150 partitions a service chain, in which a virtual distribution function group is arranged upstream of the most upstream virtual communication function group among multiple stages of virtual communication function groups, into a plurality of sections based on the arrangement position of terminating type virtual communication function groups among multiple stages of virtual groups and virtual distribution function groups. The CPU 150 determines, for each section, a communication route between the most upstream virtual distribution function group or virtual communication function group in the section and the most downstream virtual communication function group or virtual distribution function group in the section, based on the traffic ratio of the most upstream or most downstream virtual distribution function group or virtual communication function group in the section. The CPU 150 sets the determined communication route to arranged virtual distribution function groups and virtual communication function groups. As a result, transfer delay may be suppressed. Also, even when a terminating virtual communication function group is arranged downstream of a first terminating virtual communication function group, the service chain may distribute the traffic amount reflecting the number of virtual communication function groups downstream of the first terminating virtual communication function group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A service chain construction method comprising:
partitioning a service chain in which a virtual distribution function group is arranged upstream of a most upstream virtual communication function group among virtual communication function groups arranged at a plurality of stages, into a plurality of sections, based on arrangement positions of the virtual distribution function group and a virtual communication function group of a terminating type among the virtual communication function groups;

determining, for each of the plurality of sections, a communication route between a most upstream virtual distribution function group or the most upstream virtual communication function group in a section of the plurality of sections and a most downstream virtual communication function group or a most downstream virtual distribution function group in the section, based on a traffic ratio in the most upstream virtual distribution function group, the most downstream virtual distribution function group, the most upstream virtual communication function group, or the most downstream virtual communication function group in the section; and setting the communication route to the virtual distribution function group and the virtual communication function groups arranged in the service chain, by a processor.

2. The service chain construction method according to claim 1,
wherein the processor is configured to designate the section one by one in an arrangement order of the virtual communication function groups in the service chain.

3. The service chain construction method according to claim 2,
wherein the processor is configured to designate the section one by one in an ascending order from the most upstream virtual communication function group to the most downstream virtual communication function group in the arrangement order in the service chain.

4. The service chain construction method according to claim 2,
wherein the processor is configured to designate the sections one by one in a descending order from the most downstream virtual communication function group to the most upstream virtual communication function group in the arrangement order in the service chain.

5. The service chain construction method according to claim 3,
wherein the processor is configured to determine the communication route between the most upstream virtual distribution function group or the most upstream virtual communication function group in the designated section and the most downstream virtual distribution function group or the most downstream virtual communication function group in the designated section, based on a traffic ratio in the most upstream virtual distribution function group or the most upstream virtual communication function group in the designated section.

6. The service chain construction method according to claim 4,
wherein the processor is configured to determine the communication route between the most upstream virtual distribution function group or the most upstream virtual communication function group in the designated section and the most downstream virtual distribution function group or the most downstream virtual communication function group in the designated section, based on a traffic ratio in the most downstream virtual distribution function group or the most downstream virtual communication function group in the designated section.

7. The service chain construction method according to claim 5,
wherein the processor is configured to set the traffic ratio of the most upstream virtual distribution function group or the most upstream virtual communication function group in the designated section to the traffic ratio in the most downstream virtual distribution function group or the most downstream virtual communication function group in a section upstream of the designated section.

8. The service chain construction method according to claim 6,
wherein the processor is configured to set the traffic ratio in the most downstream virtual distribution function group or the most downstream virtual communication function group in the designated section to the traffic ratio in the most upstream virtual distribution function group or the most upstream virtual communication function group in a section downstream of the designated section.

9. A server apparatus comprising:
a memory; and
a processor coupled to the memory and the processor configured to:
partition a service chain in which a virtual distribution function group is arranged upstream of a most upstream virtual communication function group among virtual communication function groups arranged at a plurality of stages, into a plurality of sections, based on arrangement positions of the virtual distribution function group and a virtual communication function group of a terminating type among the virtual communication function groups;
determine, for each of the plurality of sections, a communication route between a most upstream virtual distribution function group or the most upstream virtual communication function group in a section of the plurality of sections and a most downstream virtual communication function group or a most downstream virtual distribution function group in the section, based on a traffic ratio in the most upstream virtual distribution function group, the most downstream virtual distribution function group, the most upstream virtual communication function group, or the most downstream virtual communication function group in the section; and
set the communication route to the virtual distribution function group and the virtual communication function groups arranged in the service chain.

* * * * *